United States Patent
Xu

(10) Patent No.: US 11,921,987 B2
(45) Date of Patent: Mar. 5, 2024

(54) SYSTEM NAVIGATION BAR DISPLAY METHOD, SYSTEM NAVIGATION BAR CONTROL METHOD, GRAPHICAL USER INTERFACE, AND ELECTRONIC DEVICE

(71) Applicant: HUAWEI TECHNOLOGIES CO., LTD., Shenzhen (CN)

(72) Inventor: Jie Xu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 341 days.

(21) Appl. No.: 17/281,163

(22) PCT Filed: Sep. 30, 2018

(86) PCT No.: PCT/CN2018/109202
§ 371 (c)(1),
(2) Date: Mar. 29, 2021

(87) PCT Pub. No.: WO2020/062294
PCT Pub. Date: Apr. 2, 2020

(65) Prior Publication Data
US 2021/0342044 A1 Nov. 4, 2021

(51) Int. Cl.
*H04M 1/02* (2006.01)
*G06F 3/0484* (2022.01)

(52) U.S. Cl.
CPC ......... *G06F 3/0484* (2013.01); *H04M 1/0214* (2013.01)

(58) Field of Classification Search
CPC ............................ H04M 1/0214; G06F 3/0484
See application file for complete search history.

(56) References Cited

U.S. PATENT DOCUMENTS 5,721,848 A * 2/1998 Joseph ................... G06F 9/451
715/764
6,791,571 B1 * 9/2004 Lamb .................... G06F 40/103
715/835
(Continued)

FOREIGN PATENT DOCUMENTS

CN 101593060 A * 12/2009
CN 102495768 A * 6/2012 .......... G06F 11/0703
(Continued)

OTHER PUBLICATIONS

"Working with Components", published on Sep. 13, 2018 to https://docs.inductiveautomation.com/display/DOC79/Working+with+Components, retrieved Apr. 30, 2023. (Year: 2018).*
(Continued)

*Primary Examiner* — Shourjo Dasgupta
(74) *Attorney, Agent, or Firm* — HAUPTMAN HAM, LLP

(57) ABSTRACT

This application discloses a system navigation bar display method, a system navigation bar control method, a graphical user interface, and an electronic device. The method may include: when a foldable display screen of an electronic device changes from a folded state to an expanded state, changing a fixed system navigation bar on an interface displayed on the foldable display screen to a floating system navigation bar, where the floating system navigation bar can be dragged by a user to change a position of the floating system navigation bar relative to another interface element on the interface. When operating the electronic device with one hand, the user can drag the floating system navigation bar to an area in which an operation is conveniently performed with one hand, so that various functions of the system navigation bar can be conveniently used.

20 Claims, 47 Drawing Sheets

```
┌─ 101
A foldable display screen of an electronic device displays a first interface
that includes a fixed system navigation bar, where the fixed system
navigation bar includes at least one system navigation control, and the
fixed system navigation bar cannot be dragged by a user to change a
position of the fixed system navigation bar relative to another interface
element on the interface
```

```
┌─ 102
When detecting that a bending angle of the foldable display screen is less
than a preset threshold, the electronic device displays a second interface
that includes a floating system navigation bar but does not include the fixed
system navigation bar, where the floating system navigation bar includes at
least one system navigation control and can be dragged by the user to a
position of the floating system navigation bar to another interface element
on the interface, and the first interface is different from the second interface
```

(56) References Cited

U.S. PATENT DOCUMENTS

| | | | |
|---|---|---|---|
| 10,817,173 B2* | 10/2020 | DeBates | G06F 3/04883 |
| 2008/0177994 A1* | 7/2008 | Mayer | G06F 16/00 709/224 |
| 2009/0307632 A1 | 12/2009 | Hasegawa et al. | |
| 2010/0141605 A1* | 6/2010 | Kang | G06F 1/1643 345/174 |
| 2011/0102977 A1 | 5/2011 | Chen | |
| 2013/0093660 A1* | 4/2013 | Hirsch | G06F 1/1694 345/156 |
| 2013/0222416 A1* | 8/2013 | Kim | G09G 3/20 345/173 |
| 2014/0015743 A1* | 1/2014 | Seo | G06F 3/017 345/156 |
| 2014/0055429 A1* | 2/2014 | Kwon | G09G 3/035 345/204 |
| 2014/0101560 A1* | 4/2014 | Kwak | G06F 3/0488 715/788 |
| 2014/0101575 A1 | 4/2014 | Kwak et al. | |
| 2014/0320393 A1* | 10/2014 | Modarres | G06F 1/1641 345/156 |
| 2014/0347286 A1* | 11/2014 | Prushinskiy | G06F 3/0487 345/173 |
| 2015/0153912 A1* | 6/2015 | Reily | G06F 3/04842 715/784 |
| 2016/0092091 A1* | 3/2016 | Hanson | G06F 3/04886 715/763 |
| 2016/0283053 A1 | 9/2016 | Shi | |
| 2018/0341341 A1* | 11/2018 | Sharma | G06F 3/0338 |

FOREIGN PATENT DOCUMENTS

| | | | | |
|---|---|---|---|---|
| CN | 103914216 A | * | 7/2014 | |
| CN | 102243569 B | * | 4/2016 | A61B 8/463 |
| CN | 105468263 A | | 4/2016 | |
| CN | 106020473 A | * | 10/2016 | G06F 3/017 |
| CN | 106020810 A | | 10/2016 | |
| CN | 107704177 A | | 2/2018 | |
| CN | 107765971 A | | 3/2018 | |
| CN | 107835321 A | | 3/2018 | |
| CN | 107844228 A | | 3/2018 | |
| CN | 108196743 A | * | 6/2018 | G06F 1/1652 |
| CN | 108196807 A | | 6/2018 | |
| CN | 108255388 A | | 7/2018 | |
| CN | 109274823 A | * | 1/2019 | G06F 1/1616 |
| EP | 1624384 A2 | * | 2/2006 | G07F 17/212 |
| JP | 2009294808 A | | 12/2009 | |
| KR | 100842604 B1 | * | 7/2008 | |
| KR | 20080088090 A | * | 10/2008 | |
| KR | 20100048374 A | * | 5/2010 | |
| KR | 20140046346 A | | 4/2014 | |
| KR | 20160089754 A | * | 7/2016 | |
| KR | 20200043578 A | | 4/2020 | |
| KR | 20200045660 A | | 5/2020 | |
| KR | 20210036313 A | | 4/2021 | |
| WO | 2013052594 A2 | | 4/2013 | |

OTHER PUBLICATIONS

"Turn your Galaxy phone's or tablet's screen rotation on or off", published on Sep. 2, 2018 to https://www.samsung.com/us//support/answer/ANS00088202, retrieved Apr. 30, 2023. (Year: 2019).*

"Adapting to Screen Orientation—Laying Out Controls in Android Containers", published on Jan. 2, 2013 to https://www.informit.com/articles/article.aspx?p=2007353&seqNum=9, retrieved Apr. 30, 2023. (Year: 2013).*

"Updated the Ul based on orientation", Flutter, published on Apr. 10, 2018 to https://docs.flutter.dev/cookbook/design/orientation, retrieved Apr. 30, 2023. (Year: 2018).*

Avi Itzkovitch, Smashing Magazine, "Designing For Device Orientation: From Portrait to Landscape", published on Aug. 10, 2012 to https://www.smashingmagazine.com/2012/08/designing-device-orientation-portrait-landscape, retrieved Apr. 30, 2023. (Year: 2012).*

Miranda Li, "Mobile dashboard design: Choose your orientation", published on Dec. 23, 2015 to https://www.tableu.com/blog/mobile-dashboard-design-vertical-or-horizontal-choose-your-orientation-47848, retrieved Apr. 30, 2023. (Year: 2015).*

ITU-T H.264(Apr. 2017), Series H: Audiovisual and Multimedia Systems, Infrastructure of audiovisual services—Coding of moving video, Advanced video coding for generic audiovisual services, total 812 pages.

International Search Report issued in corresponding International Application No. PCT/CN2018/109202, dated Jul. 4, 2019, pp. 1-11.

European Search Report issued in corresponding European Application No. 18934720.6, dated Aug. 18, 2021, pp. 1-9, European Patent Office, Munich, Germany.

Chinese Office Action issued in corresponding Chinese Application No. 201880097572.2, dated Dec. 13, 2021, pp. 1-12.

Japanese Notice of Allowance issued in corresponding Japanese Patent No. 7081048, dated Jun. 6, 2022, pp. 1-64.

Korean Notice of Allowance issued in corresponding Korean Application No. 10-2021-7012821, dated Mar. 20, 2023, pp. 1-5.

* cited by examiner

⇩

TO

TO

CONT. FROM FIG. 14c

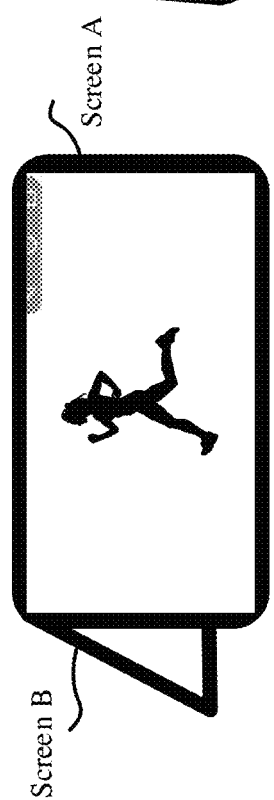
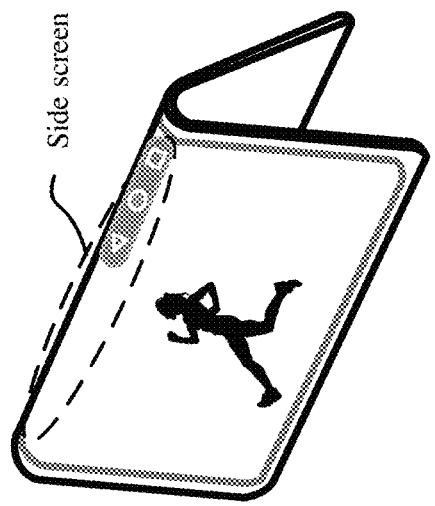
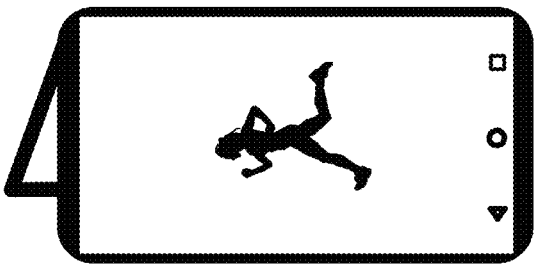
FIG. 18a
FIG. 18b
FIG. 18c in a virtual navigation bar are in the area that is difficult to be touched. In other words, when the user operates the mobile phone with one hand, it is difficult to control the virtual keys in the virtual navigation bar. Consequently, some functions of the virtual navigation bar cannot be used.

SYSTEM NAVIGATION BAR DISPLAY METHOD, SYSTEM NAVIGATION BAR CONTROL METHOD, GRAPHICAL USER INTERFACE, AND ELECTRONIC DEVICE

CROSS-REFERENCE TO RELATED APPLICATIONS

This application is a National Stage of International Application No. PCT/CN2018/109202, filed on Sep. 30, 2018, which is hereby incorporated by reference in its entirety.

TECHNICAL FIELD

This application relates to the field of human-computer interaction technologies, and in particular, to a system navigation bar display method, a system navigation bar control method, a graphical user interface, and an electronic device.

BACKGROUND

Currently, a system navigation bar in a terminal device is usually implemented by using a virtual key, and provides access for a user to switch to another page. For example, the user may tap a virtual return key provided in the system navigation bar to return to a previous interface or exit an application, or may tap a virtual home key (also referred to as a home screen key) to return to a home screen, or may tap a multitasking key to display a list of recently used applications.

The system navigation bar usually occupies an area of an entire line at the bottom of the screen, and the area cannot be used to display another interface, thereby greatly wasting screen space.

In addition, with rapid development of intelligent terminal technologies, a screen size of an intelligent terminal is increasingly large (for example, a touchscreen of 5 inches or larger). However, an intelligent terminal with a large screen brings a great challenge to a user in operating the intelligent terminal with one hand, and it is difficult for the user to control a system navigation bar with one hand.

As shown in FIG. 1, when a user holds a mobile phone with a large screen with one hand, the entire screen of the mobile phone may be divided into two parts according to difficulty of a user operation. A shadow area on the screen indicates an area that can be touched by a thumb when the user performs a one-hand operation, and the remaining area on the screen indicates an area that is difficult to be touched by the thumb when the user performs the one-hand operation. Some virtual keys (for example, a return key in FIG. 1) in a virtual navigation bar are in the area that is difficult to be touched. In other words, when the user operates the mobile phone with one hand, it is difficult to control the virtual keys in the virtual navigation bar. Consequently, some functions of the virtual navigation bar cannot be used.

SUMMARY

This application provides a system navigation bar display method, a system navigation bar control method, a graphical user interface, and an electronic device, so that a user can conveniently use various functions of a system navigation bar.

According to a first aspect, this application provides a control method. The method is applied to an electronic device, the electronic device is provided with a foldable display screen, and the method may include: displaying, by the foldable display screen of the electronic device, a first interface that includes a fixed system navigation bar, where the fixed system navigation bar includes at least one system navigation control, and the fixed system navigation bar cannot be dragged by a user to change a position of the fixed system navigation bar relative to another interface element on the interface; and when detecting that a bending angle of the foldable display screen is less than a preset threshold, displaying, by the electronic device, a second interface that includes a floating system navigation bar but does not include the fixed system navigation bar, where the floating system navigation bar includes at least one system navigation control and can be dragged by the user to change a position of the floating system navigation bar relative to another interface element on the interface; where the first interface is different from the second interface.

According to the method according to the first aspect, when the foldable display screen changes from a folded state to an expanded state, the floating system navigation bar is displayed, and the floating system navigation bar can be dragged by the user. In this way, when operating the electronic device with one hand, the user can drag the floating system navigation bar to an area in which an operation is conveniently performed with one hand, so that various functions of the system navigation bar can be conveniently used.

With reference to the first aspect, in some embodiments, navigation functions of the fixed system navigation bar may include at least one of the following: returning to a home screen, returning to a previous interface, displaying a multitasking interface, or displaying a notification bar.

With reference to the first aspect, in some embodiments, the fixed system navigation bar cannot be dragged by the user to change the position of the fixed system navigation bar relative to the another interface element on the interface. However, the system navigation control included in the fixed system navigation bar may change with a posture (for example, from a portrait orientation state to a landscape orientation state) of the electronic device, to change an arrangement manner. In some embodiments, the fixed system navigation bar may change with a posture (for example, from a portrait orientation state to a landscape orientation state) of the electronic device, to change the position of the fixed system navigation bar relative to the another interface element on the interface. In some embodiments, the fixed system navigation bar may alternatively be scaled down in equal proportion in response to a user operation.

Specifically, the electronic device may obtain the bending angle of the foldable display screen by using an angle sensor, a gyro sensor, or the like. The bending angle of the foldable display screen indicates a status of the display screen. In some embodiments, when the bending angle of the foldable display screen is less than the preset threshold, it may be considered that the foldable display screen is in the expanded state. When the bending angle of the foldable display screen is greater than the preset threshold, it may be considered that the foldable display screen is in the folded state. Herein, the preset threshold is not limited to a default setting of the electronic device at delivery, and may be further independently set by the user.

With reference to the first aspect, in some embodiments, navigation functions of the floating system navigation bar may include at least one of the following: returning to a home screen, returning to a previous interface, displaying a multitasking interface, or displaying a notification bar.

In the method according to the first aspect, the floating system navigation bar can be dragged by the user to change the position of the floating system navigation bar relative to the another interface element on the interface. In some embodiments, the floating system navigation bar can be dragged by the user to any position of the display screen. In a possible implementation, that the floating system navigation bar is dragged by the user may mean that the entire floating system navigation bar is dragged by the user. In another possible implementation, that the floating system navigation bar is dragged by the user may mean that some system navigation controls of the floating system navigation bar are dragged by the user.

With reference to the first aspect, in some embodiments, when detecting an input first user operation, the electronic device changes at least one of a size, a shape, or a display mode of the floating system navigation bar on the second interface, or changes at least one of a quantity of controls, a shape of a control, a size of a control, or a relative position of controls in the floating system navigation bar.

Herein, the first user operation is not limited to a default setting of the electronic device at delivery, and may be further independently set by the user. For example, the first user operation may be a pinch gesture that is input by the user by touching a capsule bar-shape floating system navigation bar with two fingers. In response to the gesture, the floating system navigation bar may be changed from a capsule bar shape to a spherical shape. For example, the first user operation may be a gesture that the user touches a capsule bar-shape floating system navigation bar with a single finger to slide the floating system navigation bar to the other side. In response to the gesture, the floating system navigation bar is changed from a capsule bar shape to a spherical shape. For example, the first user operation may be a gesture that the user drags a capsule bar-shape floating system navigation bar to an edge area of the display screen. In response to the gesture, the electronic device may change the floating system navigation bar from a capsule bar shape to a spherical shape.

In some embodiments, when detecting that the bending angle of the foldable display screen is greater than the preset threshold, the electronic device displays the first interface.

According to a second aspect, this application provides another control method. The method is applied to an electronic device, the electronic device is provided with a display screen, and the method may include: displaying, by the display screen of the electronic device, a first interface that includes a fixed system navigation bar, where the fixed system navigation bar includes at least one system navigation control, and the fixed navigation bar cannot be dragged by a user to change a position of the fixed system navigation bar relative to another interface element on the interface; and when detecting that the electronic device changes from a portrait orientation state to a landscape orientation state, displaying, by the electronic device, a second interface that includes a floating system navigation bar but does not include the fixed system navigation bar, where the floating system navigation bar includes at least one system navigation control and can be dragged by the user to change a position of the floating system navigation bar relative to another interface element on the interface; where the first interface is different from the second interface.

According to the method according to the second aspect, when the display screen changes from the portrait orientation state to the landscape orientation state, the floating system navigation bar is displayed, and the floating system navigation bar can be dragged by the user. In this way, when operating the electronic device with one hand, the user can drag the floating system navigation bar to an area in which an operation is conveniently performed with one hand, so that various functions of the system navigation bar can be conveniently used.

In the method according to the second aspect, the display screen disposed in the electronic device may be a foldable display screen, or may be a non-folded display screen. The foldable display screen is in a landscape orientation or a portrait orientation only when the electronic device is provided with the foldable display screen, and the foldable display screen is in a folded state. Therefore, the electronic device may determine whether the foldable display screen is in the folded state before determining whether the foldable display screen is in the landscape orientation state. Herein, a manner of determining whether the foldable display screen is in the folded state is the same as that in the method according to the first aspect, and reference may be made to related descriptions.

In an optional embodiment, the electronic device may determine the landscape/portrait orientation state of the display screen by using data obtained by using a gyro sensor. Not limited to the gyro sensor, in specific implementation, the electronic device may further determine the landscape/portrait orientation state of the display screen by using a compass, a camera, a gravity sensor, or the like.

In the method according to the second aspect, the fixed system navigation bar, the floating system navigation bar, the first interface, and the second interface are the same as those in the first aspect, and reference may be made to related descriptions.

With reference to the second aspect, in some embodiments, when the electronic device displays the second interface, a position of the floating system navigation bar on the second interface is related to a posture in which the user holds the electronic device. This is the same as that in the first aspect, and reference may be made to related descriptions.

With reference to the second aspect, in some embodiments, when detecting an input first user operation, the electronic device changes at least one of a size, a shape, or a display mode of the floating system navigation bar on the second interface, or changes at least one of a quantity of controls, a shape of a control, a size of a control, or a relative position of controls in the floating system navigation bar. Herein, the first user operation is the same as that in the first aspect, and reference may be made to related descriptions.

With reference to the second aspect, in some embodiments, when detecting that the electronic device changes from the landscape orientation state to the portrait orientation state, the electronic device displays the first interface.

According to a third aspect, this application provides a graphical user interface on an electronic device. The electronic device is provided with a foldable display screen, a memory, and one or more processors configured to execute one or more programs stored in the memory. The graphical user interface includes a first interface that is currently output by a system and that includes a fixed system navigation bar. The fixed system navigation bar includes at least one system navigation control, and the fixed system navigation bar cannot be dragged by a user to change a position of the fixed system navigation bar relative to another interface element on the interface.

In response to detecting that a bending angle of the foldable display screen is less than a preset threshold, the electronic device displays a second interface that includes a floating system navigation bar but does not include the fixed system navigation bar, where the floating system navigation bar includes at least one system navigation control and can be dragged by the user to change a position of the floating system navigation bar relative to another interface element on the interface.

The first interface is different from the second interface.

With reference to the third aspect, in some embodiments, in response to an input first user operation detected by the electronic device, the graphical user interface changes at least one of a size, a shape, or a display mode of the floating system navigation bar on the second interface, or changes at least one of a quantity of controls, a shape of a control, a size of a control, or a relative position of controls in the floating system navigation bar.

With reference to the third aspect, in some embodiments, the graphical user interface displays the first interface in response to detecting, by the electronic device, that the bending angle of the foldable display screen is greater than the preset threshold.

According to a fourth aspect, this application provides a graphical user interface on an electronic device. The electronic device is provided with a display screen, a memory, and one or more processors configured to execute one or more programs stored in the memory. The graphical user interface includes a first interface that is currently output by a system and that includes a fixed system navigation bar. The fixed system navigation bar includes at least one system navigation control, and the fixed system navigation bar cannot be dragged by a user to change a position of the fixed system navigation bar relative to another interface element on the interface.

In response to detecting that the electronic device changes from a portrait orientation state to a landscape orientation state, the electronic device displays a second interface that includes a floating system navigation bar but does not include the fixed system navigation bar, where the floating system navigation bar includes at least one system navigation control and can be dragged by the user to change a position of the floating system navigation bar relative to another interface element on the interface.

The first interface is different from the second interface.

With reference to the fourth aspect, in some embodiments, in response to an input first user operation detected by the electronic device, the graphical user interface changes at least one of a size, a shape, or a display mode of the floating system navigation bar on the second interface, or changes at least one of a quantity of controls, a shape of a control, a size of a control, or a relative position of controls in the floating system navigation bar.

With reference to the fourth aspect, in some embodiments, the graphical user interface displays the first interface in response to detecting, by the electronic device, that the electronic device changes from the landscape orientation state to the portrait orientation state.

According to a fifth aspect, this application provides an electronic device, including an input apparatus, a processor, and a foldable display screen, where the foldable display screen is configured to display a first interface that includes a fixed system navigation bar, where the fixed system navigation bar includes at least one system navigation control, and the fixed system navigation bar cannot be dragged by a user to change a position of the fixed system navigation bar relative to another interface element on the interface;

the input apparatus is configured to detect a bending angle of the foldable display screen;

the processor is configured to: when detecting that the bending angle of the foldable display screen is less than a preset threshold, indicate the foldable display screen to display a second interface that includes a floating system navigation bar but does not include the fixed system navigation bar, where the floating system navigation bar includes at least one system navigation control and can be dragged by the user to change a position of the floating system navigation bar relative to another interface element on the interface; and the foldable display screen is further configured to display the second interface, where the first interface is different from the second interface.

With reference to the fifth aspect, in some embodiments, the input apparatus may include at least one of the following: an angle sensor or a gyro sensor.

According to a sixth aspect, this application provides an electronic device, including an input apparatus, a processor, and a display screen, where the display screen is configured to display a first interface that includes a fixed system navigation bar, where the fixed system navigation bar includes at least one system navigation control, and the fixed system navigation bar cannot be dragged by a user to change a position of the fixed system navigation bar relative to another interface element on the interface;

the input apparatus is configured to detect a landscape/portrait orientation state of the electronic device;

the processor is configured to: when the electronic device changes from the portrait orientation state to the landscape orientation state, indicate the display screen to display a second interface that includes a floating system navigation bar but does not include the fixed system navigation bar, where the floating system navigation bar includes at least one system navigation control and can be dragged by the user to change a position of the floating system navigation bar relative to another interface element on the interface; and the display screen is further configured to display the second interface, where the first interface is different from the second interface.

With reference to the sixth aspect, in some embodiments, the input apparatus may include at least one of the following: an angle sensor, a gyro sensor, a compass, a camera, or a gravity sensor.

With reference to the fifth aspect or the sixth aspect, in some embodiments, a position of the floating system navigation bar on the second interface is related to a posture in which the user holds the electronic device.

With reference to the fifth aspect or the sixth aspect, in some embodiments, the input apparatus is further configured to detect an input first user operation. The processor is further configured to: when the input first user operation is detected, indicate a display to change at least one of a size, a shape, or a display mode of the floating system navigation bar on the second interface, or change at least one of a quantity of controls, a shape of a control, a size of a control, or a relative position of controls in the floating system navigation bar.

With reference to the fifth aspect, in some embodiments, the processor is further configured to: when the bending angle of the foldable display screen is greater than the preset threshold, indicate the foldable display screen to display the first interface.

With reference to the sixth aspect, in some embodiments, the processor is further configured to: when the electronic device changes from the portrait orientation state to the landscape orientation state, indicate the display screen to display the first interface.

According to a seventh aspect, this application provides an electronic device, including one or more processors and one or more memories. The one or more memories are coupled to the one or more processors, the one or more memories are configured to store computer program code, the computer program code includes a computer instruction, and when the one or more processors execute the computer instruction, the electronic device performs the control method provided in the first aspect.

According to an eighth aspect, this application provides an electronic device, including one or more processors and one or more memories. The one or more memories are coupled to the one or more processors, the one or more memories are configured to store computer program code, the computer program code includes a computer instruction, and when the one or more processors execute the computer instruction, the electronic device performs the control method provided in the second aspect.

According to a ninth aspect, this application provides a computer storage medium, including a computer instruction. When the computer instruction is run on a terminal, the terminal is enabled to perform the control method provided in the first aspect.

According to a tenth aspect, this application provides a computer storage medium, including a computer instruction. When the computer instruction is run on a terminal, the terminal is enabled to perform the control method provided in the second aspect.

According to an eleventh aspect, this application provides a computer program product. When the computer program product runs on a computer, the computer is enabled to perform the control method according to the first aspect.

According to a twelfth aspect, this application provides a computer program product. When the computer program product runs on a computer, the computer is enabled to perform the control method according to the second aspect.

According to this application, when operating the electronic device with one hand, the user can drag the floating system navigation bar to the area in which the operation is conveniently performed with one hand, so that the various functions of the system navigation bar can be conveniently used.

BRIEF DESCRIPTION OF DRAWINGS

To describe technical solutions in embodiments of this application or in the background more clearly, the following briefly describes accompanying drawings for describing the embodiments of this application or the background.

FIG. 5a to FIG. 21 are schematic diagrams of human-computer interaction according to this application;

DESCRIPTION OF EMBODIMENTS

The following describes technical solutions in embodiments of this application with reference to accompanying drawings in the embodiments of this application.

In descriptions of the embodiments of this application, "I" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions of the embodiments of this application, "a plurality of" means two or more than two.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of the embodiments of this application, "a plurality of" means two or more than two unless otherwise stated.

Figure 2:
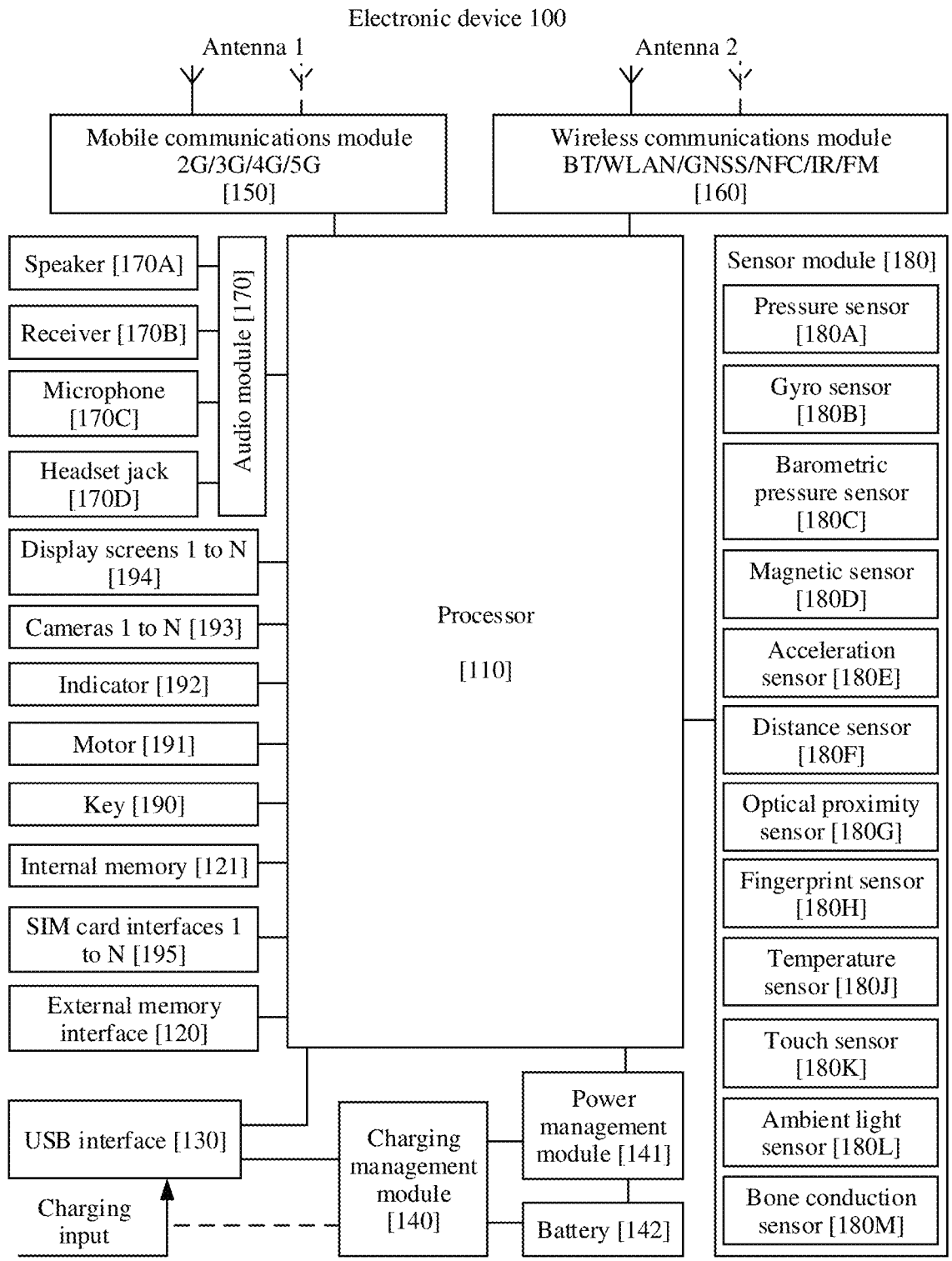
FIG. 2 is a schematic structural diagram of a terminal according to this application.

A system navigation bar display method provided in this application may be applied to an electronic device 100 shown in FIG. 2. The electronic device 100 may be a portable electronic device, for example, a mobile phone, a tablet, a personal digital assistant (personal digital assistant, PDA), or a wearable device. An example embodiment of the portable electronic device includes but is not limited to a portable electronic device using iOS, Android, Microsoft, or another operating system. Alternatively, the portable electronic device may be another portable electronic device, for example, a laptop computer (laptop) with a touch-sensitive surface (for example, a touch panel). It should be further understood that in some other embodiments of this application, the terminal 100 may alternatively be a desktop computer with the touch-sensitive surface (for example, the touch panel), but not the portable electronic device.

FIG. 2 is a schematic structural diagram of an electronic device 100 according to this application.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a key 190, a motor 191, an indicator 192, a camera 193, a display screen 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, an angle sensor, and the like.

It may be understood that a structure shown in this embodiment of this application does not constitute a specific limitation on the electronic device 100. In some other embodiments of this application, the electronic device 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural processing unit (neural-network processing unit, NPU). Different processing units may be independent components, or may be integrated into one or more processors.

The controller may be a nerve center and a command center of the electronic device 100. The controller may generate an operation control signal based on instruction operation code and a time sequence signal, to complete control of instruction reading and instruction execution.

The memory may be further disposed in the processor 110, and is configured to store an instruction and data. In some embodiments, the memory in the processor 110 is a cache memory. The memory may store an instruction or data that has been used or cyclically used by the processor 110. If the processor 110 needs to use the instruction or the data again, the processor 110 may directly invoke the instruction or the data from the memory, to avoid repeated access and reduce a waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identification module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (derail clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be configured to: perform audio communication, and sample, quantize, and code an analog signal. In some embodiments, the audio module 170 may be coupled to the wireless communications module 160 through a PCM bus interface. In some embodiments, the audio module 170 may also transmit an audio signal to the wireless communications module 160 through the PCM interface, to implement a function of answering a call by using a Bluetooth headset. Both the I2S interface and the PCM interface may be configured to perform audio communication.

The UART interface is a universal serial data bus, and is configured to perform asynchronous communication. The bus may be a two-way communications bus, and converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music by using a Bluetooth headset.

The MIPI interface may be configured to connect the processor 110 to a peripheral component such as the display screen 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the electronic device 100. The processor 110 communicates with the display screen 194 through the DSI interface, to implement a display function of the electronic device 100.

The GPIO interface may be configured by software. The GPIO interface may be configured as a control signal or a data signal. In some embodiments, the GPIO interface may be configured to connect the processor 110 to the camera 193, the display screen 194, the wireless communications module 160, the audio module 170, the sensor module 180, and the like. The GPIO interface may also be configured as the I2C interface, the I2S interface, the UART interface, the MIPI interface, or the like.

The USB interface 130 is an interface that conforms to a USB standard specification, and may be specifically a mini USB interface, a micro USB interface, a USB type-C interface, or the like. The USB interface 130 may be configured to connect to the charger to charge the electronic device 100, or may be configured to perform data transmission between the electronic device 100 and a peripheral device, or may be configured to connect to a headset to play audio by using the headset. The interface may be further configured to connect to another electronic device such as an AR device.

It may be understood that an interface connection relationship between the modules that is shown in this embodiment of the present invention is merely an example for description, and does not constitute a limitation on the structure of the electronic device 100. In some other embodiments of this application, the electronic device 100 may alternatively use an interface connection manner different from that in the foregoing embodiment, or a combination of a plurality of interface connection manners.

The charging management module 140 is configured to receive a charging input from the charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input by using a wireless charging coil of the electronic device 100. The charging management module 140 supplies power to the electronic device by using the power management module 141 while charging the battery 142.

The power management module 141 is configured to connect the battery 142 and the charging management module 140 to the processor 110. The power management module 141 receives an input of the battery 142 and/or the charging management module 140, and supplies power to the processor 110, the internal memory 121, an external memory, the display screen 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the electronic device 100 may be configured to cover one or more communications frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communications module 150 can provide a solution, applied to the electronic device 100, to wireless communication including 2G, 3G, 4G, 5G, and the like. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some function modules in the mobile communications module 150 may be disposed in the processor 110. In some embodiments, at least some function modules in the mobile communications module 150 may be disposed in a same device as at least some modules in the processor 110.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video by using the display screen 194. In some embodiments, the modem processor may be an independent component. In some other embodiments, the modem processor may be independent of the processor 110, and is disposed in a same device as the mobile communications module 150 or another function module.

The wireless communications module 160 may provide a solution, applied to the electronic device 100, to wireless communication including a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, and the like. The wireless communications module 160 may be one or more components integrating at least one communications processor module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communications module 150 of the electronic device 100 are coupled, and the antenna 2 and the wireless communications module 160 of the electronic device 100 are coupled, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a Beidou navigation satellite system (beidou navigation satellite system, BDS), a quasi-zenith satellite system (quasi-zenith satellite system, QZSS), and/or a satellite-based augmentation system (satellite based augmentation systems, SBAS).

The electronic device 100 implements the display function by using the GPU, the display screen 194, the application processor, and the like. The GPU is a microprocessor for image processing, and is connected to the display screen 194 and the application processor. The GPU is configured to perform mathematical and geometric calculation, and is configured to render an image. The processor 110 may include one or more GPUs that execute a program instruction to generate or change display information.

The display screen 194 is configured to display an image, a video, and the like. The display screen 194 includes a display panel. The display panel may be made of a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a Miniled, a MicroLed, a micro-oLed, a quantum dot light-emitting diode (quantum dot light emitting diodes, QLED), or the like. In some embodiments, the electronic device 100 may include one or N display screens 194, where N is a positive integer greater than 1.

In some embodiments of this application, when the display panel is made of a material such as an OLED, an AMOLED, or an FLED, the display screen 194 may be bent. Herein, that the display screen 194 may be bent means that the display screen may be bent to any angle at any part and may be maintained at the angle. For example, the display screen 194 may be folded in half. In this application, the display screen that may be bent is referred to as a foldable display screen.

Figure 3:
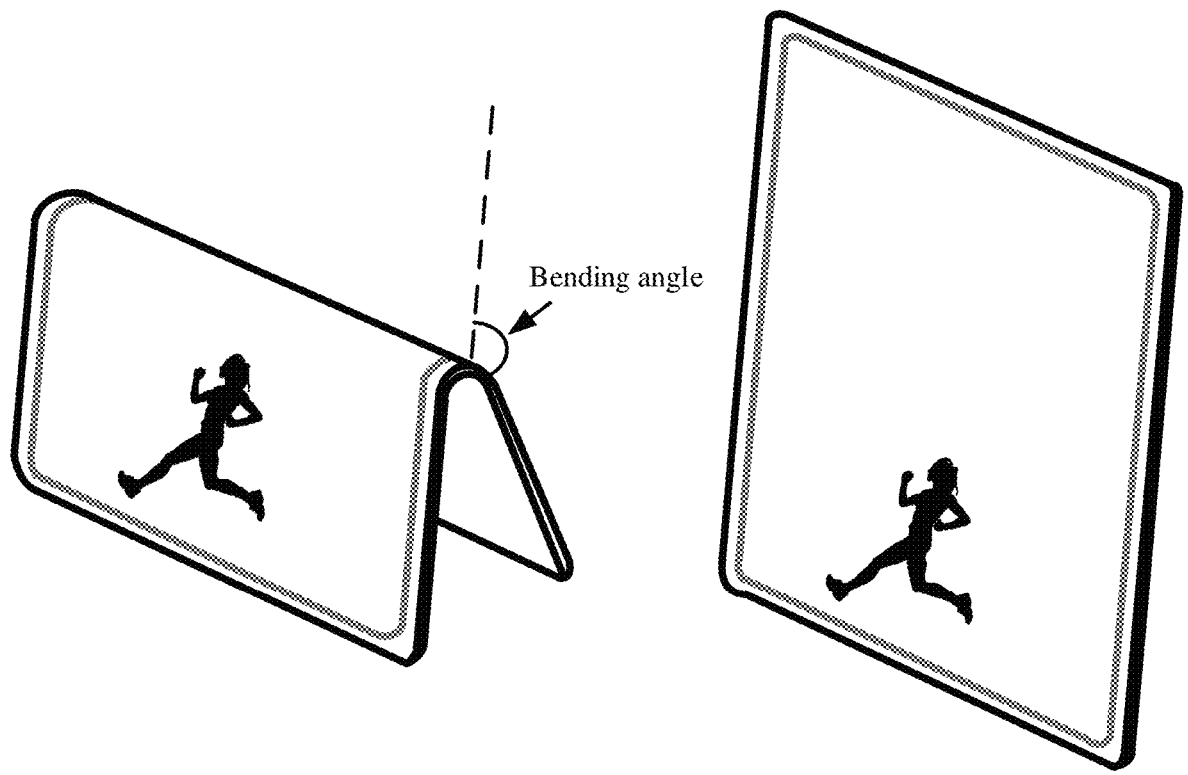
FIG. 3 is a schematic diagram of a status of a foldable display screen according to this application.

Referring to FIG. 3, the foldable display screen has two statuses. As shown in the accompanying drawing on the right side of FIG. 3, the foldable display screen may be in an expanded state, in other words, the display screen has no bending angle. As shown in the accompanying drawing on the left side of FIG. 3, the foldable display screen may further be in a folded state, in other words, the display screen has a bending angle. Herein, the bending angle of the display screen refers to an angle difference between the display screen in the folded state and the display screen in the expanded state. In this application, the foldable display screen may be bent outwards, or may be bent inwards. In some embodiments, the bending angle of the foldable display screen may range from 0 degrees to +180 degrees. For example, the display screen may be bent inwards by 30 degrees, or may be bent outwards by 30 degrees.

When the foldable display screen is in the folded state, the display screen may display, in only some areas, interface content currently output by a system of the electronic device 100, or may display, in all areas, interface content currently output by a system of the electronic device 100. For example, referring to the accompanying drawing on the left side of FIG. 3, the folded display screen may be divided into a screen A and a screen B. Only the screen A may be configured to display the interface content output by the system, or the screen A and the screen B may alternatively be configured to display different interface content output by the system.

When the foldable display screen is in the expanded state, the display screen may display, in full screen, the interface content currently output by the system of the electronic device 100. In a possible implementation, when the interface content is displayed in full screen, the interface content may occupy an entire display area of the display screen. In another possible implementation, the interface content may occupy only a part of a display area of the display screen. For example, when the display screen is an abnormally cut screen (notch screen), the interface content is displayed in a middle part of the abnormally cut screen, and a black screen occurs on a side edge or edges of two sides. It may also be considered that the display screen displays the interface content in full screen.

In some embodiments of this application, the electronic device 100 may be provided with a display screen with a relatively large size (for example, a display screen of 5 inches or larger).

The electronic device 100 may implement the photographing function by using the ISP, the camera 193, the video codec, the GPU, the display screen 194, the application processor, and the like.

The ISP is configured to process data fed back by the camera 193. For example, during photographing, a shutter is opened, a ray of light is transmitted to a light-sensitive element of a camera through a lens, and an optical signal is converted into an electrical signal. The light-sensitive element of the camera transmits the electrical signal to the ISP for processing, and converts the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An object is projected to the light-sensitive element through the lens to generate an optical image. The light-sensitive element may be a charge coupled device (charge coupled device, CCD) or a complementary metal-oxide-semiconductor (complementary metal-oxide-semiconductor, CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal. In addition to a digital image signal, the digital signal processor may further process another digital signal. For example, when the electronic device 100 selects a frequency, the digital signal processor is configured to perform Fourier transform on frequency energy.

The video codec is configured to compress or decompress a digital video. The electronic device 100 may support one or more video codecs. In this way, the electronic device 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a transfer mode between human brain neurons, and may further continuously perform self-learning. Applications such as intelligent cognition of the electronic device 100 may be implemented through the NPU, for example, image recognition, facial recognition, speech recognition, and text understanding.

The external memory interface 120 may be configured to connect to an external memory card, for example, a micro SD card, to extend a storage capability of the electronic device 100. The external memory card communicates with the processor 110 through the external memory interface 120, to implement a data storage function. For example, a file such as music or a video is stored in the external memory card.

The internal memory 121 may be configured to store computer-executable program code, and the executable program code includes an instruction. The processor 110 runs the instruction stored in the internal memory 121 to perform various function applications and data processing of the electronic device 100. The internal memory 121 may include a program storage area and a data storage area. The program storage area may store an operating system, an application required by at least one function (for example, a voice playing function or an image playing function), and the like. The data storage area may store data (such as audio data and an address book) created during use of the electronic device 100, and the like. In addition, the internal memory 121 may include a high-speed random access memory, and may further include a nonvolatile memory, for example, at least one magnetic disk storage device, a flash storage device, or a universal flash storage (universal flash storage, UFS).

The electronic device 100 can implement an audio function such as music playing or recording by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to code and decode an audio signal. In some embodiments, the audio module 170 may be disposed in the processor 110, or some function modules in the audio module 170 are disposed in the processor 110.

The speaker 170A, also referred to as a "loudspeaker", is configured to convert an audio electrical signal into a sound signal. The electronic device 100 may listen to music or answer a hands-free call by using the speaker 170A.

The receiver 170B, also referred to as an "earpiece", is configured to convert an audio electrical signal into a sound signal. When the electronic device 100 answers a call or receives voice information, the receiver 170B may be placed close to a human ear to listen to a voice.

The microphone 170C, also referred to as a "mic" or a "sound conducting device", is configured to convert a sound signal into an electrical signal. When making a call or sending voice information, a user may make a sound by moving a human mouth close to the microphone 170C to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, reduce noise, and further identify a sound source, implement a directional recording function, and the like.

The headset jack 170D is configured to connect to a wired headset. The headset jack 170D may be the USB interface 130, or may be a 3.5 mm open mobile electronic device platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed in the display screen 194. There are many types of pressure sensors 180A such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on a capacitance change. When a touch operation is performed on the display screen 194, the electronic device 100 detects intensity of the touch operation by using the pressure sensor 180A. The electronic device 100 may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a messages application icon, an instruction for viewing an SMS message is executed. When a touch operation whose touch operation intensity is greater than or equal to a first pressure threshold is performed on the messages application icon, an instruction for creating a new SMS message is executed.

The gyro sensor 180B may be configured to determine a motion posture of the electronic device 100. In some embodiments, an angular velocity of the electronic device 100 around three axes (namely, x, y, and z axes) may be determined by using the gyro sensor 180B. The gyro sensor 180B may be configured to perform image stabilization during photographing. For example, when the shutter is pressed, the gyro sensor 180B detects an angle at which the electronic device 100 jitters, obtains, through calculation based on the angle, a distance for which a lens module needs to compensate, and allows the lens to cancel the jitter of the electronic device 100 through reverse motion, to implement image stabilization. The gyro sensor 180B may be further used in a navigation scenario and a somatic game scenario. In some embodiments, the gyro sensor 180B may be configured to obtain the bending angle of the foldable display screen. For example, gyro sensors are respectively installed below the screen A and the screen B of the foldable display screen. Data obtained by the gyro sensors is compared, to determine the bending angle of the screen based on a comparison result.

The barometric pressure sensor 180C is configured to measure atmospheric pressure. In some embodiments, the electronic device 100 calculates an altitude based on a value of the atmospheric pressure measured by using the barometric pressure sensor 180C, to assist positioning and navigation.

The magnetic sensor 180D includes a Hall sensor. The electronic device 100 may detect opening/closing of a flip leather case by using the magnetic sensor 180D. In some embodiments, when the electronic device 100 is a clamshell phone, the electronic device 100 may detect opening/closing of a flip cover by using the magnetic sensor 180D. Further, a feature such as automatic unlocking of the flip cover is set based on a detected opening/closing state of the leather case or a detected opening/closing state of the flip cover.

The acceleration sensor 180E may detect magnitude of accelerations in various directions (usually on three axes) of the electronic device 100, and may detect magnitude and a direction of the gravity when the electronic device 100 is still. The acceleration sensor 380E may be further configured to identify a posture of the electronic device, and is applied to an application such as switching between landscape orientation and portrait orientation or a pedometer.

The distance sensor 180F is configured to measure a distance. The electronic device 100 may measure the distance in an infrared or a laser manner. In some embodiments, in a photographing scenario, the electronic device 100 may measure the distance by using the distance sensor 180F to implement quick focusing.

For example, the optical proximity sensor 180G may include a light-emitting diode (LED) and an optical detector, for example, a photodiode. The light emitting diode may be an infrared light-emitting diode. The electronic device 100 emits infrared light through the light-emitting diode. The electronic device 100 detects infrared reflected light from a nearby object through the photodiode. When detecting sufficient reflected light, the electronic device 100 may determine that there is an object near the electronic device 101. When detecting insufficient reflected light, the electronic device 100 may determine that there is no object near the electronic device 100. The electronic device 100 may detect, by using the optical proximity sensor 180G, that the user holds the electronic device 100 close to an ear to make a call, to automatically perform screen-off for power saving. The optical proximity sensor 180G may also be used in a flip cover mode or a pocket mode to automatically unlock or lock the screen.

The ambient light sensor 180L is configured to sense ambient light brightness. The electronic device 100 may adaptively adjust brightness of the display screen 194 based on the sensed ambient light brightness. The ambient light sensor 180L may also be configured to automatically adjust a white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy by using the temperature detected by using the temperature sensor 180J. For example, when the temperature reported by the temperature sensor 180J exceeds a threshold, the electronic device 100 lowers performance of a processor located near the temperature sensor 180J, to reduce power consumption to implement thermal protection. In some other embodiments, when the temperature is less than another threshold, the electronic device 100 heats the battery 142 to prevent the electronic device 100 from being shut down abnormally because of a low temperature. In some other embodiments, when the temperature is less than still another threshold, the electronic device 100 boosts an output voltage of the battery 142 to avoid abnormal shutdown caused by a low temperature.

The touch sensor 180K is also referred to as a "touch panel". The touch sensor 180K may be disposed in the display screen 194. The touch sensor 180K and the display screen 194 constitute a touchscreen. The touch sensor 180K is configured to detect a touch operation performed on or near the touch sensor 180K. The touch sensor may transfer a detected touch operation to the application processor, to determine a type of the touch event. Visual output related to the touch operation may be provided by using the display screen 194. In some other embodiments, the touch sensor 180K may also be disposed in a surface of the electronic device 100 at a location different from that of the display screen 194.

The bone conduction sensor 180M may obtain a vibration signal. In some embodiments, the bone conduction sensor 180M may obtain a vibration signal of a vibration bone of a human vocal-cord part. The bone conduction sensor 180M may also contact a body pulse to receive a blood pressure beating signal. In some embodiments, the bone conduction sensor 180M may also be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The angle sensor may be configured to obtain a bending angle of the display screen 194. In some embodiments, the angle sensor may be disposed in the display screen 194. In some embodiments, the angle sensor may be further configured to obtain a bending position of the display screen 194.

The key 190 includes a power key, a volume key, and the like. The key 190 may be a mechanical key, or may be a touch key. The electronic device 100 may receive a key input, and generate a key signal input related to a user setting and function control of the electronic device 100.

The motor 191 may generate a vibration prompt. The motor 191 may be used for an incoming call vibration prompt, or may be used for a touch vibration feedback. For example, touch operations performed on different applications (for example, photographing and audio playing) may correspond to different vibration feedback effects. The motor 191 may also correspond to different vibration feedback effects for touch operations performed on different areas of the display screen 194. Different application scenarios (for example, a time reminder, information receiving, an alarm clock, and a game) may also correspond to different vibration feedback effects. The touch vibration feedback effect may also be customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or detached from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may also be compatible with different types of SIM cards. The SIM card interface 195 may also be compatible with an external storage card. The electronic device 100 interacts with a network by using the SIM card, to implement a call function, a data communication function, and the like. In some embodiments, the electronic device 100 uses an eSIM, namely, an embedded SIM card. The eSIM card may be embedded into the electronic device 100, and cannot be separated from the electronic device 100.

A software system of the electronic device 100 may use a layered architecture, an event-driven architecture, a micro-kernel architecture, a micro service architecture, or a cloud architecture. In this embodiment of the present invention, an Android system of the layered architecture is used as an example to illustrate a software structure of the electronic device 100.

Figure 4:
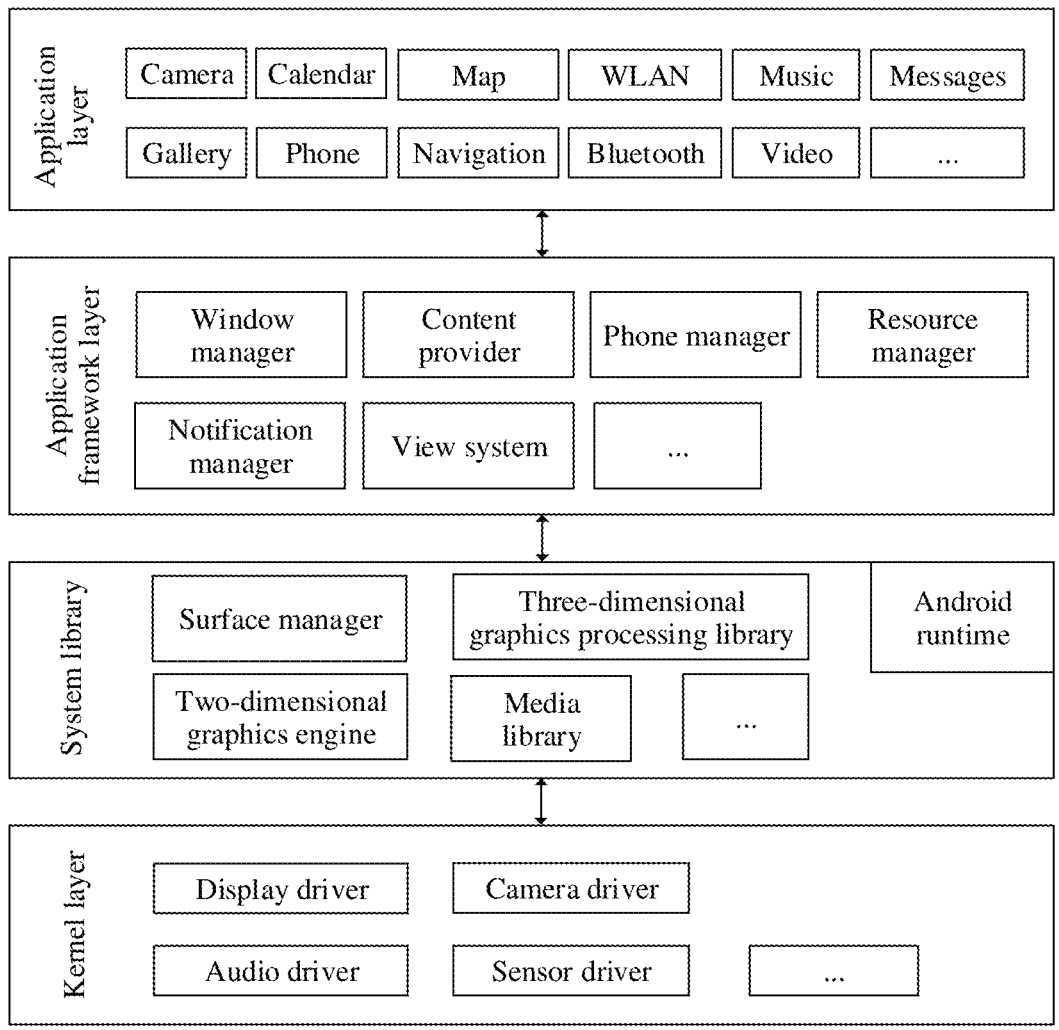
FIG. 4 is a block diagram of a software structure of a terminal according to this application.

FIG. 4 is a block diagram of a software structure of the electronic device 100 according to an embodiment of the present invention.

Software is divided into several layers by using the layered architecture, and each layer has a clear role and task. The layers communicate with each other through software interfaces. In some embodiments, the Android system is divided into four layers, namely, an application layer, an application framework layer, Android runtime (Android runtime), a system library, and a kernel layer from top to bottom.

The application layer may include a series of application packages.

As shown in FIG. 4, the application package may include applications such as "camera", "gallery", "calendar", "phone", "map", "navigation", "WLAN", "Bluetooth", "music", "video", and "messages".

The application framework layer provides an application programming interface (application programming interface, API) and a programming framework for an application at the application layer. The application framework layer includes some predefined functions.

As shown in FIG. 4, the application framework layer may include a desktop manager, a content provider, a view system, a phone manager, a resource manager, a notification manager, and the like.

The desktop manager is configured to manage a desktop program. The desktop manager may obtain a size of a display screen, determine whether there is a status bar, perform screen locking, take a screenshot of the display screen, and the like.

The content provider is configured to: store and obtain data, and make the data accessible to an application. The data may include a video, an image, audio, calls that are made and received, a browsing history and bookmarks, an address book, and the like.

The view system includes visual controls such as a control for displaying a text and a control for displaying an image. The view system may be configured to construct an application. A display interface may include one or more views. For example, a display interface including an SMS message notification icon may include a text display view and an image display view.

The phone manager is configured to provide a communication function for the electronic device 100, for example, management of a call status (including answering or declining).

The resource manager provides various resources such as a localized character string, an icon, an image, a layout file, and a video file for an application.

The notification manager enables an application to display notification information in a status bar, and may be configured to convey a notification message. The notification manager may automatically disappear after a short pause without requiring a user interaction. For example, the notification manager is configured to notify download completion, give a message notification, and the like. The notification manager may further be a notification that appears in a top status bar of the system in a form of a graph or a scroll bar text, for example, a notification of an application running on the background, or may be a notification that appears on the screen in a form of a dialog desktop. For example, text information is displayed in the status bar, an announcement is given, the electronic device vibrates, or the indicator light blinks.

The Android runtime includes a core library and a virtual machine. The Android runtime is responsible for scheduling and management of the Android system.

The core library includes two parts: a function that needs to be invoked in java language and a core library of Android.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of function modules, for example, a surface manager (surface manager), a media library (Media Libraries), a three-dimensional graphics processing library (for example, OpenGL ES), and a 2D graphics engine (for example, SGL).

The surface manager is configured to manage a display subsystem, and provide fusion of 2D and 3D image layers for a plurality of applications.

The media library supports playback and recording of a plurality of commonly used audio and video formats, static image files, and the like. The media library may support a plurality of audio and video coding formats such as MPEG 4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes an example of a working procedure of software and hardware of the electronic device 100 with reference to a photographing scenario.

When the touch sensor 180K receives a touch operation, a corresponding hardware interrupt is sent to the kernel layer. The kernel layer processes the touch operation into an original input event (including information such as touch coordinates or a time stamp of the touch operation). The original input event is stored at the kernel layer. The application framework layer obtains the original input event from the kernel layer, and identifies a control corresponding to the input event. An example in which the touch operation is a touch operation, and a control corresponding to the touch operation is a control of a camera application icon is used. The camera application invokes an interface of the application framework layer to enable the camera application, then enables the camera driver by invoking the kernel layer, and captures a static image or a video through the camera 193.

The following describes, based on the electronic device 100 shown in FIG. 2, the system navigation bar display method provided in this application.

The system navigation bar in this application is a virtual navigation bar. In other words, the system navigation bar is presented on the display screen of the electronic device 100 in a form of a virtual icon. The virtual navigation bar occupies a part of the display area of the display screen of the electronic device.

The system navigation bar is a system-level navigation bar, and provides a system-level navigation function. The system-level navigation bar is different from an application-level navigation bar. The application-level navigation bar can display and provide a navigation function only when the electronic device displays an interface of an application, and supports switching between different interfaces of a same application. The system navigation bar can display and provide a navigation function on any interface displayed on the display screen, and support switching between different interfaces of a same application and switching between interfaces of different applications.

Figure 5A:
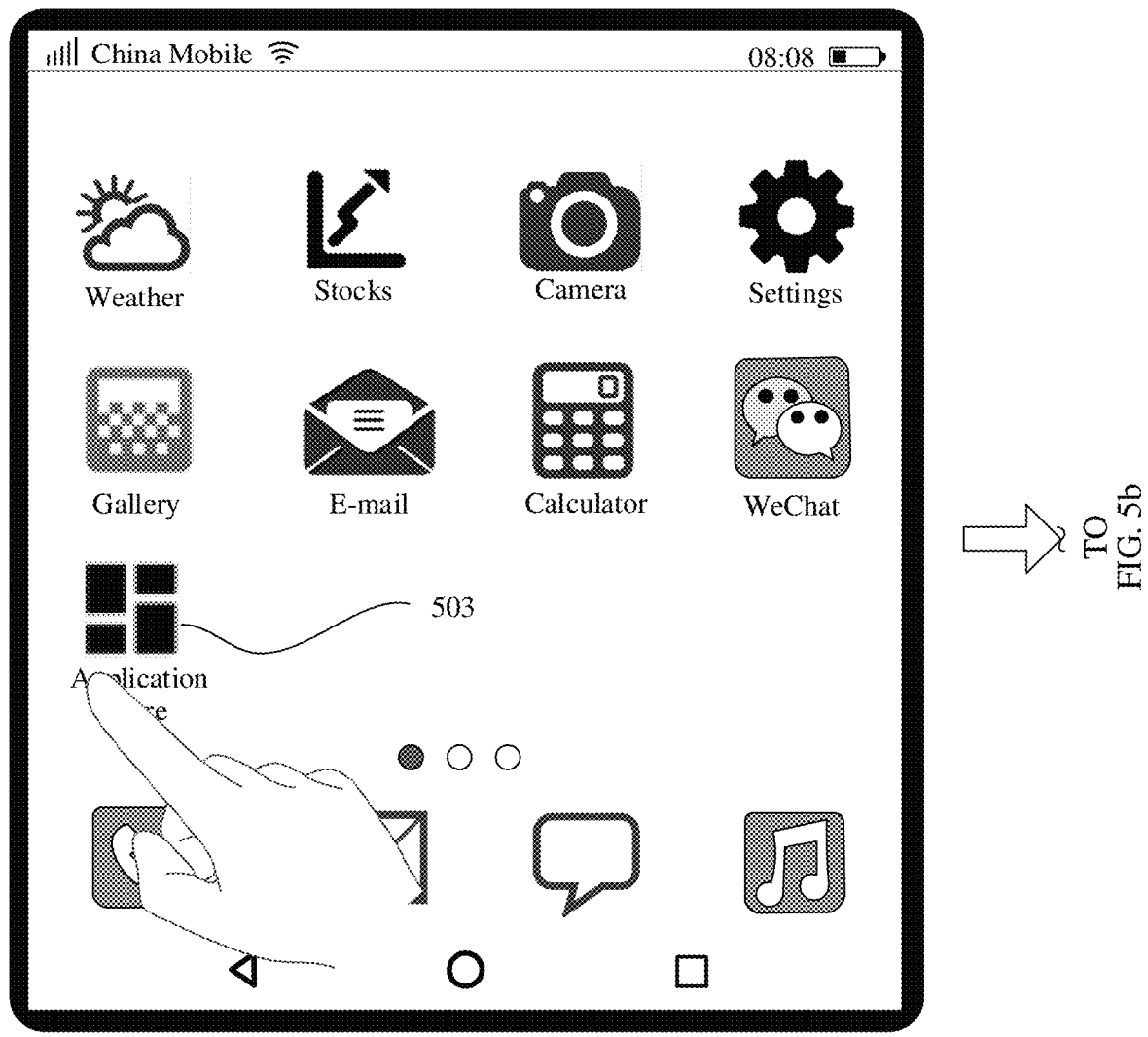
Figures 5B, 5C:
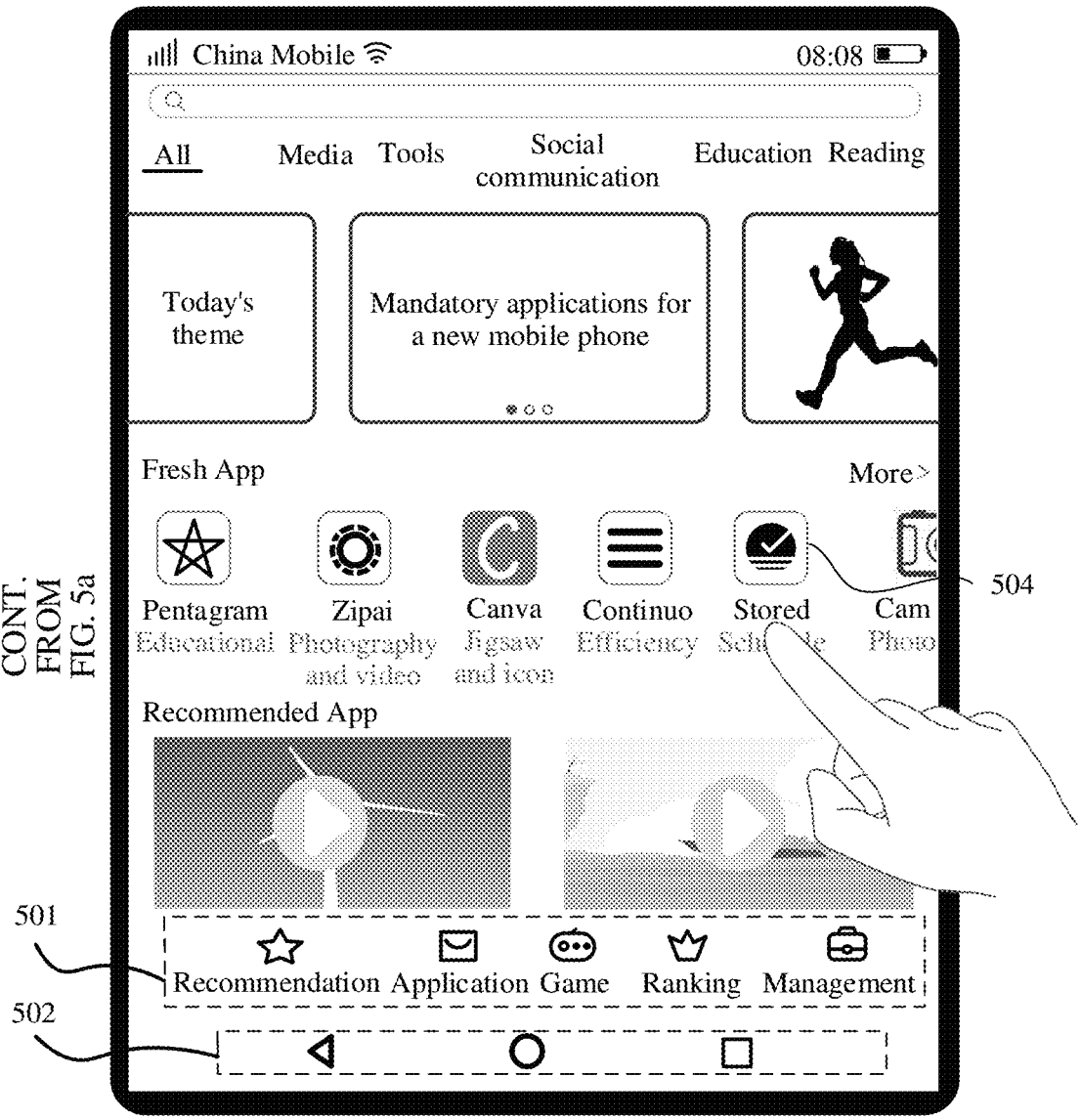
Figure 5C:
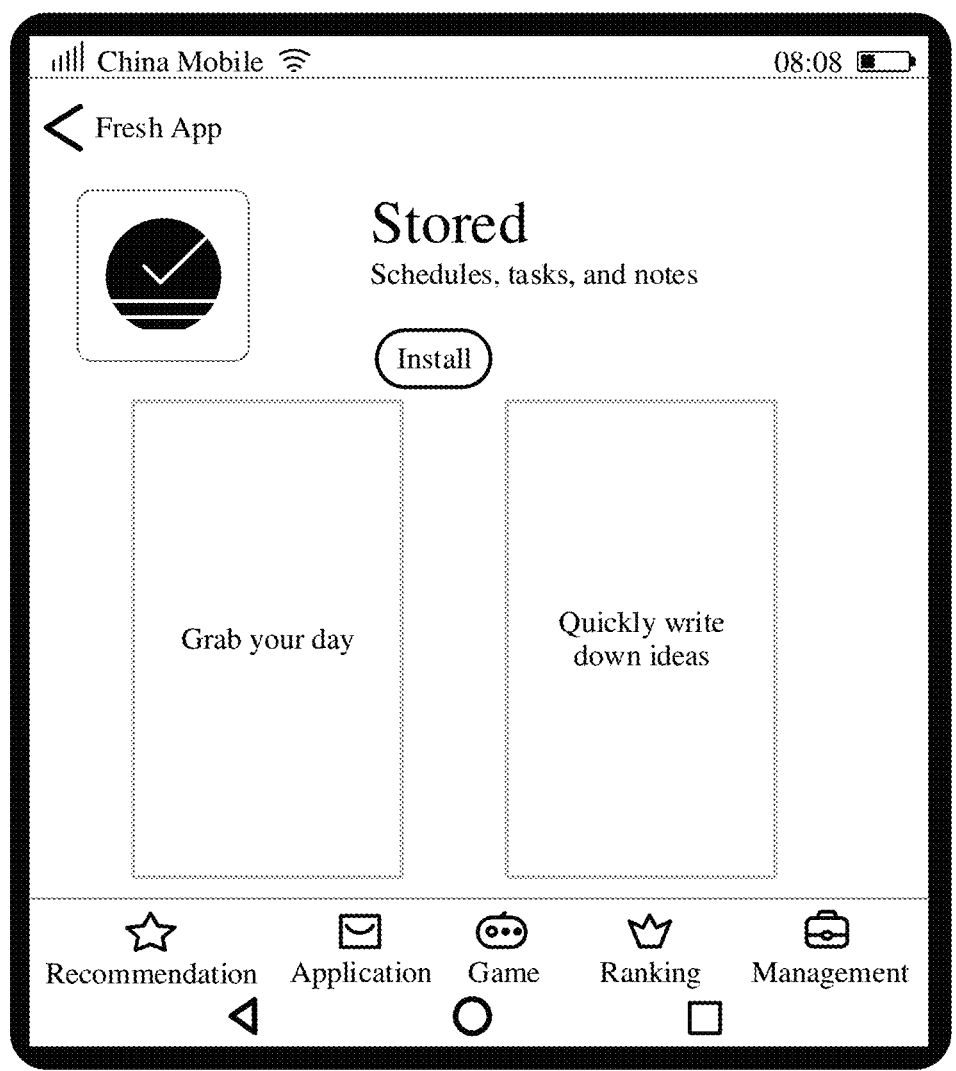

For example, referring to FIG. 5b, the display screen of the electronic device 100 is configured to display an interface currently output by the system. The interface is a main interface of an application store. An application-level navigation bar 501 is provided at the bottom of the main interface, and provides access for a user to switch between different interfaces (such as a recommended interface, a game interface, and a ranking interface) of the application store. A system-level navigation bar 502 is further displayed at the bottom of the display screen, and provides access for the user to switch between interfaces (for example, a home screen and another application interface).

In this application, navigation functions provided by the system navigation bar include but are not limited to the following types.

(1) Returning to a Previous Interface.

The display screen of the electronic device 100 is configured to display the interface currently output by the system, and the interface may be switched with an input user operation. Returning to a previous interface means that an interface displayed on the display screen changes from a current screen to a previous interface. The previous interface provides access for the user to enter the current interface displayed on the display screen. For example, the user may tap a control on the previous interface to enter the current interface.

In this application, the previous interface is related to a user operation. For example, when the user taps an instant messaging application icon on the desktop displayed on the display screen to enter a main interface of an instant messaging application, a previous interface of the main interface of the instant messaging application is the desktop. For another example, when the user enters a subinterface by using a main interface of an instant messaging application, a previous interface of the subinterface is the main interface of the instant messaging application. Herein, a main interface of an application is an interface displayed on the display screen when the electronic device 100 initially runs the application, and a subinterface of the application is an interface entered by the user based on access provided by the main interface.

For example, referring to FIG. 5a, the electronic device 100 initially displays the desktop. In response to a tap operation performed by the user on an icon 503 of the application store in FIG. 5a, the main interface of the application store shown in FIG. 5b is displayed, where icons, text/video introductions, and the like of a plurality of applications are displayed on the main interface of the application store. In response to an operation (for example, tapping) performed by the user on an icon 504 of a first application on the main interface of the application store, the electronic device 100 displays a download interface of the first application shown in FIG. 5c. The download interface of the first application displays text, a video introduction, an installation option, and the like of the first application. When the display screen displays the desktop, the main interface of the application store, or the download interface of the first application, a status bar may be further displayed at the top. The status bar may include an operator name (for example, China Mobile), time, a Wi-Fi icon, signal strength, a current residual capacity, and the like.

In a specific scenario shown in FIG. 5a to FIG. 5c, a previous interface of the main interface of the application store shown in FIG. 5b is the desktop shown in FIG. 5a. To be specific, when the display screen of the electronic device 100 displays the main interface of the application store shown in FIG. 5b, if the user uses the function of returning to a previous interface provided by the navigation bar, for example, taps a return key in the navigation bar 502—a leftward triangle, an interface displayed on the display screen jumps from the main interface of the application store to the desktop shown in FIG. 5a.

Similarly, the previous interface of the main interface of the application store shown in FIG. 5c is the desktop shown in FIG. 5b. To be specific, when the display screen of the electronic device 100 displays the download interface of the first application shown in FIG. 5c, if the user uses the function of returning to a previous interface provided by the navigation bar, an interface displayed on the display screen jumps from the download interface of the first application to the main interface of the application store shown in FIG. 5b.

(2) Returning to a Home Screen.

Returning to a home screen means that an interface displayed on the display screen changes from a current screen to the home screen.

The current interface is related to a user operation, and may be any interface other than the home screen. For example, the current interface may be the main interface of the application store shown in FIG. 5b, or may be a subinterface of the application store shown in FIG. 5c, or may be a display interface of another application.

Figure 1:
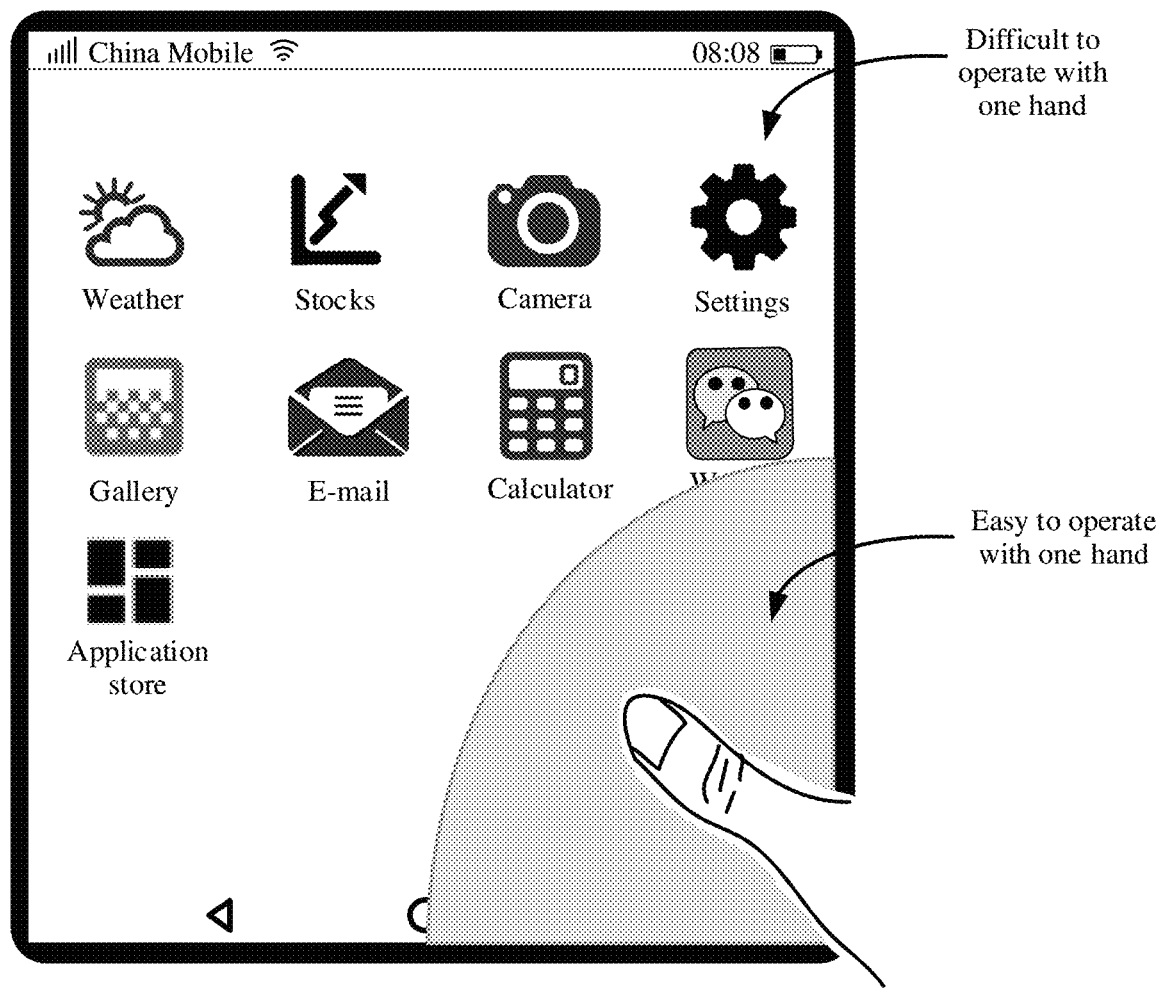
FIG. 1 is a schematic diagram of operating, by a user, an electronic device with one hand.

The home screen is an interface displayed after the electronic device is powered on and a lock screen (if there is the lock screen) is unlocked. In some possible embodiments, the home screen is a desktop shown in FIG. 1. When a relatively large quantity of applications have been installed on the electronic device 100, a plurality of interfaces shown in FIG. 5a may be required to respectively display different application icons. In this case, the home screen may be any one of the plurality of interfaces. The user uses the function of returning to a home screen provided by the navigation bar, for example, taps a home screen key—a circular key in the navigation bar 502. In this case, an interface displayed on the display screen jumps from the current interface shown in FIG. 5b or FIG. 5c to a home screen shown in FIG. 5a.

(3) Displaying a Multitasking Interface.

The multitasking interface means that the display screen displays thumbnails or lists of opened applications of the electronic device 100. Herein, the thumbnails or the lists of the applications may be displayed in some areas of the display screen, and another display area of the display screen is blurred. Herein, the thumbnail of the application may be an interface displayed when the electronic device 100 exits the application, namely, a main interface or a subinterface of the application.

Herein, the applications may be displayed in a cascading manner based on time at which the user exits the applications, and a thumbnail of an application that exits later is displayed above a thumbnail of an application that exits earlier. Not limited to a manner of displaying in the cascading manner, in specific implementation, the thumbnails of the applications may be further displayed in a tiled manner. This is not limited herein. Herein, the thumbnail of the application may be an interface displayed when the electronic device 100 exits the application most recently, namely, a main interface or a subinterface of the application. The user uses the function of displaying multitasking provided by the navigation bar, for example, taps a multitasking key—a square key in the navigation bar 502. In this case, an interface displayed on the display screen jumps from a current interface to the multitasking interface.

(4) Displaying a Notification Bar.

Herein, the notification bar may include: an operator name (for example, China Mobile), time, a Wi-Fi icon, signal strength, a current residual capacity, a shortcut on/off key of some functions (for example, Bluetooth, Wi-Fi, and one-touch screen lock) of the electronic device 100, an unread message (for example, an instant messaging application (for example, Facebook, Twitter, or WeChat (WeChat)) message) received by a running application, and the like.

In this application, when the notification bar is displayed by using the system navigation bar, the notification bar may be displayed, in a floating manner, on the interface content currently output by the system of the electronic device 100.

In a possible implementation, displaying the notification bar in the floating manner means that the display screen simultaneously displays the interface content output by the system and the notification bar, and the notification bar is displayed in the cascading manner above the interface content. Herein, when the display screen displays the interface content and the notification bar in the cascading manner, the notification bar may be transparent. In other words, the user may view some of the interface content in an area of the notification bar. Alternatively, the notification bar may not be transparent. In other words, the user cannot view content in the interface content in an area of the notification bar. This is not limited herein.

In another possible implementation, displaying the notification bar in the floating manner means that when the display screen displays interface content, an area in which the notification bar is located on the display screen is not used to display the interface content, but is used to display the notification bar.

In addition to the foregoing several navigation functions of the system navigation bar, the system navigation bar in this application may further include other functions, for example, functions of entering an auxiliary application (for example, a voice assistant), an instant messaging application (for example, Facebook, Twitter, or WeChat (WeChat)), settings, and a browser interface.

The foregoing describes the several navigation functions provided by the system navigation bar in this application. The following describes a manner in which the system navigation bar implements the foregoing navigation functions. In this application, the system navigation bar may implement a navigation function with reference to a user gesture. The following describes several possible implementations in detail.

(1) A Three-Key System Navigation Bar Implements a Navigation Function by Using a Tap Operation or a Long Press Operation.

In a possible implementation of this application, the system navigation bar may provide a plurality of virtual keys, and each virtual key has a different navigation function.

Figure 6A:
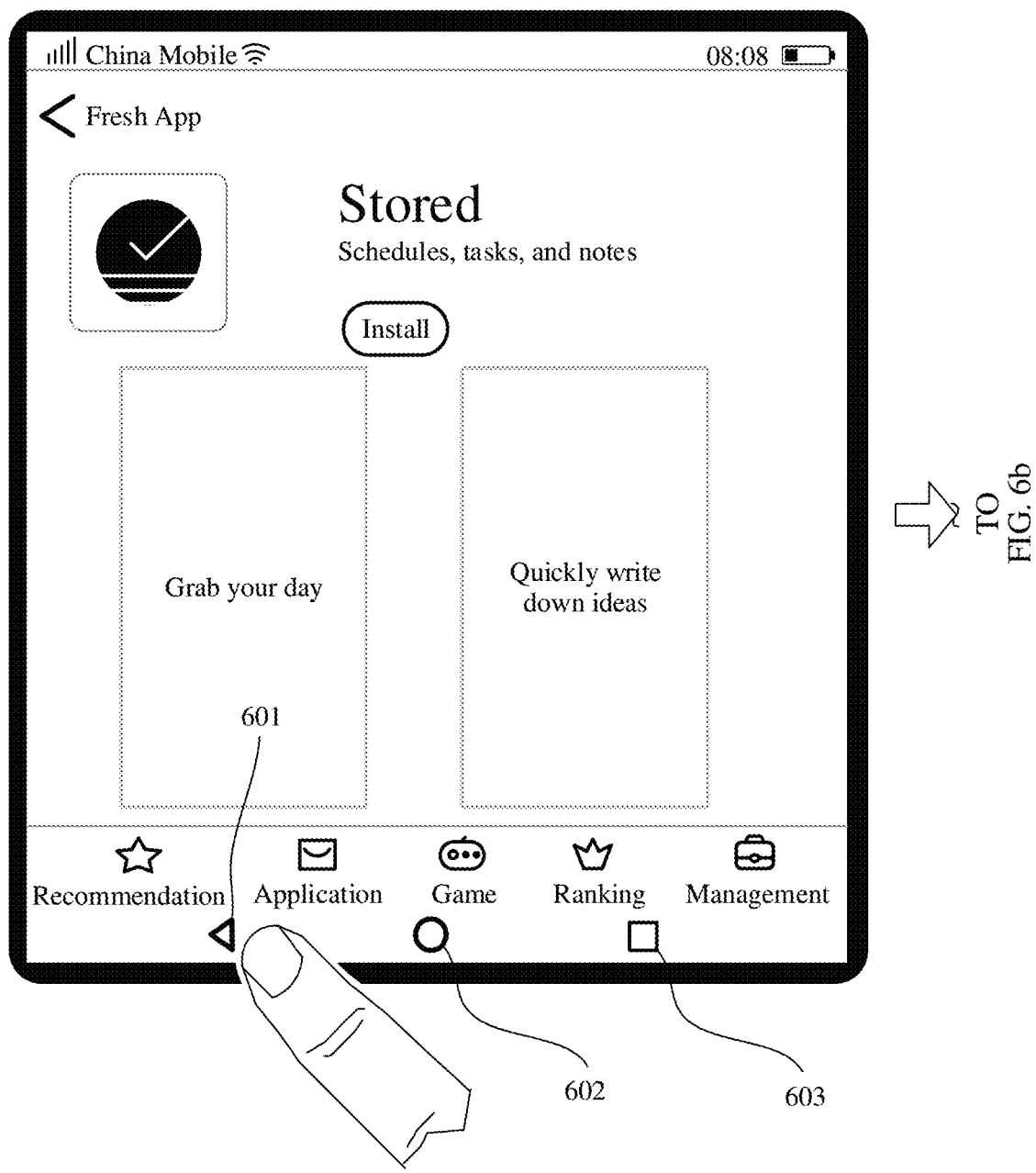
Figure 6B:
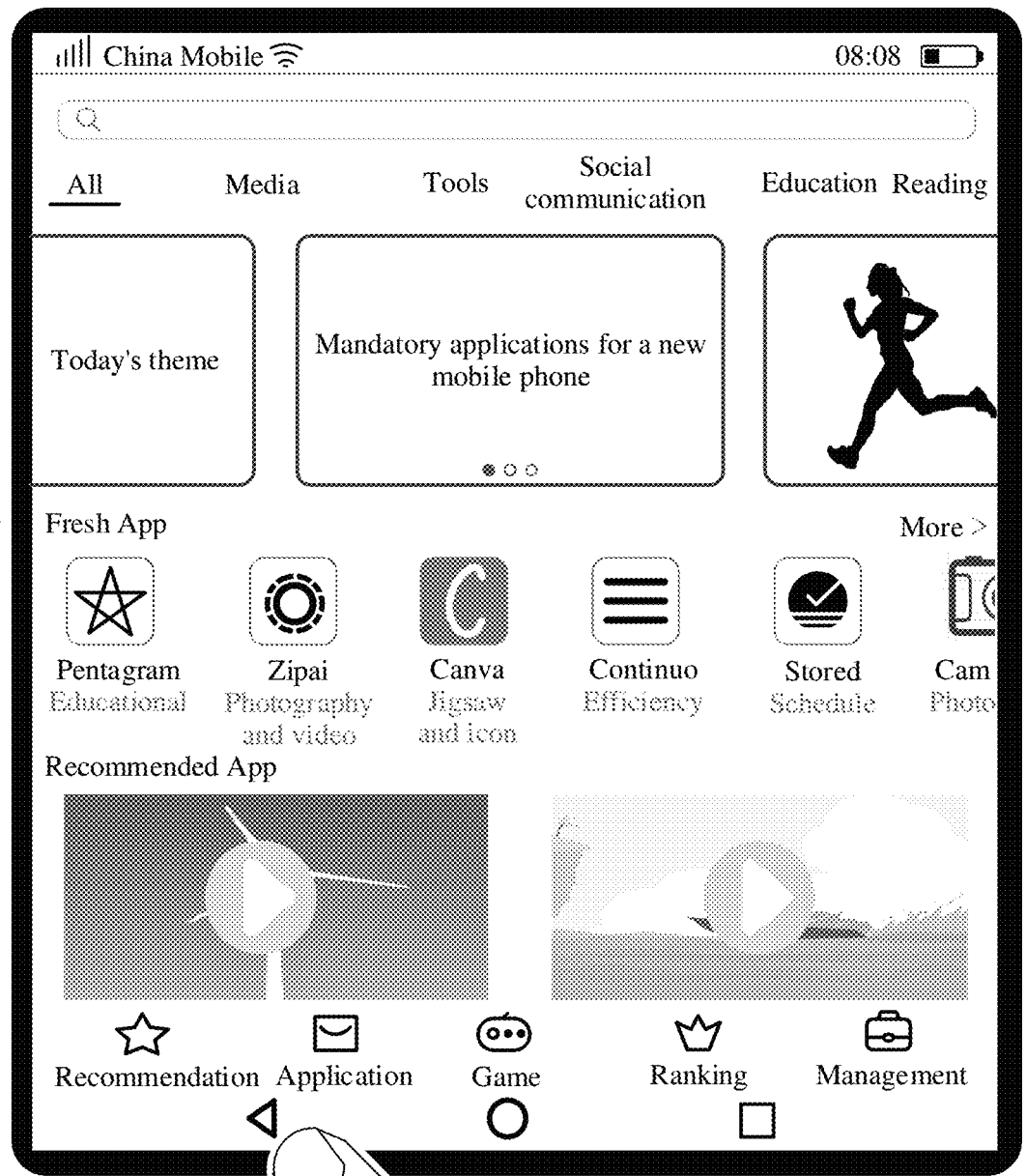
Figure 6C:
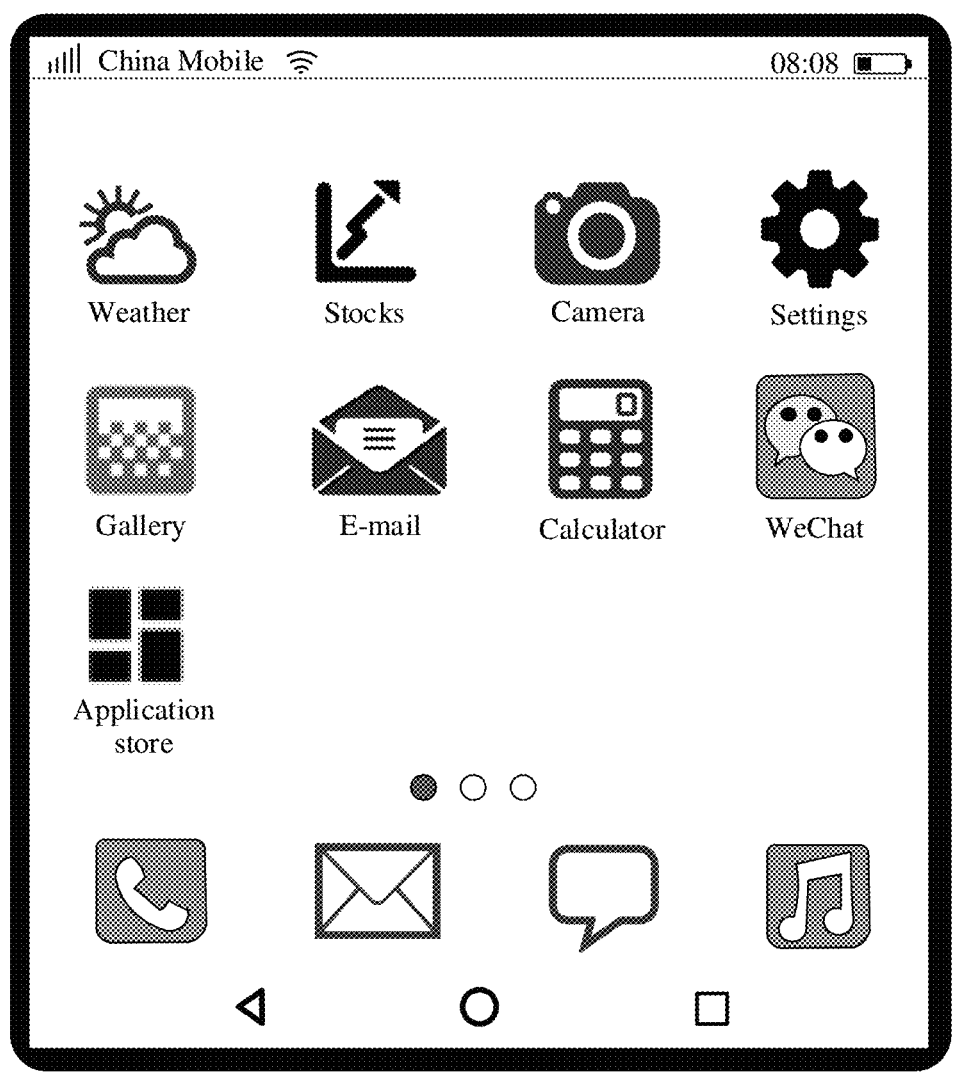

For example, FIG. 6a to FIG. 6c show a possible system navigation bar. As shown in FIG. 6a, the system navigation bar provides three virtual navigation keys, and the virtual navigation keys are respectively a return key 601, a home screen key 602, and a multitasking key 603 from left to right.

The following describes a possible implementation of a navigation function in this application with reference to the three virtual navigation keys.

(a) The user may tap the return key 601, so that the display screen of the electronic device 100 returns to a previous interface. The tap operation may be performed by using any part of one hand of the user, or may be implemented by using an operation such as a floating operation or an eye movement operation.

In a specific example, the user enters the display interface in FIG. 5c by performing the steps in the embodiment shown in FIG. 5a to FIG. 5c. To be specific, a current display screen is shown in FIG. 6a (that is, the display screen displays the download interface of the first application). The user may tap the return key 601 in the system navigation bar in FIG. 6a. In response to the tap operation, as shown in FIG. 6b, the display screen displays the previous interface (namely, the main interface of the application store) of the download interface of the first application. Further, the user may further tap the return key 601 in the system navigation bar in FIG. 6b. In response to the tap operation, as shown in FIG. 6c, the display screen displays the previous interface (namely, the desktop) of the main interface of the application store.

Herein, because there is no previous interface of the desktop, the return key 601 in the system navigation bar in FIG. 6c may not be configured to receive a user operation (for example, a tap operation). In some embodiments, grayscale processing may be performed on the return key 601 in the system navigation bar in FIG. 6c, to indicate the user that there is no previous interface of the desktop.

(b) The user may tap the home screen key 602, so that an interface displayed on the display screen of the electronic device 100 changes to the home screen. The tap operation may be performed by using any part of the hand of the user.

Figure 7A:
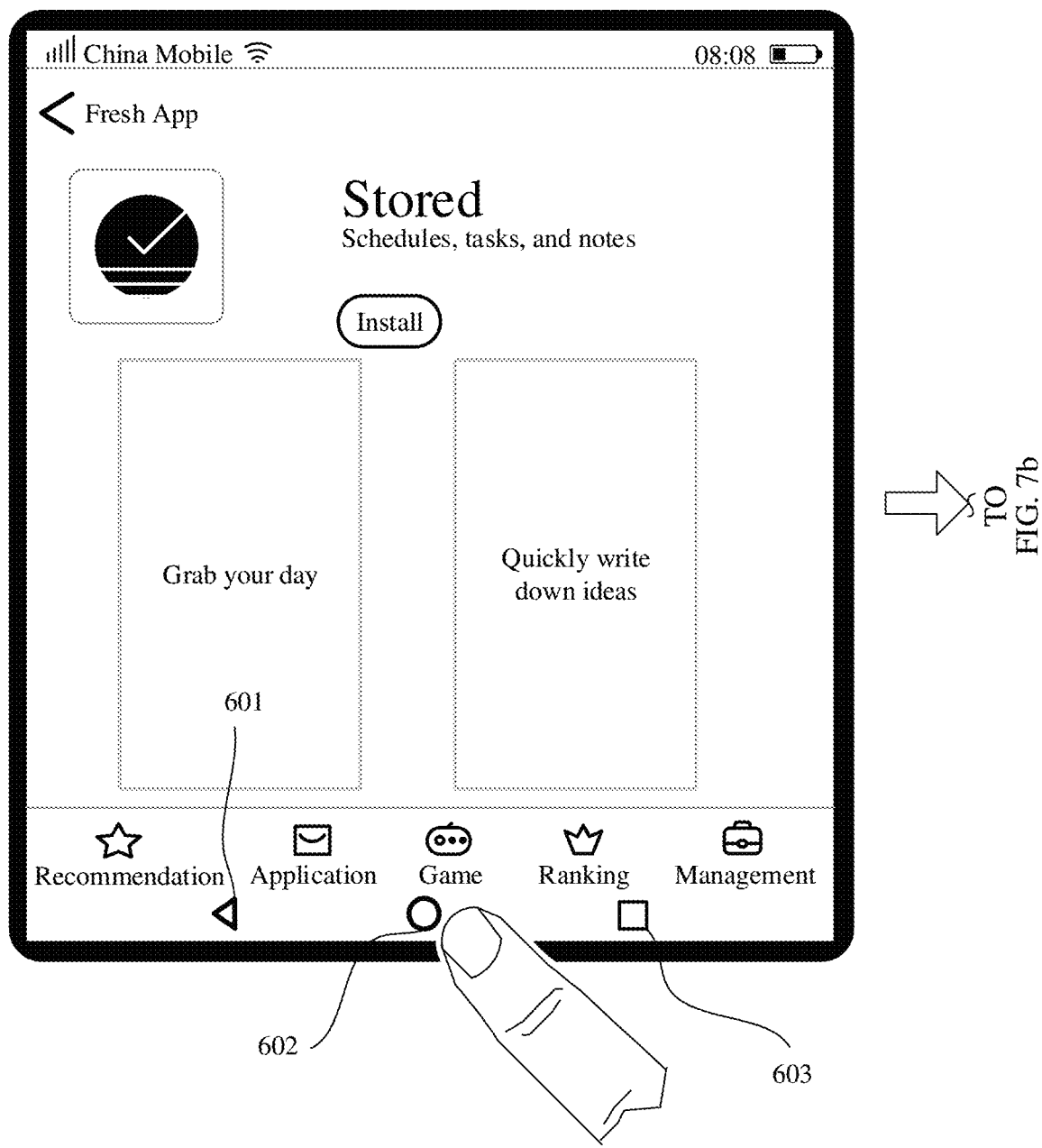
Figure 7B:
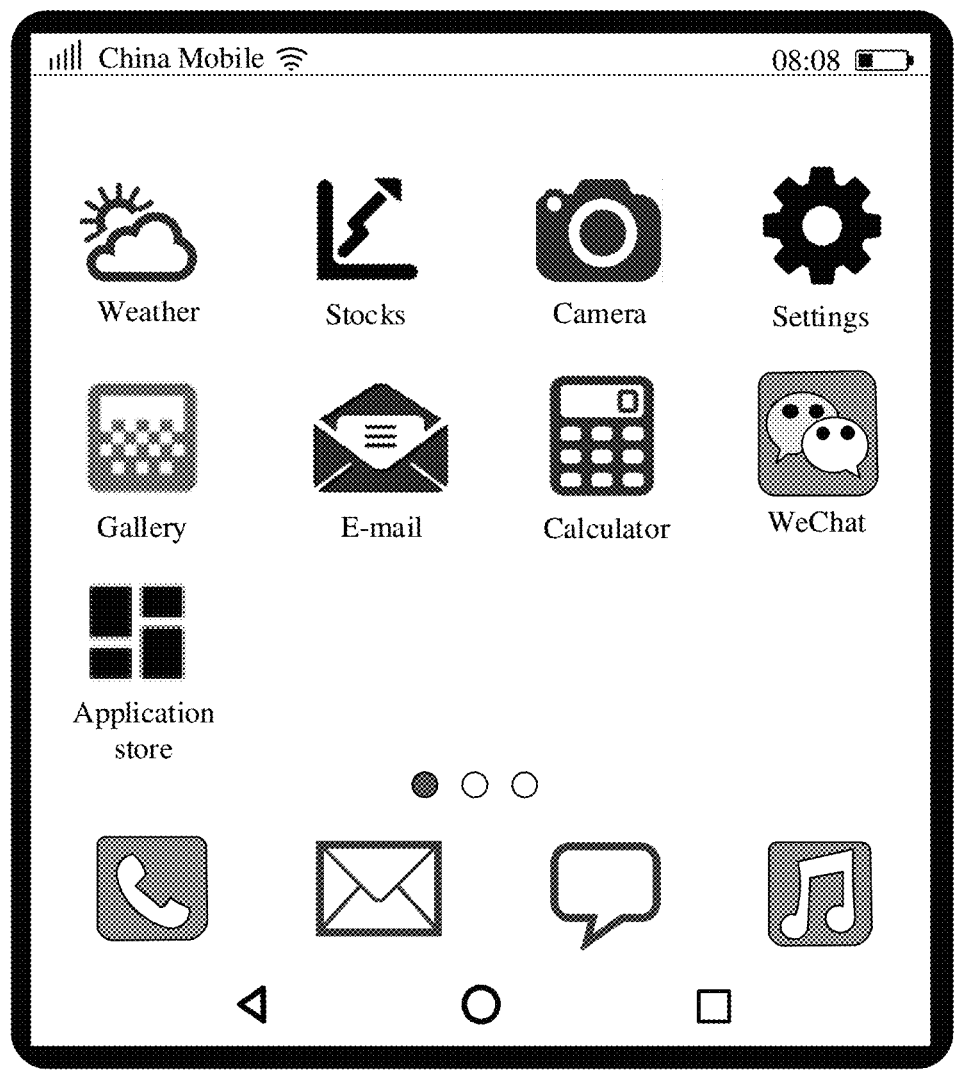

For example, referring to FIG. 7a and FIG. 7b, in a specific example, the user enters the display interface in FIG. 5c by performing the steps in the embodiment shown in FIG. 5a to FIG. 5c. To be specific, a current display screen is shown in FIG. 7a (that is, the display screen displays the download interface of the first application). The user may tap the home screen key 602 in the system navigation bar in FIG. 7a. In response to the tap operation, as shown in FIG. 7b, the display screen displays the home screen (namely, the desktop).

(c) The user may tap the multitasking key 603, so that an interface displayed on the display screen of the electronic device 100 changes to the multitasking interface. The tap operation may be performed by using any part of the hand of the user, such as a finger pad, a fingertip, a knuckle, or an elbow.

Figure 8A:
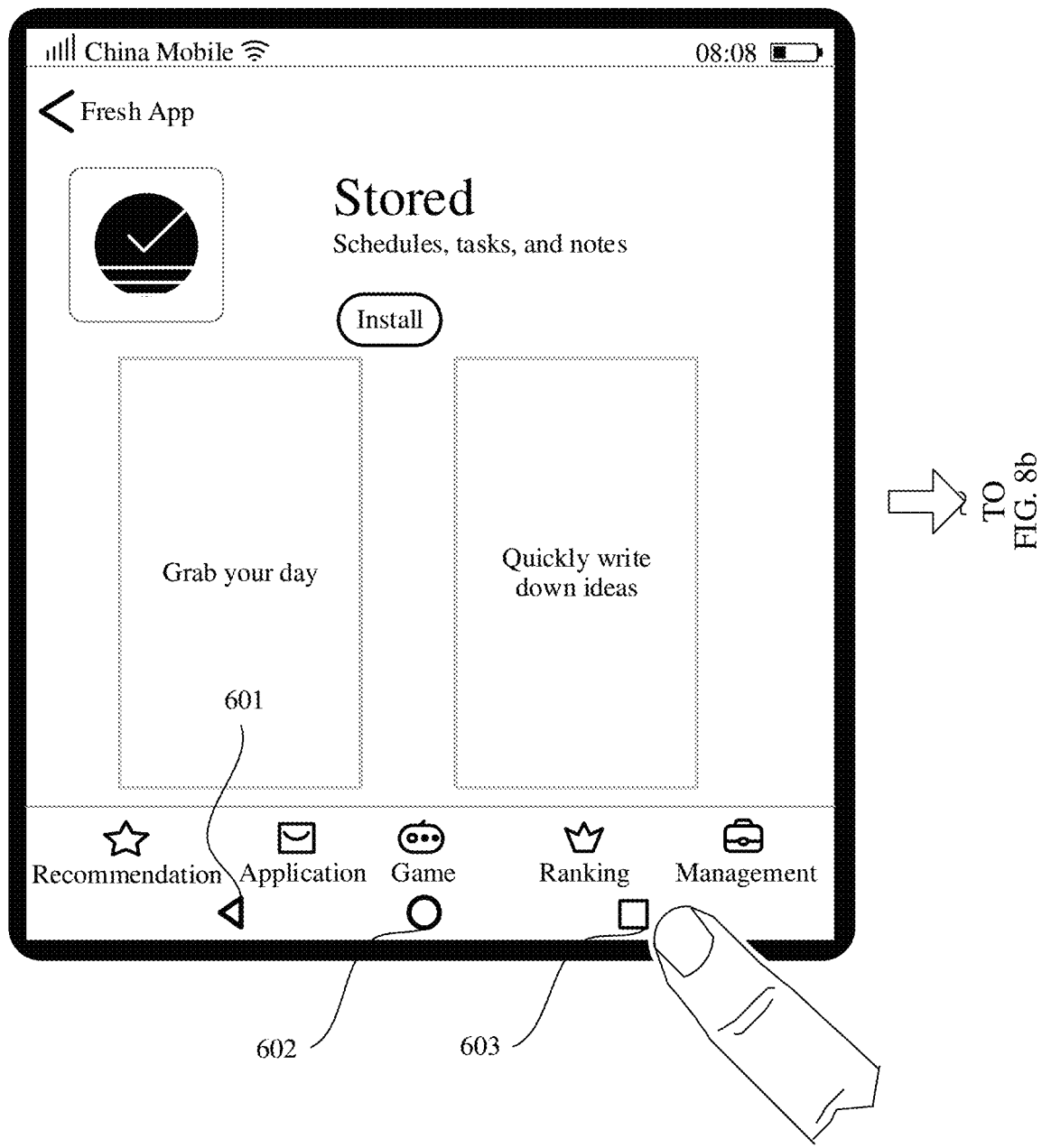
Figure 8B:
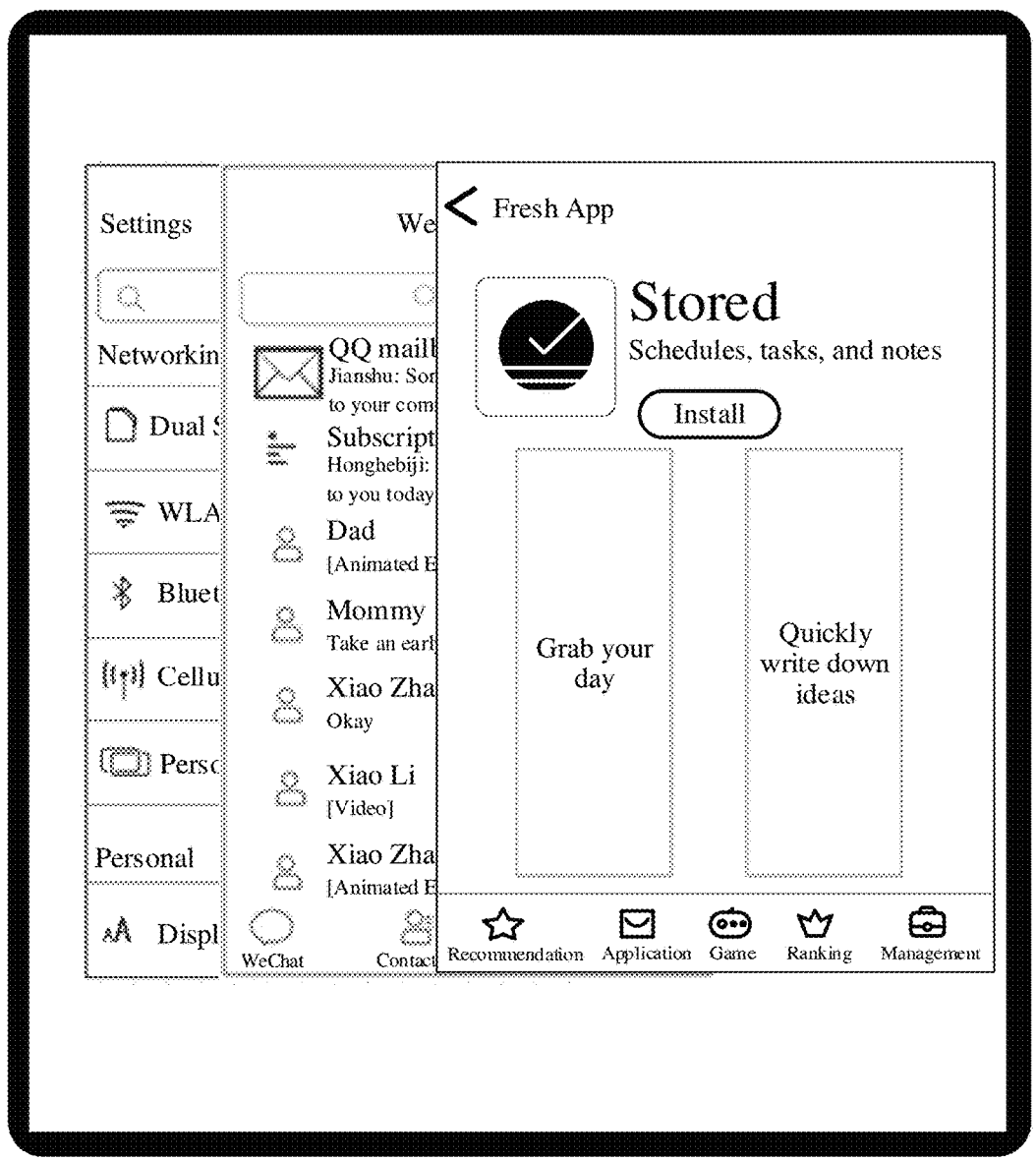

For example, referring to FIG. 8a and FIG. 8b, in a specific example, the user enters the display interface in FIG. 5c by performing the steps in the embodiment shown in FIG. 5a to FIG. 5c. To be specific, a current display screen is shown in FIG. 8a (that is, the display screen displays the download interface of the first application). The user may tap the multitasking key 603 in the system navigation bar in FIG. 8a. In response to the tap operation, as shown in FIG. 8b, the display screen displays the multitasking interface.

In some embodiments, the display screen of the electronic device 100 displays the thumbnails of the applications in the cascading manner based on the time at which the applications exit. For example, as shown in FIG. 8b, the user exits the application store at the latest. Therefore, a thumbnail of the subinterface (namely, the download interface of the first application) of the application store is displayed in the cascading manner above a thumbnail of another application.

(d) The user may long press the home screen key 602, so that the electronic device 100 runs the auxiliary application (for example, the voice assistant), and the display screen displays an interface of the auxiliary application. The tap operation may be performed by using any part of the hand of the user.

Not limited to the foregoing several navigation manners, in specific implementation, this application may further include another navigation manner. For example, the user long presses the multitasking key 603 to enter a split-screen mode.

Herein, the tap operation mentioned above refers to that duration for which the hand of the user touches the display screen is within a preset value, and the long press operation refers to that duration for which the hand of the user touches the display screen exceeds the preset value. The preset value may be preset.

It may be understood that the foregoing navigation manners shown in FIG. 6a to FIG. 8b are merely examples for description, and should not be construed as a limitation.

An arrangement sequence of the three virtual keys in the system navigation bar in FIG. 6a to FIG. 8b is not limited. In specific implementation, the three virtual keys may be arranged in another sequence. For example, positions of the return key and the multitasking key may be exchanged. To be specific, the return key is arranged on the right side, and the multitasking key is arranged on the left side.

Not limited to the three virtual keys provided by the system navigation bar in FIG. 6a to FIG. 8b, the system navigation bar in this application may further include more or fewer virtual keys. A navigation function of each virtual key is not limited to a default setting of the electronic device, and may be further customized by the user. This is not limited herein.

For example, the system navigation bar may further include a notification bar key. The user may tap the notification bar key, so that the display screen of the electronic device 100 displays the notification bar on the current interface in the floating manner.

For another example, the system navigation bar may further include a hide key. The user may tap the hide key, so that the electronic device 100 hides the system navigation bar. In other words, the display screen does not display the system navigation bar. In some embodiments, not only the user may hide the system navigation bar by tapping the hide key, but also the electronic device 100 may automatically hide the system navigation bar when a video is displayed in full screen or a game interface is entered in full screen.

In some embodiments, the system navigation bar shown in FIG. 6a to FIG. 6c may be transparent to some extent. In other words, the user may view some content on the desktop through the system navigation bar. Alternatively, the system navigation bar shown in FIG. 6a to FIG. 6c may not be transparent. In other words, the user cannot view the desktop through the system navigation bar. This is not limited herein.

In the foregoing case (1), the virtual keys included in the system navigation bar, the arrangement sequence of the virtual keys, the navigation function implemented by combining each virtual key with the gesture, and the like are not limited to default settings of the electronic device 100 at delivery, and may be further independently set by the user. Specifically, the user may select proper setting information from a setting menu that includes a plurality of types of setting information to implement the system navigation bar, or the user may customize setting information based on a habit of the user.

(2) A Bar-Shaped System Navigation Bar Implements a Navigation Function in Combination with a Slide Gesture.

Figure 9:
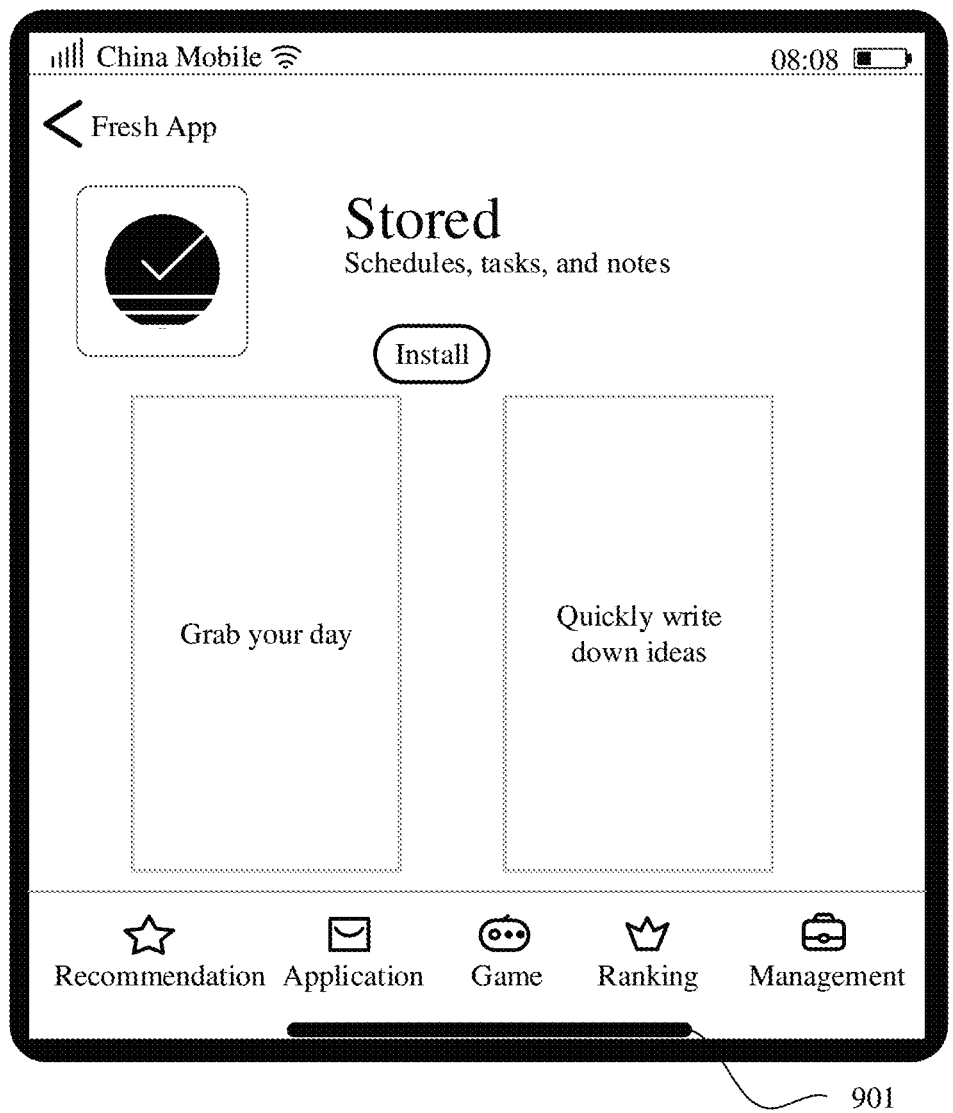

For example, FIG. 9 shows a possible system navigation bar. As shown in FIG. 9, the system navigation bar is a horizontal bar 901 displayed at the bottom of the display screen, and the user may implement the navigation function by using the slide gesture.

In some embodiments, the user may enable, by using a gesture of sliding from the horizontal bar 901 to an internal area of the display screen, the display screen of the electronic device 100 to display the home screen. The user may further enable, by using a gesture of sliding from the horizontal bar 901 to the internal area of the display screen, and pausing for a period of time, the display screen of the electronic device 100 to display the multitasking interface. The user may further touch and slide leftward or rightward the horizontal bar 901 to switch between multitasking interfaces. Herein, the slide gesture may be performed by using any part of the hand of the user.

Herein, relative to an edge area of the display screen, the internal area of the display screen is an area other than the edge area of the display screen. The edge area is a part in which the display screen is in contact with a non-display screen part.

It may be understood that the several implementations in which the system navigation bars implement the navigation functions in combination with the user gestures shown in the embodiments in FIG. 6a to FIG. 9 are merely examples. The system navigation bar in this application may alternatively implement the navigation function in combination with another user gesture.

In this application, a shape and a color of the system navigation bar, a shape, a size, an arrangement sequence, and the like of each interface element (including a virtual key, a horizontal bar, and the like) inside the system navigation bar are not limited to default settings of the electronic device 100 at delivery, and may be further independently set by the user.

This application relates to two forms of system navigation bars, where one is a fixed system navigation bar, and the other is a floating system navigation bar. Descriptions are respectively provided below.

(1) The Fixed System Navigation Bar

In this application, the fixed system navigation bar includes at least one system navigation control, and the fixed system navigation bar cannot be dragged by a user to change a position of the fixed system navigation bar relative to another interface element on an interface.

Figure 10A:
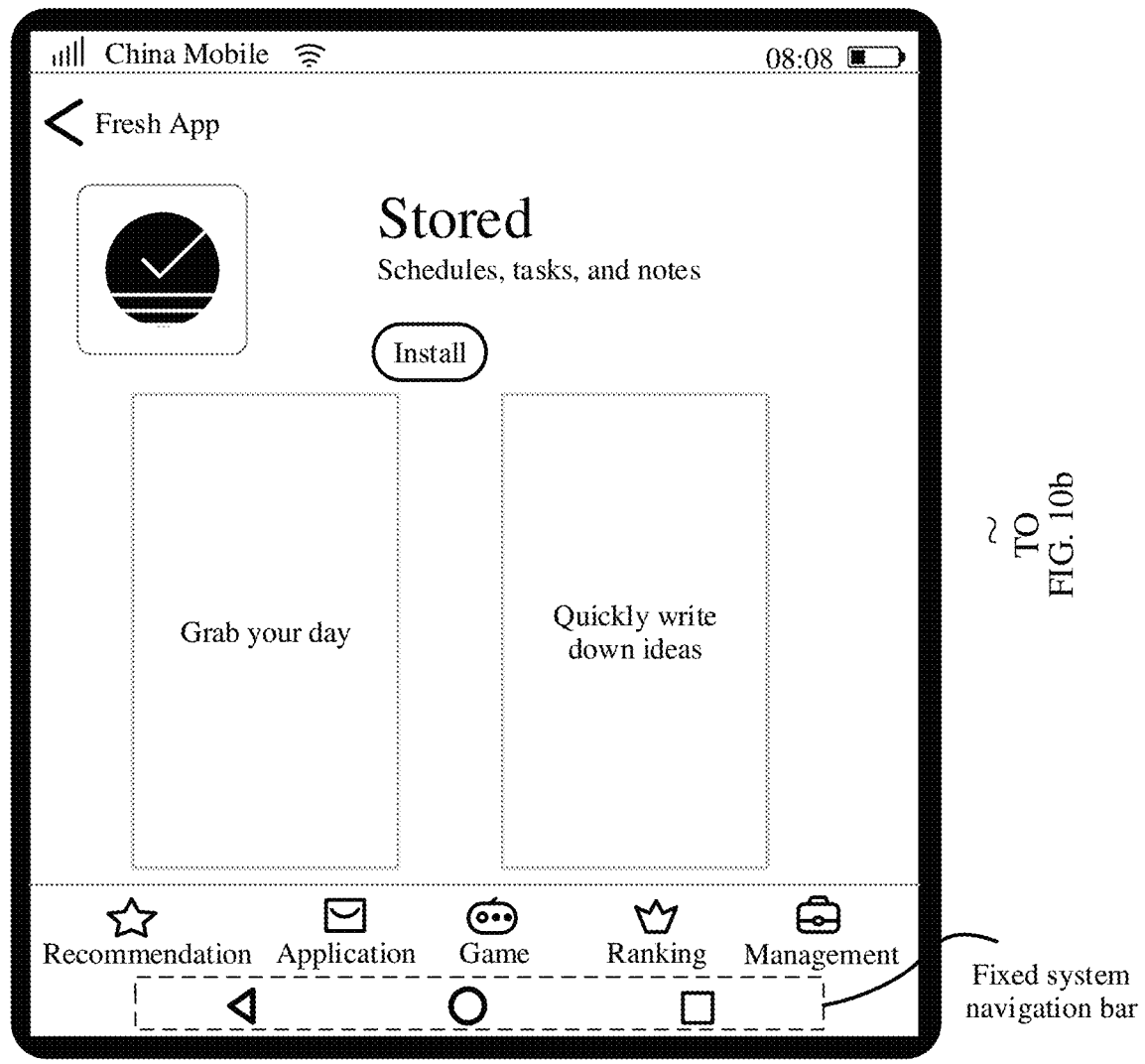

Specifically, the fixed system navigation bar includes the at least one system navigation control. For example, FIG. 10a shows a possible fixed system navigation bar. The fixed system navigation bar includes three system navigation controls, namely, a return key, a home screen key, and a multitasking key in FIG. 10a. Not limited to the three system navigation controls shown in FIG. 10a, the fixed system navigation bar in this application may further include more or fewer system navigation controls. For example, the fixed system navigation bar may further include a notification bar key, a hide key, and the like. Not limited to the three-key system navigation bar shown in FIG. 10a, the fixed system navigation bar in this application may further be in a bar shape shown in FIG. 9. In other words, the fixed system navigation bar includes a bar-shaped system navigation control. It may be understood that neither a shape or a size of the fixed system navigation bar nor a shape or a size of the system navigation control in the fixed system navigation bar is limited in this application.

Herein, for a navigation function of the fixed system navigation bar, refer to related descriptions in the embodiments of FIG. 6a to FIG. 9.

In this application, the fixed system navigation bar cannot be dragged by the user to change the position of the fixed system navigation bar relative to the another interface element on the interface. For example, referring to FIG. 10a, the fixed navigation bar is relatively located at the bottom of the interface displayed on the display screen. The user cannot drag the fixed system navigation bar, so that the fixed navigation bar is relatively located at the top or in the middle of the interface displayed on the display screen.

The fixed system navigation bar cannot be dragged by the user to change the position of the fixed system navigation bar relative to the another interface element on the interface. However, in some embodiments, an interface element (including a system navigation control such as a virtual key or a horizontal bar) included in the fixed system navigation bar may change with a posture of the electronic device 100, to change an arrangement manner. For example, referring to FIG. 10a, the fixed system navigation bar is located at the bottom of the display screen, and the left sharp corner of the return key points to a left area at the bottom of the display screen. When the display screen changes from a portrait orientation mode to a landscape orientation mode, a relative position between the system navigation bar and the display screen remains unchanged. To be specific, from a perspective of the user, the system navigation bar is located on the right side of the display screen, and the sharp corner of the return key points to an area below the right side of the display screen. However, to enable the user to quickly identify the virtual key, in some embodiments, when the display screen is in the landscape orientation mode, the sharp corner of the return key may still point to the left area of the display screen.

In some embodiments, the fixed system navigation bar may change with the posture of the electronic device 100, to change the position of the fixed system navigation bar relative to the another interface element on the interface. For example, referring to FIG. 10a, when the display screen is in the portrait orientation mode, the fixed system navigation bar is located at the bottom of the display screen. When the display screen changes from the portrait orientation mode to the landscape orientation mode, the fixed system navigation bar may be located in an area on the right side of the display screen.

In some embodiments, the fixed system navigation bar may alternatively be scaled down in equal proportion in response to a user operation. For example, in response to a gesture in which the user slides to the lower left corner of the display screen, an interface output by the system of the electronic device is scaled down in the lower left area of the display screen in equal proportion, and the fixed system navigation bar is also scaled down in the lower left area of the display screen in equal proportion.

(2) The Floating System Navigation Bar

In this application, the floating system navigation bar includes at least one system navigation control, and the floating system navigation bar can be dragged by the user to change a position of the floating system navigation bar relative to another interface element on an interface.

Specifically, the floating system navigation bar can be dragged by the user to change the position of the floating system navigation bar relative to the another interface element on the interface. In some embodiments, the floating system navigation bar can be dragged by the user to any position of the display screen.

Figure 10B:
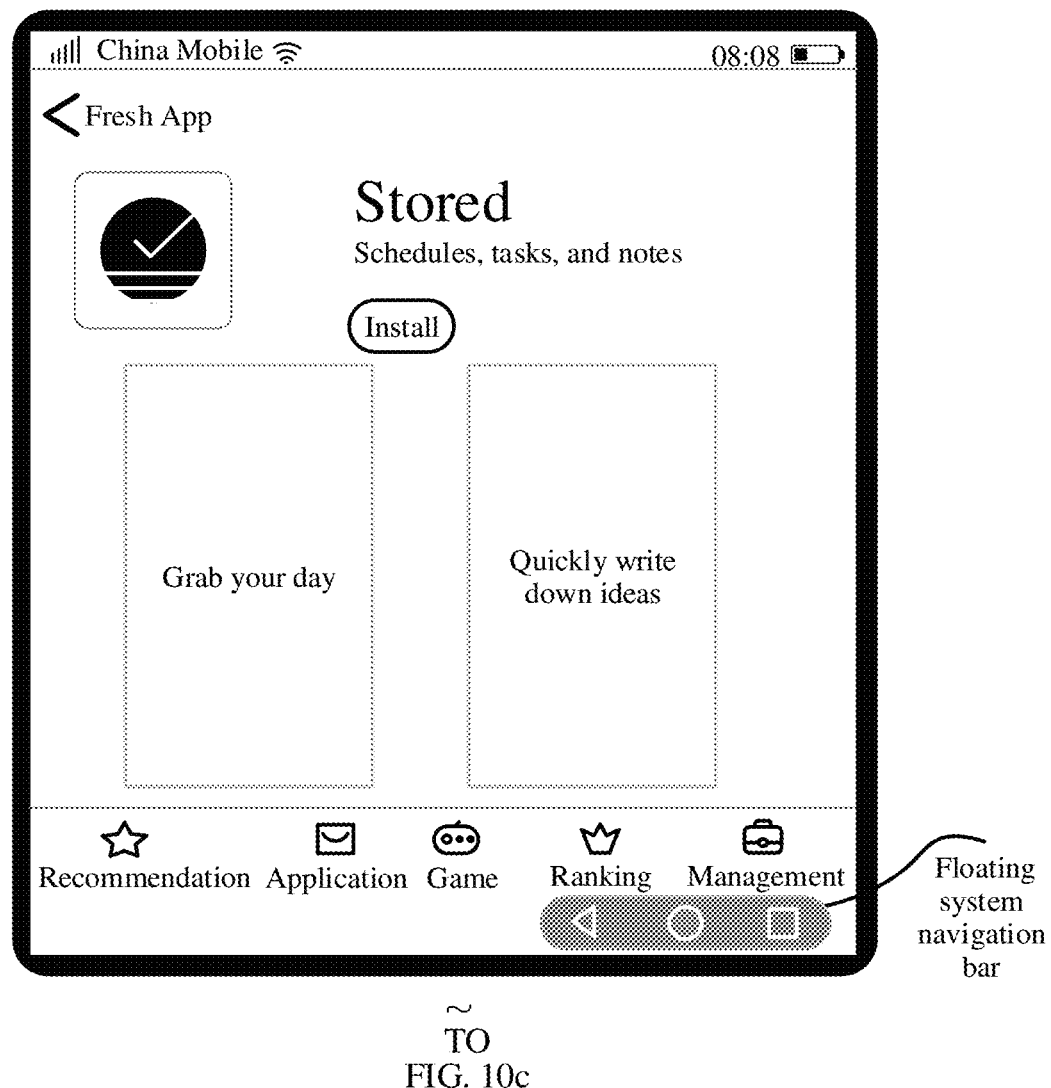

In a possible implementation, that the floating system navigation bar is dragged by the user may mean that the entire floating system navigation bar is dragged by the user. For example, FIG. 10b shows a capsule bar-shaped floating system navigation bar. The user can drag the entire capsule bar-shaped floating system navigation bar to the upper left corner, the upper right corner, the lower left corner, the middle area, or the like of the display screen.

In another possible implementation, that the floating system navigation bar is dragged by the user may mean that some system navigation controls of the floating system navigation bar are dragged by the user. For example, referring to FIG. 10b, the capsule bar-shaped floating system navigation bar includes three system navigation controls, namely, a return key, a home screen key, and a multitasking key in FIG. 10b. The user can drag some virtual navigation controls (for example, the return key or the multitasking key) to the upper left corner, the upper right corner, the lower left corner, the middle area, or the like of the display screen, and positions of other system navigation controls relative to the virtual navigation controls on the interface remain unchanged.

Herein, the floating system navigation bar shown in FIG. 10b is merely an example. Not limited to the three system navigation controls shown in FIG. 10b, the floating system navigation bar in this application may further include more or fewer system navigation controls. For example, the floating system navigation bar may further include a notification bar key, a hide key, and the like. Not limited to the capsule bar-shaped floating system navigation bar shown in FIG. 10b, the floating system navigation bar in this application may further be in a bar shape shown in FIG. 9. In other words, the floating system navigation bar includes a bar-shaped system navigation control. Herein, for a manner in which the floating system navigation bar implements a navigation function, refer to related descriptions in the embodiments of FIG. 6a to FIG. 9.

Not limited to the capsule bar-shaped floating system navigation bar or the bar-shaped floating system navigation bar, the floating system navigation bar in this application may further be spherical. In other words, the floating system navigation bar includes a spherical system navigation control. For example, FIG. 10c shows a possible spherical floating system navigation bar.

Figure 10C:
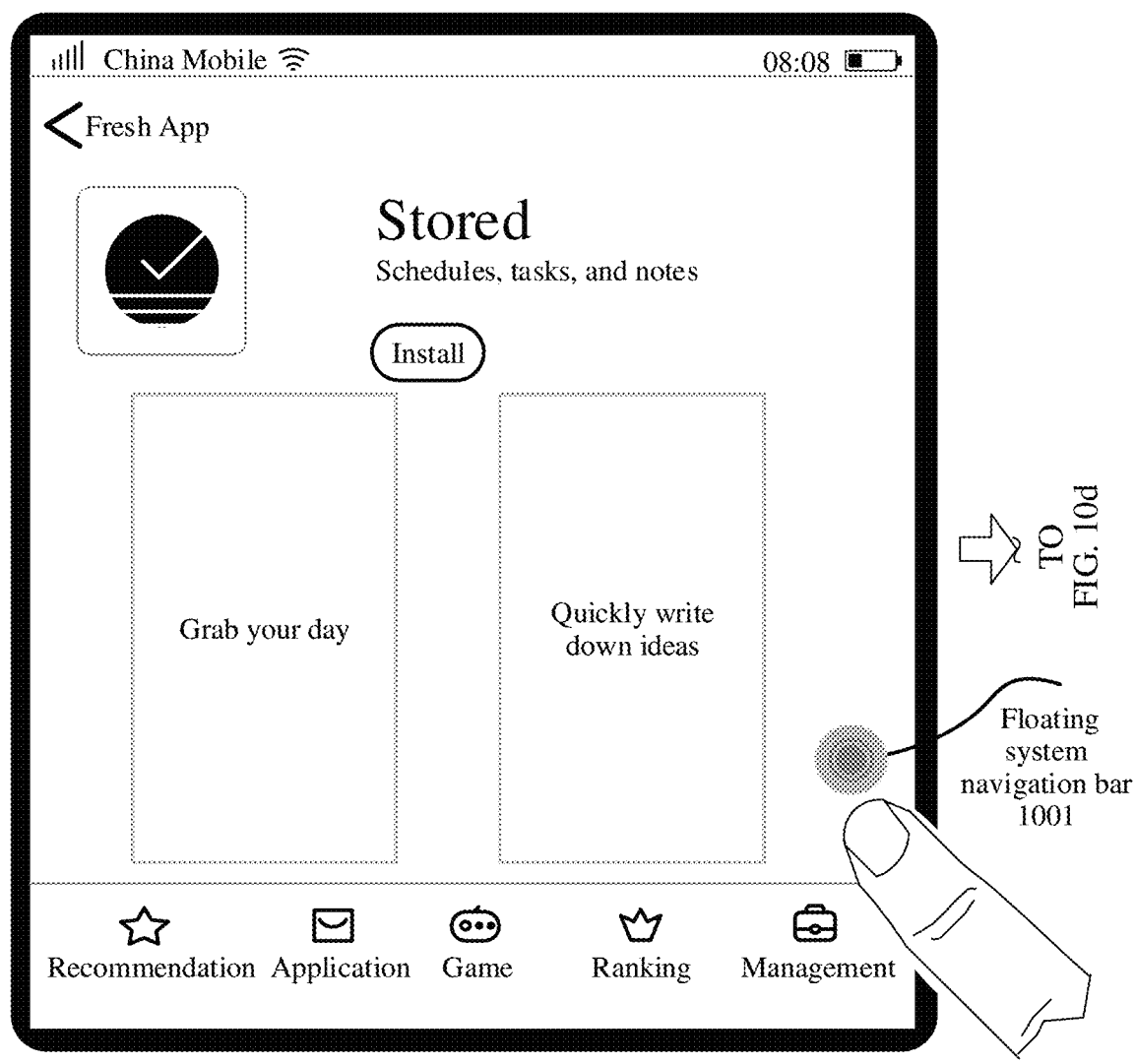
Figure 10D:
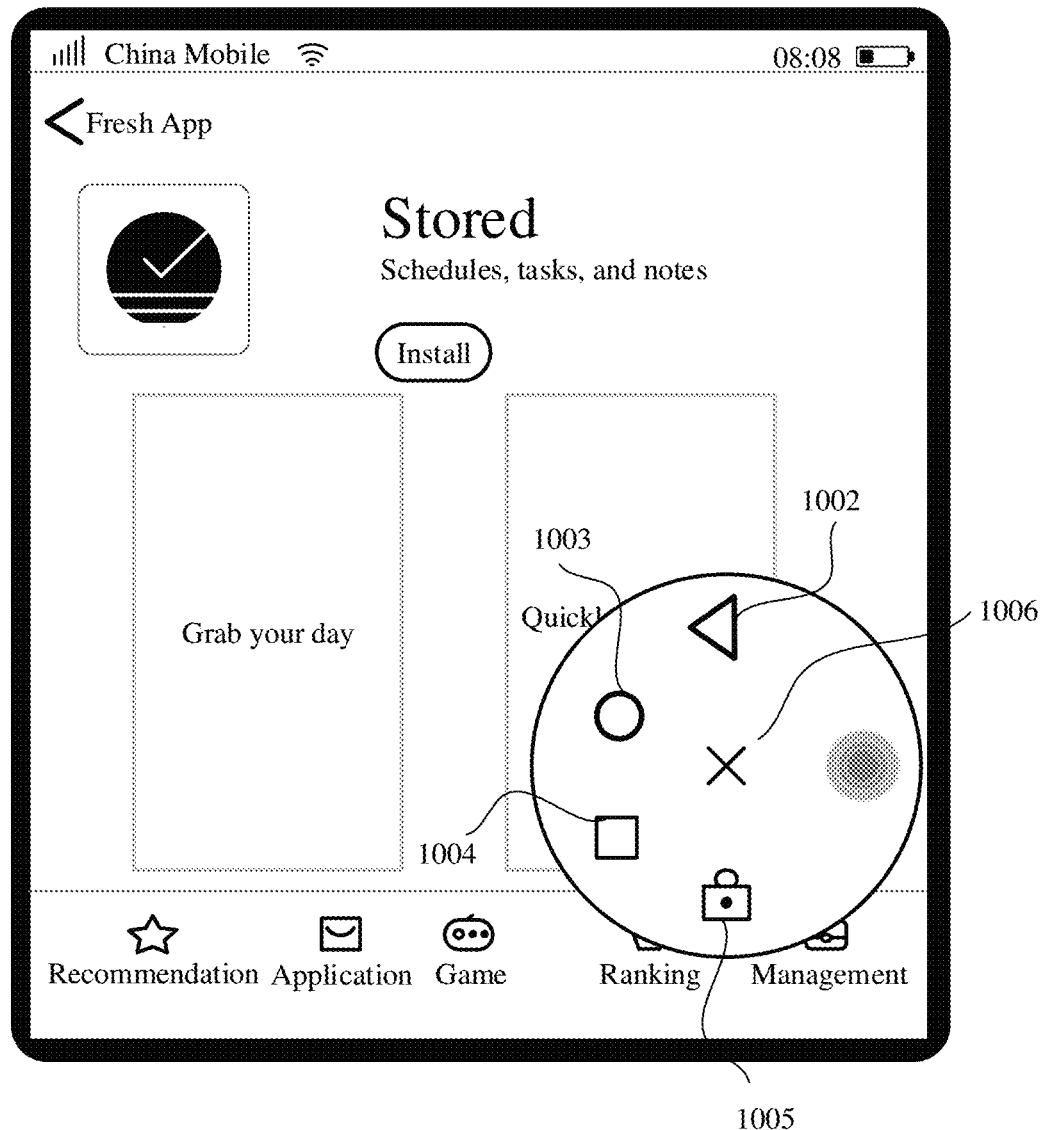

In some possible embodiments, the user may tap a floating ball 1001 shown in FIG. 10c. In response to the tap operation, referring to FIG. 10d, the display screen displays a plurality of expanded floating virtual keys. The plurality of floating virtual keys may include a return key 1002, a home screen key 1003, a multitasking key 1004, a lock screen key 1005, a close key 1006, and the like. The user may tap the return key 1002, so that the display screen returns to a previous interface. The user may tap the home screen key 1003, so that the display screen displays a home screen. The user may tap the multitasking key 1004, so that the display screen displays a multitasking interface. The user may tap the lock screen key 1005, so that the display screen displays a lock screen. The user may tap the close key 1006 to fold the expanded floating virtual keys.

In some possible manners, the floating ball 1001 shown in FIG. 10c may implement a navigation function with reference to a user gesture. For example, the user may tap the floating ball 1001 once to return to a previous interface, tap the floating dock 1001 twice to return to a previous interface of the previous interface, long press the floating ball 1001 and move a finger away from the display screen to return to the home screen, or long press the floating ball 1001 and slide the floating ball 1001 leftward or rightward to enter the multitasking interface.

It may be understood that, in the foregoing two implementations of the navigation function, not limited to a spherical shape, the system navigation bar shown in FIG. 10*a* to FIG. 10*c* may further be in another shape, for example, an ellipse, a triangle, or a rectangle.

In a possible implementation, the floating system navigation bar may be transparent. In other words, the user may view another interface element in interface content in an area of the floating system navigation bar. Alternatively, the floating system navigation bar may not be transparent. In other words, the user cannot view another interface element in interface content in an area of the floating system navigation bar. This is not limited herein.

Based on the system navigation bar mentioned above, this application provides a system navigation bar display method, to display the system navigation bar in the floating manner. Occupied space is small, and it is convenient for a user to operate the system navigation bar to implement a navigation function.

The following uses several specific application scenarios as examples to describe the system navigation bar display method in this application.

In an application scenario 1, a user is using an electronic device provided with a foldable display screen. After the foldable display screen changes from a folded state to an expanded state, the user expects to use a navigation function provided by a system navigation bar.

Figure 11A:
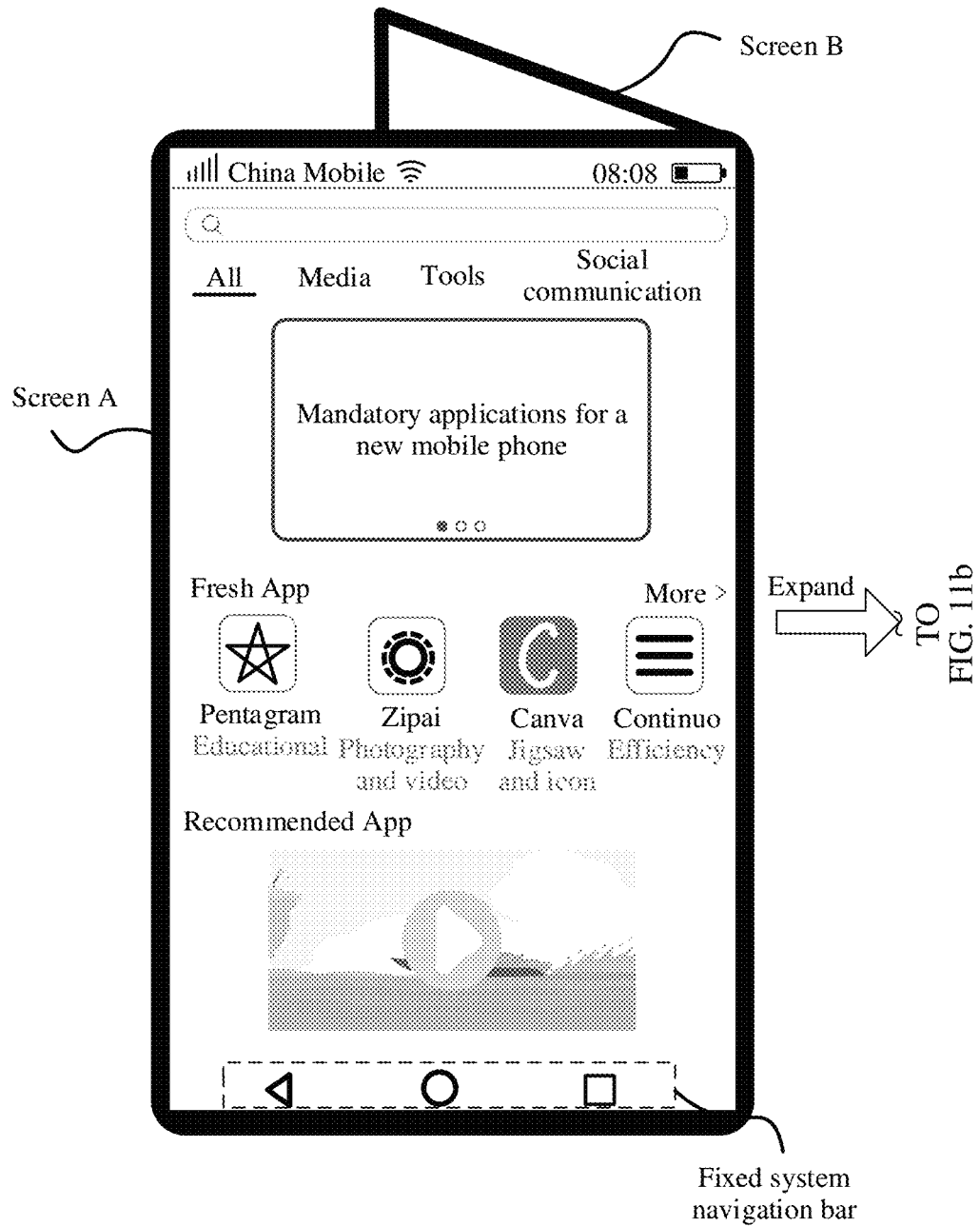
Figure 11A:
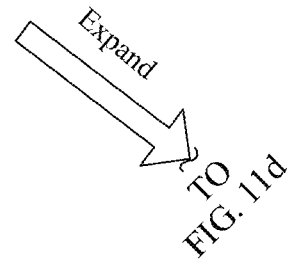

For example, as shown in FIG. 11*a*, the electronic device 100 is provided with a foldable display screen, and the foldable display screen is in a folded state.

In some embodiments, the foldable display screen may be folded from a middle position. In other words, the folded display screen is divided into two parts: a screen A and a screen B that are shown in FIG. 11*a*. In this case, when the user uses the folded electronic device, some areas (for example, the screen A) of the display screen may be used to display interface content currently output by a system of the electronic device, and the other areas (for example, the screen B) may not display any interface content, or may be used to display other interface content output by the system of the electronic device.

That no interface content is displayed in some areas may mean that the areas are in a black screen state. To be specific, the areas stop working, do not receive any user operation, and do not display any interface content. That no interface content is displayed in some areas may alternatively mean that the areas are in a low power consumption working state, and the areas do not display any interface content, but may receive a user operation and display corresponding interface content based on the user operation.

When the two parts of areas of the display screen are separately used to display interface content output by the system, the user may separately perform control in the two parts of areas, and it may be considered that the electronic device 100 provides two display screens for the user.

The areas of the display screen in the folded state are used to output the interface content currently output by the system of the electronic device. For example, as shown in FIG. 11*a*, interface content displayed on the screen A includes a main interface of an application store, and further includes a system navigation bar. Herein, not limited to the main interface of the application store, the interface content currently output by the system of the electronic device may further be another interface, for example, a desktop, a game interface, a web page browsing interface, a book reading interface, a music playing interface, or a text editing interface. This is not limited in this application. In addition, the interface content currently output by the system of the electronic device may further include another system-level interface element, for example, a status bar. The status bar may include an operator name (for example, China Mobile), time, a Wi-Fi icon, signal strength, a current residual capacity, and the like.

When the display screen is in the folded state, the system navigation bar is a fixed system navigation bar. A relative position of the fixed system navigation bar on the display screen remains unchanged. For example, as shown in FIG. 11*a*, the fixed system navigation bar is located in a bottom area of the screen A, and cannot move with a finger of the user. Not limited to the system navigation bar including three virtual navigation keys in FIG. 11*a*, in this application, the fixed system navigation bar may further be in a bar shape shown in the embodiment in FIG. 9. This is not limited in this application. Herein, for a manner in which the fixed system navigation bar implements the navigation function, refer to the foregoing related descriptions. Details are not described herein.

When the display screen of the electronic device 100 changes from the folded state to the expanded state, the fixed system navigation bar on the display screen is changed to a floating system navigation bar. In other words, when the display screen is in the expanded state, the floating system navigation bar is displayed. The floating system navigation bar can be dragged by the user. In addition, compared with the fixed system navigation bar, the floating system navigation bar occupies smaller space, provides more compact interface elements, provides a more convenient user operation, and may further provide better experience for the user by fully using space of the display screen. In this way, when operating the electronic device with one hand, the user can drag the floating system navigation bar to an area in which an operation is conveniently performed with one hand, so that various functions of the system navigation bar can be conveniently used.

Herein, when the display screen of the electronic device 100 is in the expanded state, the display screen may be configured to display, in full screen, the interface content currently output by the system. In some embodiments, interface content displayed on the display screen in the expanded state may be the same as interface content displayed on the display screen in the folded state, and the interface content displayed on the display screen in the expanded state is scaled up in equal proportion. In some other embodiments, the interface content displayed on the display screen in the expanded state may include more interface elements than those displayed on the display screen in the folded state. For example, as shown in FIG. 11*b*, the main interface of the application store in FIG. 11*b* includes icons and text descriptions of more applications.

In specific implementation, the display screen has a different bending angle in the folded state or the expanded state. The bending angle of the display screen may be obtained by using an angle sensor. Therefore, the electronic device may distinguish, based on the obtained bending angle, whether the display screen is in the folded state or the expanded state. For example, when the bending angle α is less than β, it may be determined that the display screen is currently in the expanded state. When the bending angle α is greater than β, it may be determined that the display screen is currently in the folded state. Herein, β may be preset. For example, β may be 3 degrees, 5 degrees, or the like.

Figure 11B:
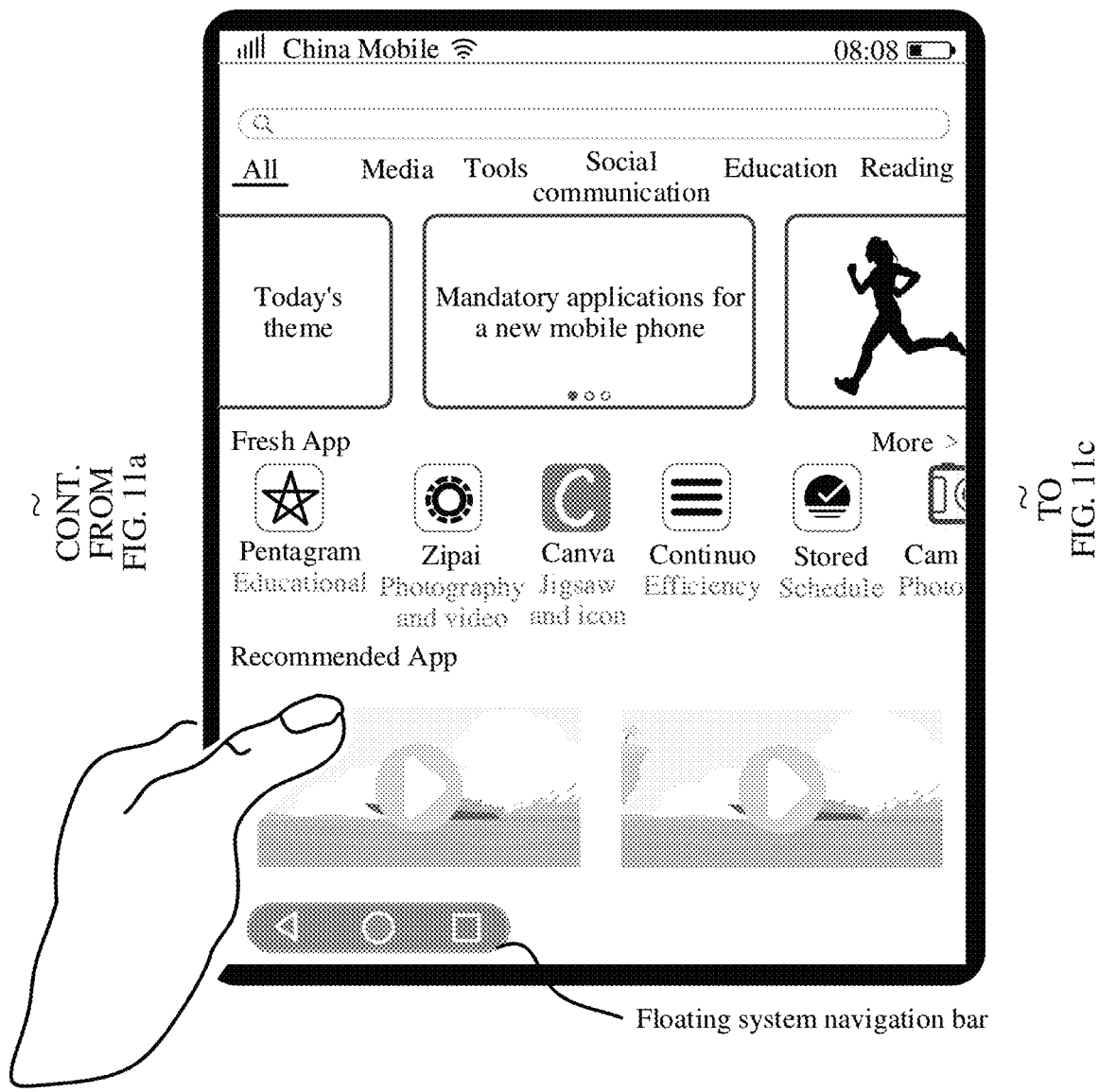

For example, as shown in FIG. 11b, when the display screen is in the expanded state, the system navigation bar is a capsule bar-shaped floating system navigation bar. For example, as shown in FIG. 11d, when the display screen is in the expanded state, the system navigation bar is a floating ball system navigation bar.

Figure 11C:
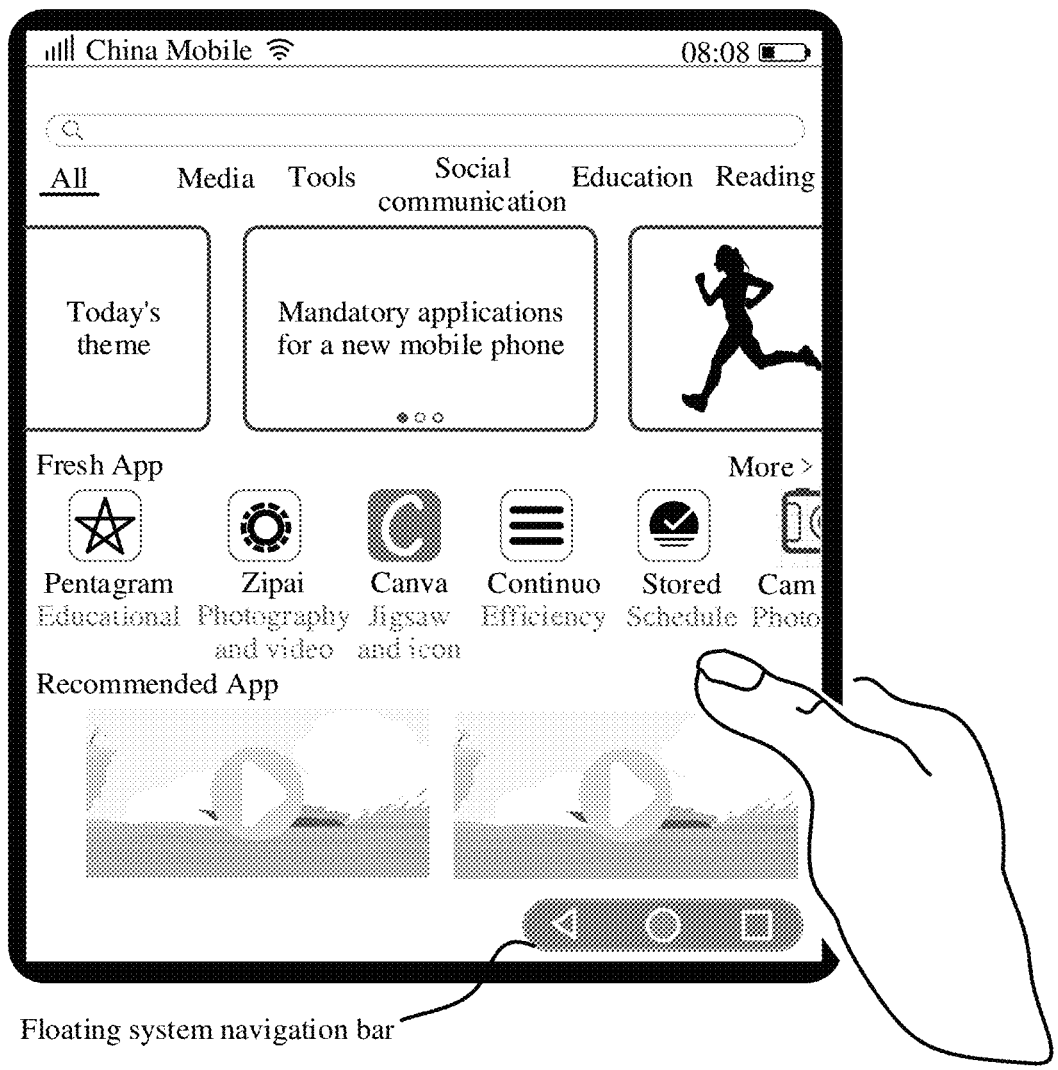
Figure 11D:
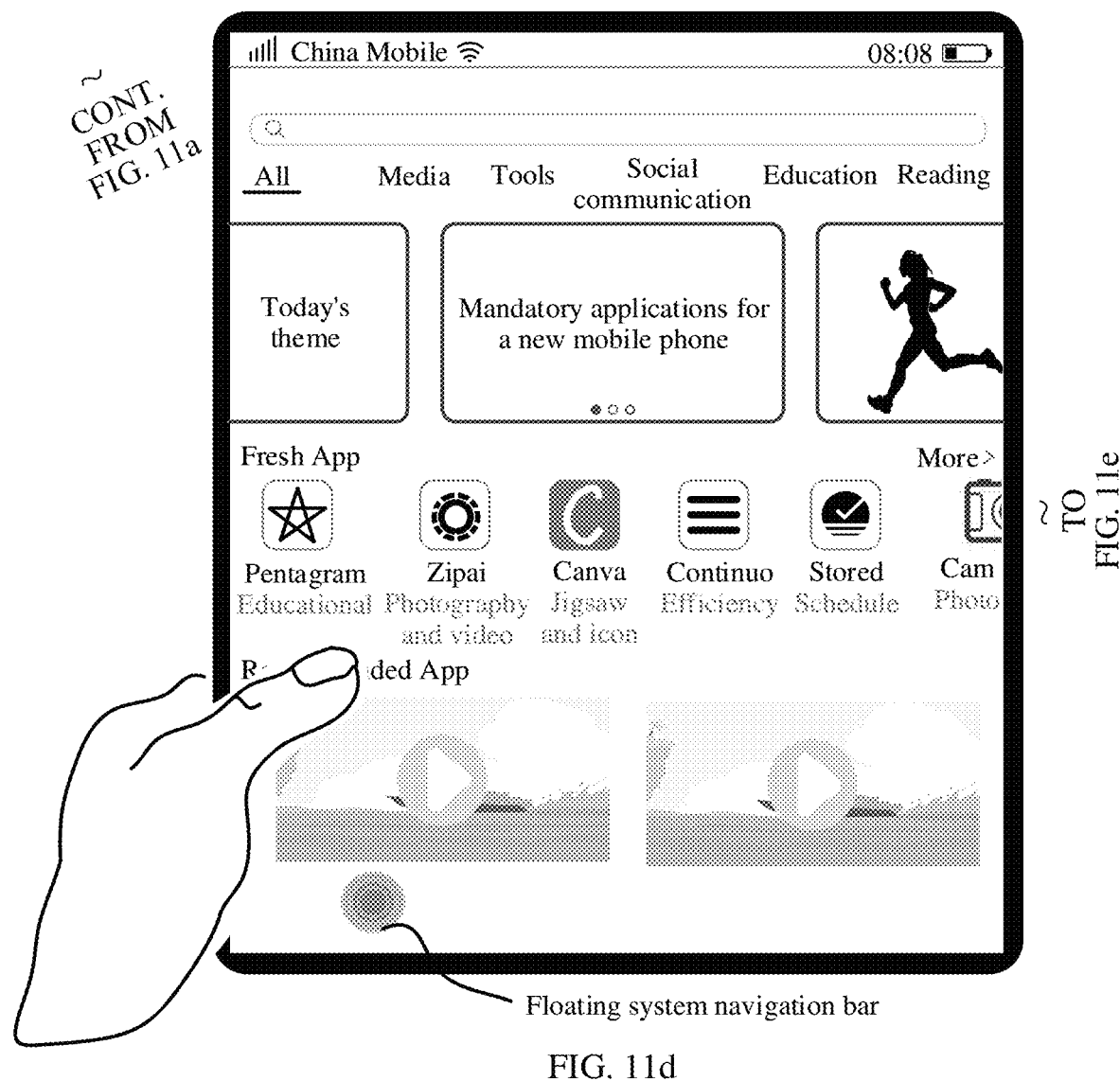

Not limited to the system navigation bars shown in FIG. 11b and FIG. 11d, the floating system navigation bar may further be in a bar shape shown in FIG. 9. This is not limited in this application. Herein, for a definition of the floating system navigation bar and a manner in which the floating system navigation bar implements a navigation function, refer to the foregoing related descriptions of the floating system navigation bar. Details are not described herein.

When the display screen changes from the folded state to the expanded state, a position of the floating system navigation bar on the display screen may include the following several cases, and the several cases are described in detail below.

Figure 11E:
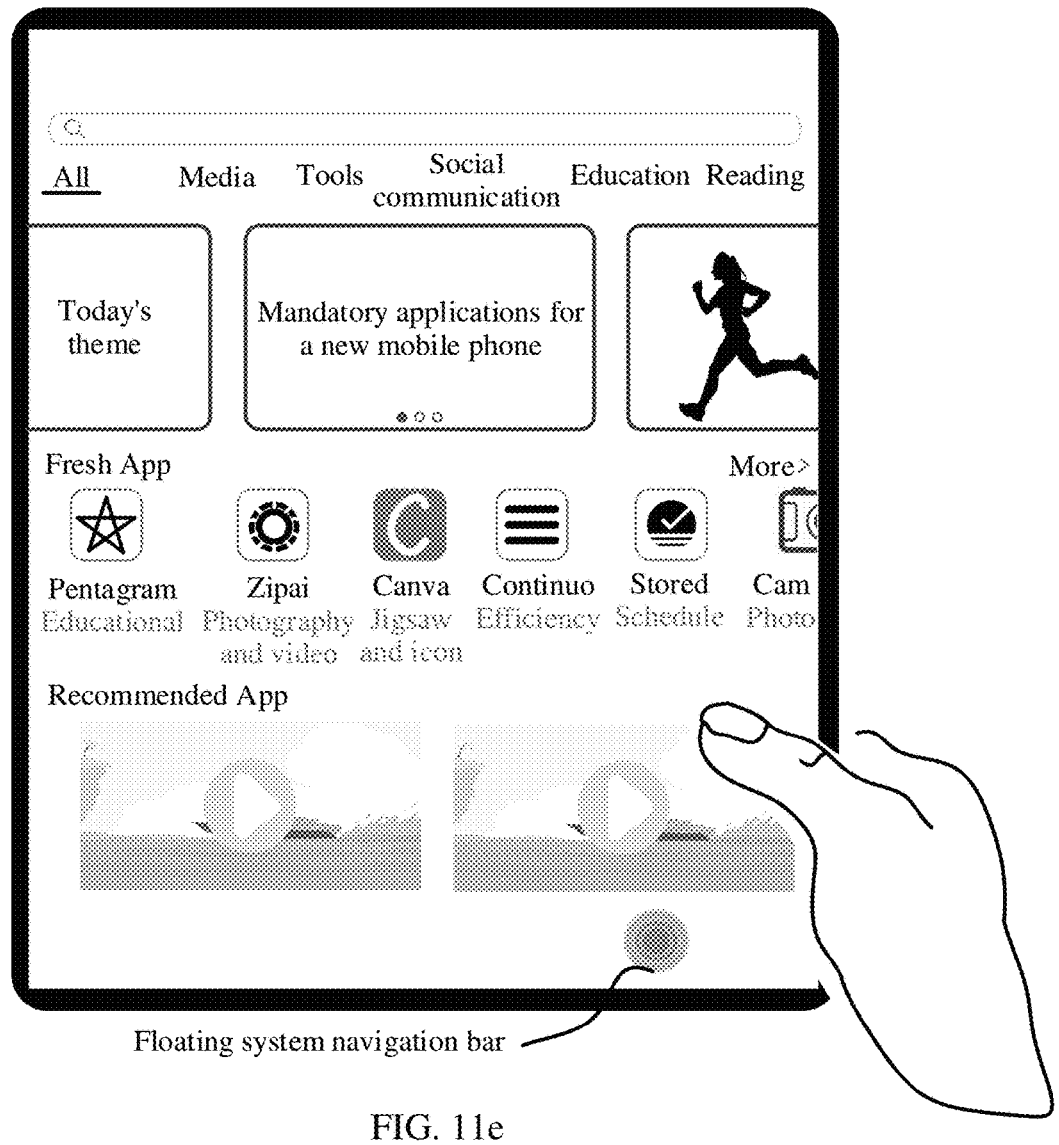

In some embodiments, the floating system navigation bar may be related to a manner in which the user holds the electronic device. For example, as shown in FIG. 11b and FIG. 11d, when the user holds the lower left corner of the electronic device with the left hand, the floating system navigation bar may be displayed in the lower left corner of the display screen. For example, as shown in FIG. 11c and FIG. 11e, when the user holds the lower right corner of the electronic device with the right hand, the floating system navigation bar may be displayed in the lower right corner of the display screen. The foregoing display mode may be convenient for the user to operate the floating system navigation bar.

Further, the floating system navigation bar may further be related to a position at which the user touches the display screen with a finger. For example, when the user touches the display screen with a thumb, the floating system navigation bar may be displayed below the thumb of the user, to facilitate operation and control of the user.

In specific implementation, when the user holds the electronic device 100 in different postures, pressure may be generated at different positions of the electronic device 100. The pressure generated when the user holds the electronic device 100 may be obtained by a pressure sensor, and the pressure sensor may be distributed on the back, a side, and the display screen of the electronic device 100. Therefore, the electronic device 100 may determine, based on pressure data obtained by the pressure sensor, whether the user holds the electronic device with the left hand or the right hand, and a specific position of touching the display screen when the user holds the electronic device.

In this application, a display status of the floating system navigation bar on the display screen may be changed. The following lists several possible manners of changing the display status by using an example in which the display screen in the expanded state displays the capsule bar-shaped floating system navigation bar shown in FIG. 11b.

(1) A Display Position of the Capsule Bar-Shaped Floating System Navigation Bar May be Changed.

Figure 12A:
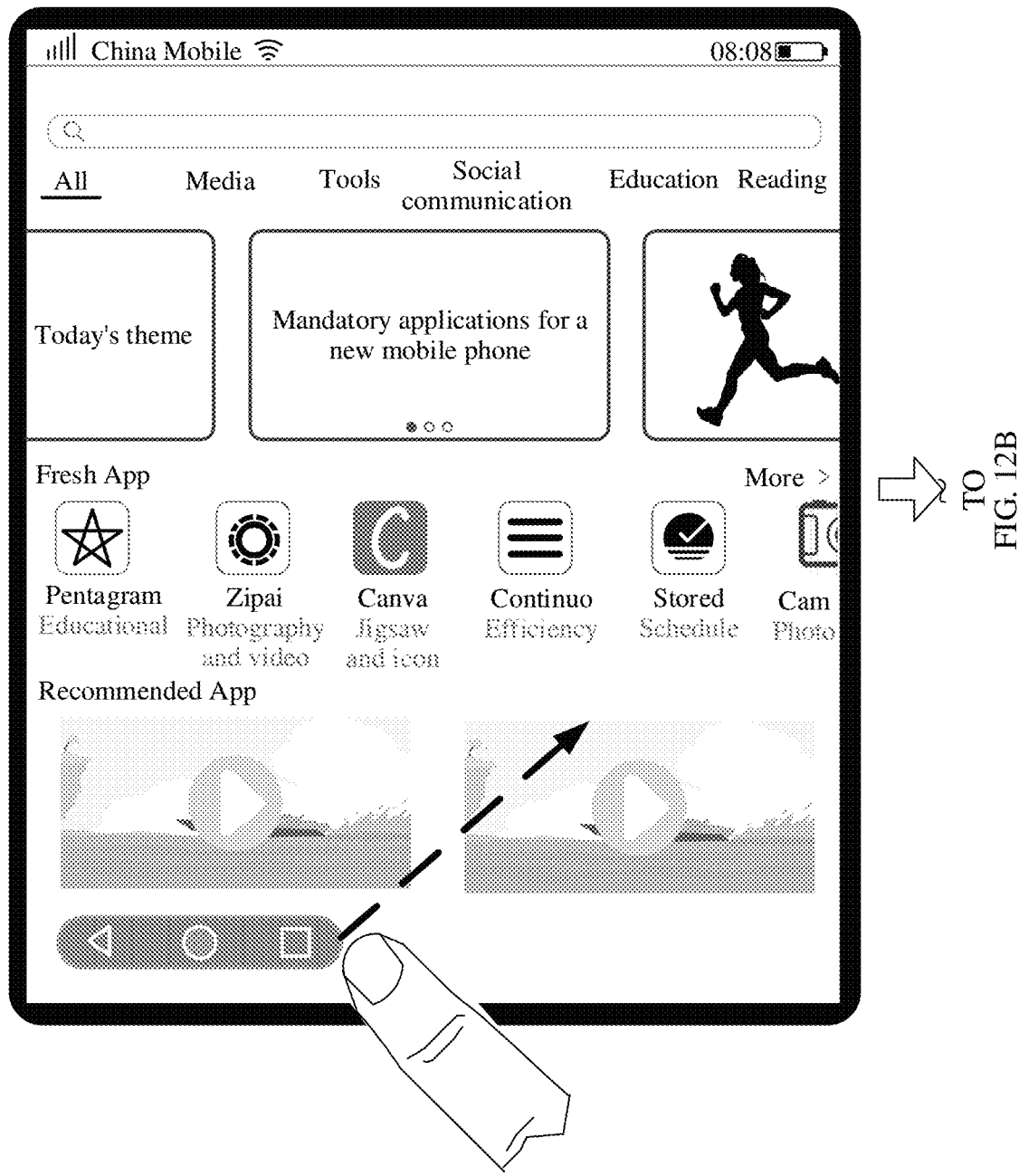
Figure 12B:
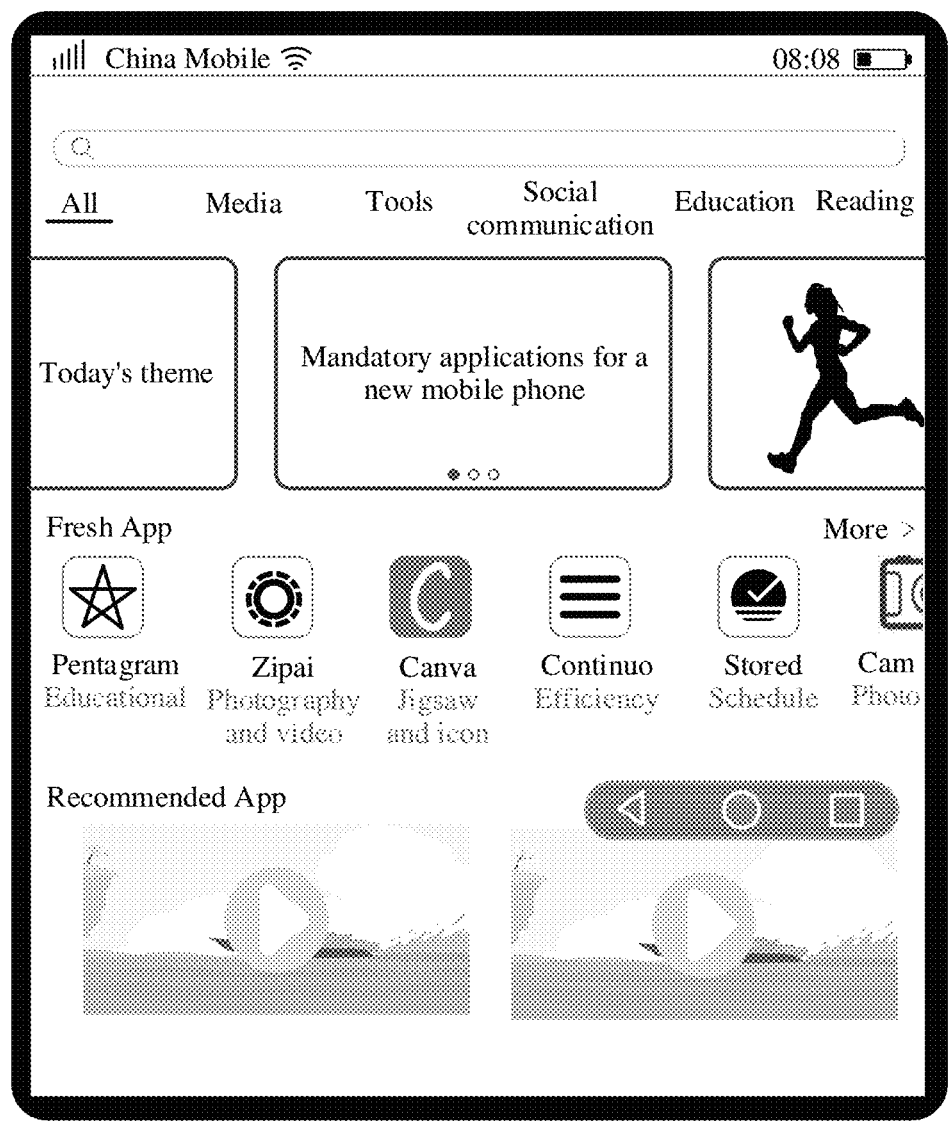

In a possible implementation, the display position of the floating system navigation bar may be changed based on an input user operation. For example, referring to FIG. 12A and FIG. 12B, the user may long press the floating system navigation bar and slide the floating system navigation bar, to drag the floating system navigation bar to any position. In the manner shown in FIG. 12A and FIG. 12B, the user may adjust the position of the floating system navigation bar based on a requirement.

In another possible implementation, the display position of the floating system navigation bar changes with a manner in which the user holds the electronic device. For example, when the user changes from holding the electronic device with the left hand to holding the electronic device with the right hand, in response to a change of a holding posture of the user, the floating system navigation bar moves to the lower right corner of the display screen. In the foregoing manner, the floating system navigation bar is always applicable to the manner in which the user holds the electronic device, to facilitate a user operation.

(2) The Capsule Bar-Shaped Floating System Navigation Bar May be Changed to Another Floating Form.

In a possible implementation, the electronic device 100 may change a display form of the floating system navigation bar based on an input user operation, that is, change a floating form.

Figure 13A:
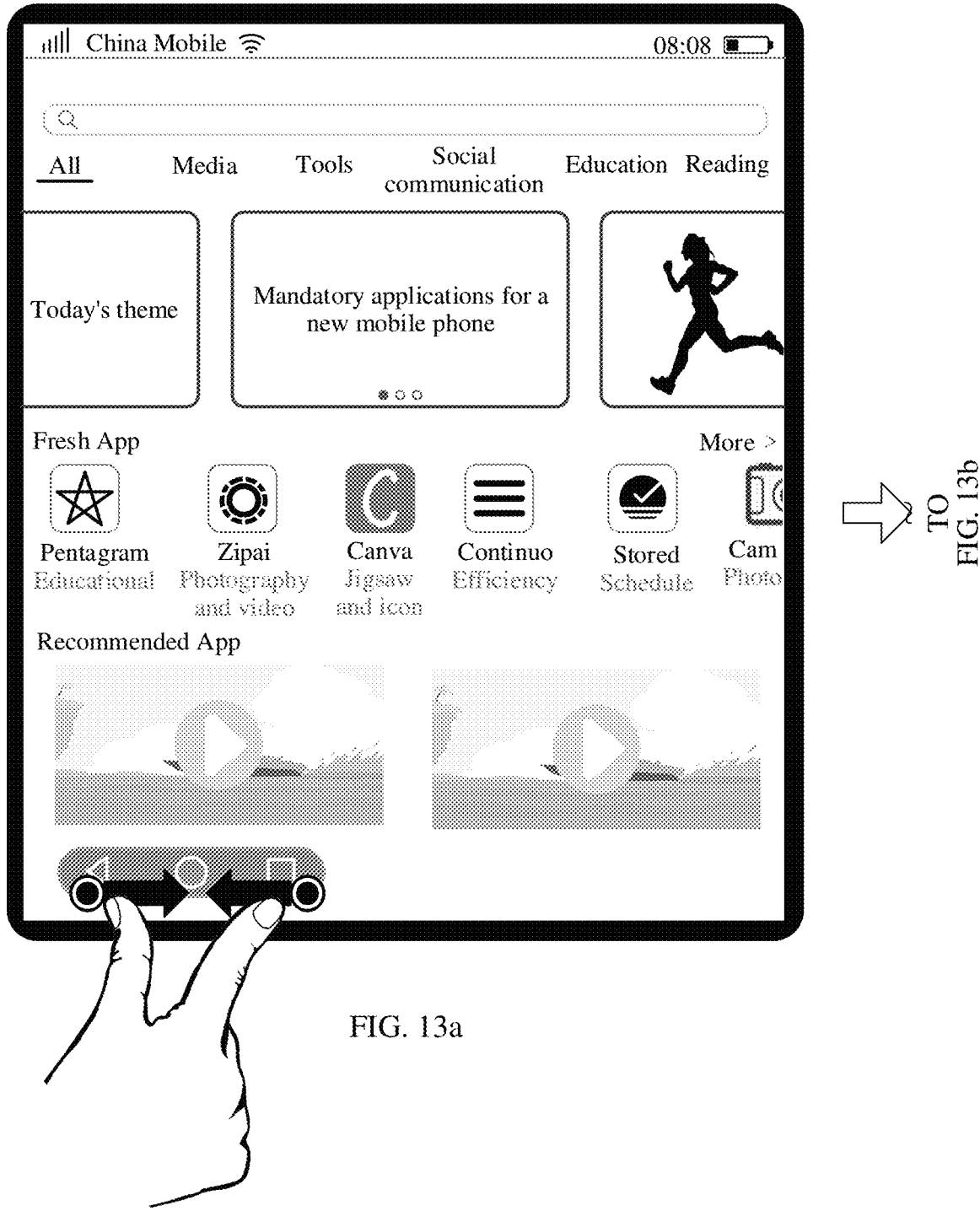
Figure 13B:
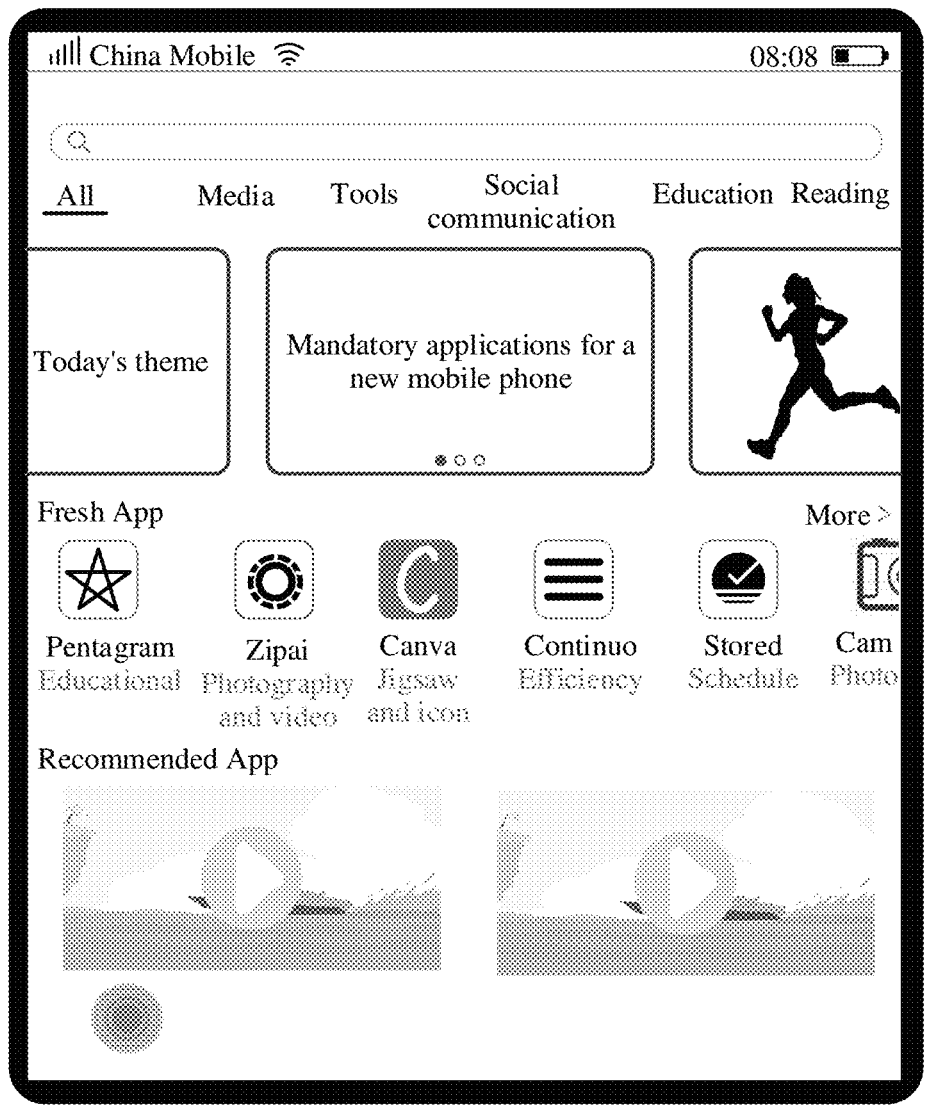

For example, referring to FIG. 13a and FIG. 13b, the user may input a pinch gesture by touching the capsule bar-shaped floating system navigation bar with two fingers. In response to the gesture, the electronic device 100 changes the capsule bar-shaped floating system navigation bar into a floating ball system navigation bar.

Figure 13C:
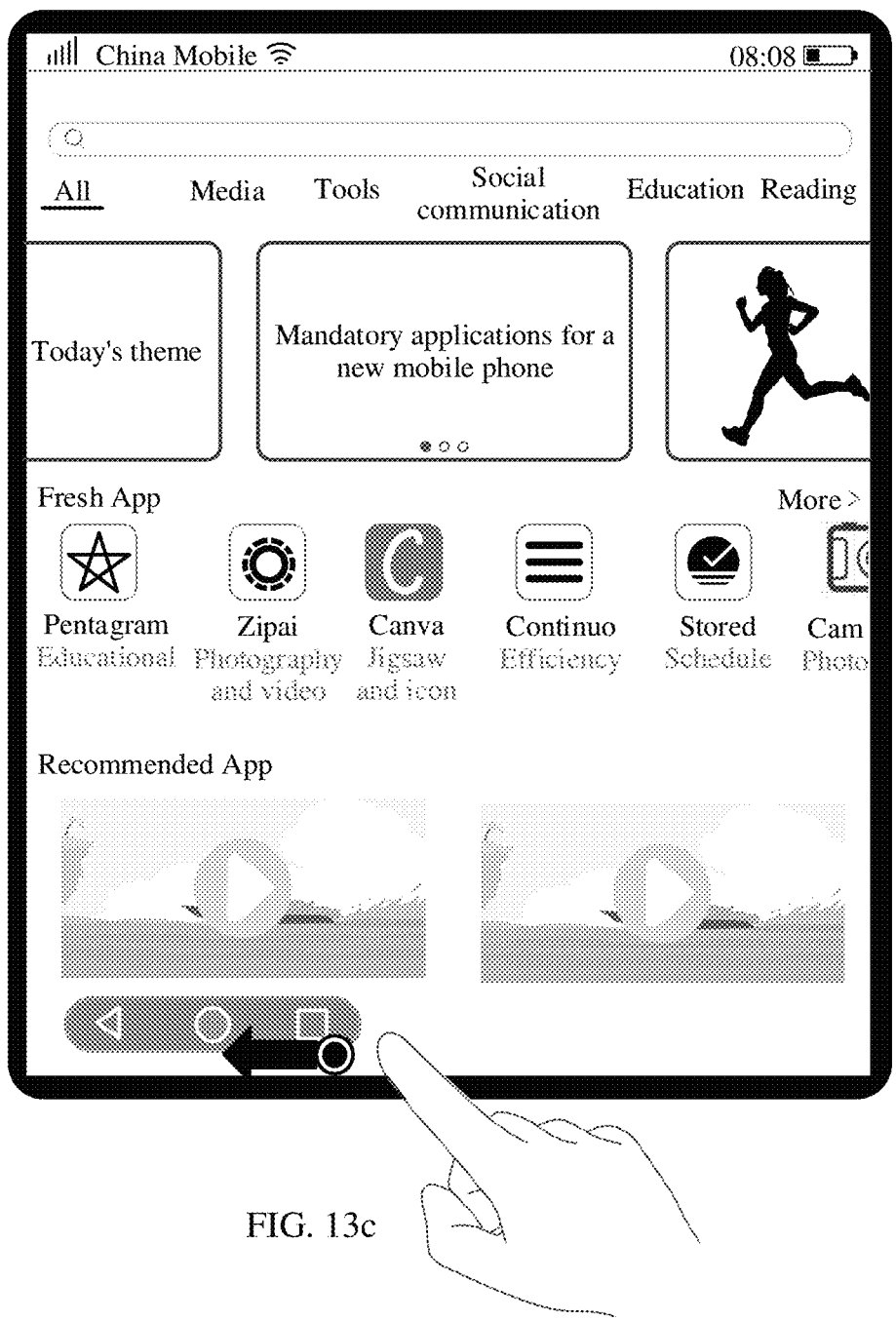

For example, referring to FIG. 13c and FIG. 13b, the user may input a gesture by touching the capsule bar-shaped floating system navigation bar with a single finger to slide the capsule bar-shaped floating system navigation bar to the other side, to change the floating system navigation bar from a capsule bar shape into a spherical shape. Not limited to the gesture of sliding leftward in FIG. 13b, in this application, the floating system navigation bar may be further changed from the capsule bar shape to the spherical shape by using a gesture of sliding rightward.

Figure 13D:
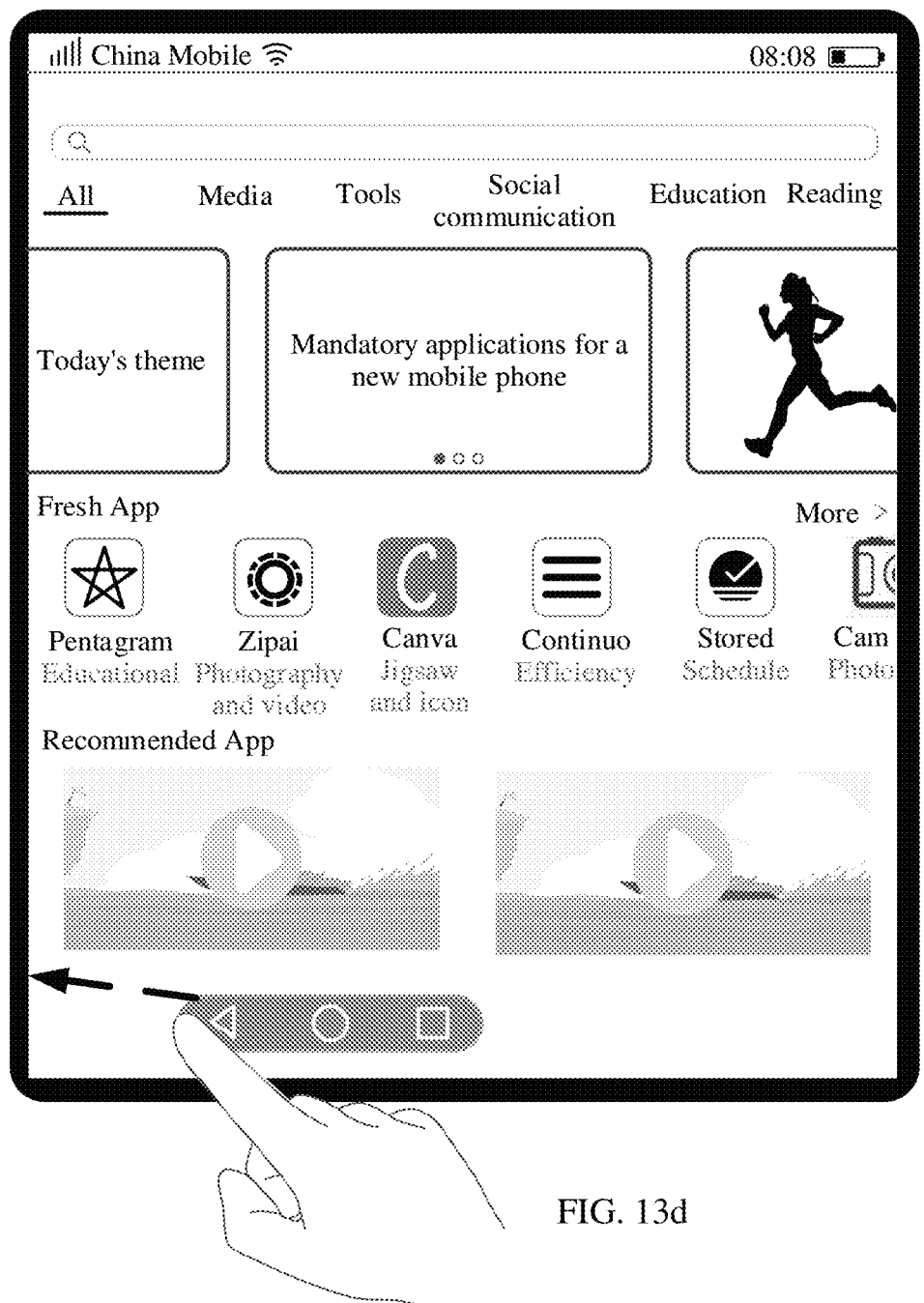

For example, referring to FIG. 13d and FIG. 13b, the user can drag the capsule bar-shaped floating system navigation bar to an edge area of the display screen. In response to the drag operation, the electronic device 100 changes the floating system navigation bar from a capsule bar shape to a spherical shape. Further, the electronic device 100 may further determine, with reference to a dragging speed, whether to change the floating system navigation bar from the capsule bar shape to the spherical shape. For example, when the dragging speed of the user is greater than a first value, the electronic device 100 changes the floating system navigation bar from the capsule bar shape to the spherical shape.

Herein, not limited to the user operations shown in FIG. 13a to FIG. 13d, in this application, the form of the floating system navigation bar may be further changed in another manner. For example, the user further changes the floating system navigation bar from a capsule bar shape to a spherical shape or a horizontal bar shape by using a gesture of sliding the capsule bar-shaped floating system navigation bar upward. For another example, in addition to a gesture performed on the display screen, the user may further change the display form of the floating system navigation bar by using a voice instruction, eyeball rotation, or the like.

Not limited to the change of the form of the floating system navigation bar described in the embodiment of FIG. 13a to FIG. 13d, in specific implementation, the electronic device 100 may further change a size, a display mode, a quantity of controls, a shape of a control, a size of a control, a relative position between controls, and the like of the floating system navigation bar based on an input user operation. The size of the floating system navigation bar refers to a size of a display area occupied by the floating system navigation bar on the display screen. The display mode may include joint display of system navigation controls in the floating system navigation bar (for example, the floating system navigation bar shown in FIG. 13a to FIG. 13d) or separate display (for example, separate display of some system navigation controls and another system navigation control). The control size refers to a size of a display area occupied by a system navigation control of the floating system navigation bar on the display screen. The relative position between controls refers to a position relationship between system navigation controls of the floating system navigation bar.

In the foregoing possible implementation, further, the electronic device 100 may further restore the display form of the floating system navigation bar based on an input user operation, that is, restore the floating ball system navigation bar to the capsule bar-shaped floating system navigation bar.

Figure 14A:
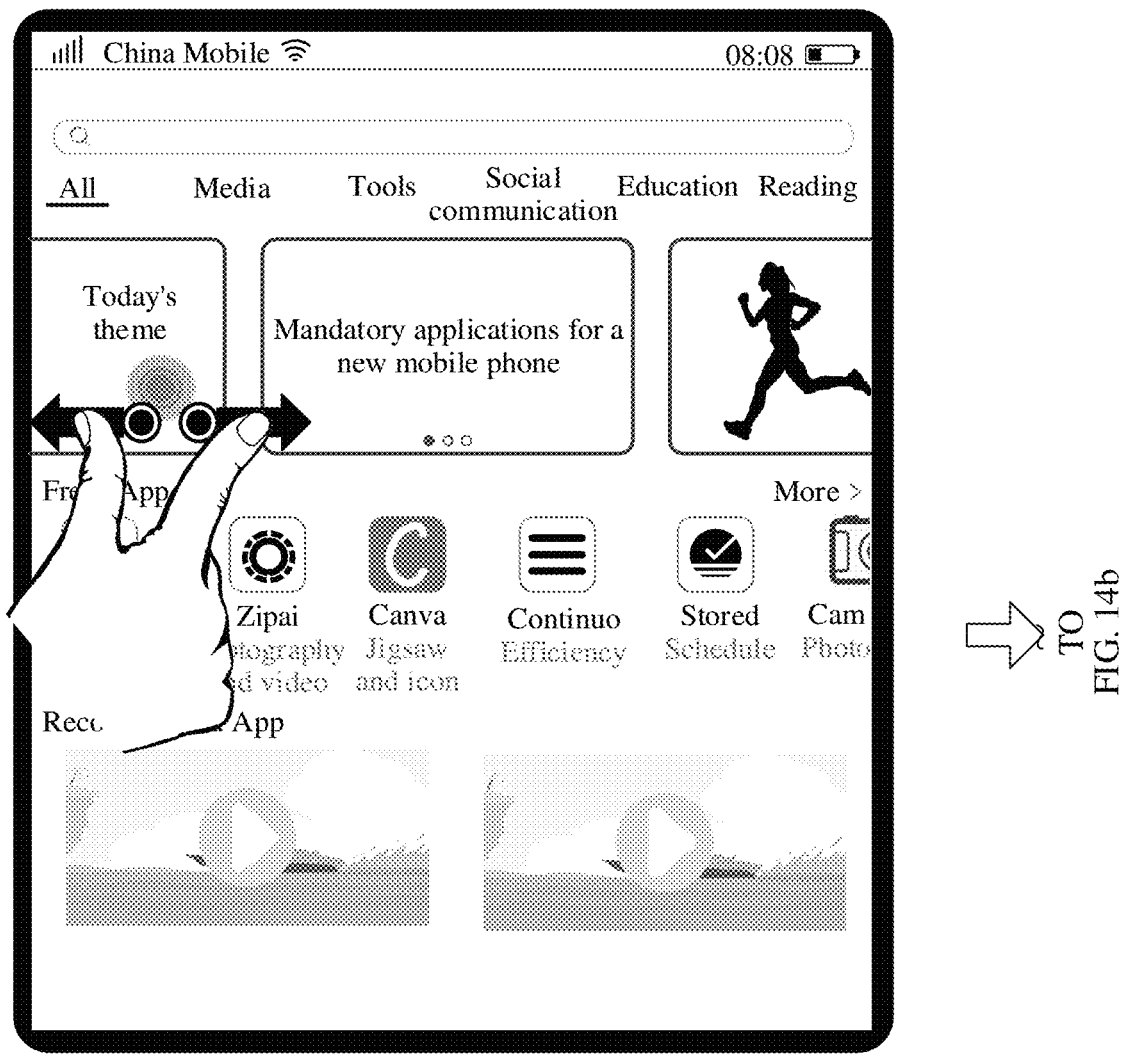
Figure 14B:
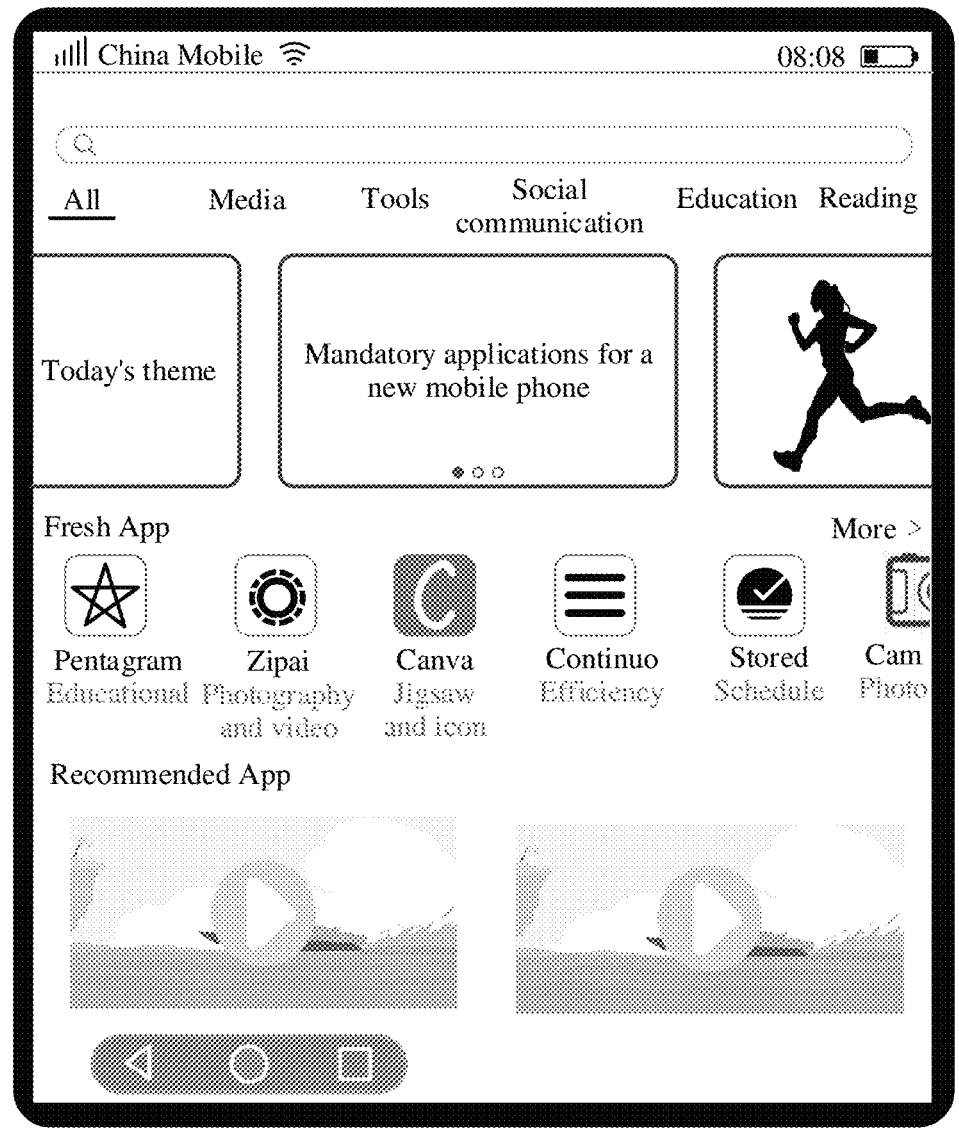

For example, referring to FIG. 14a and FIG. 14b, the user may touch the floating ball system navigation bar with two fingers and slide outwards with the two fingers. In response to the gesture, the electronic device 100 changes the floating ball system navigation bar into the capsule-bar shaped floating system navigation bar.

Figure 14C:
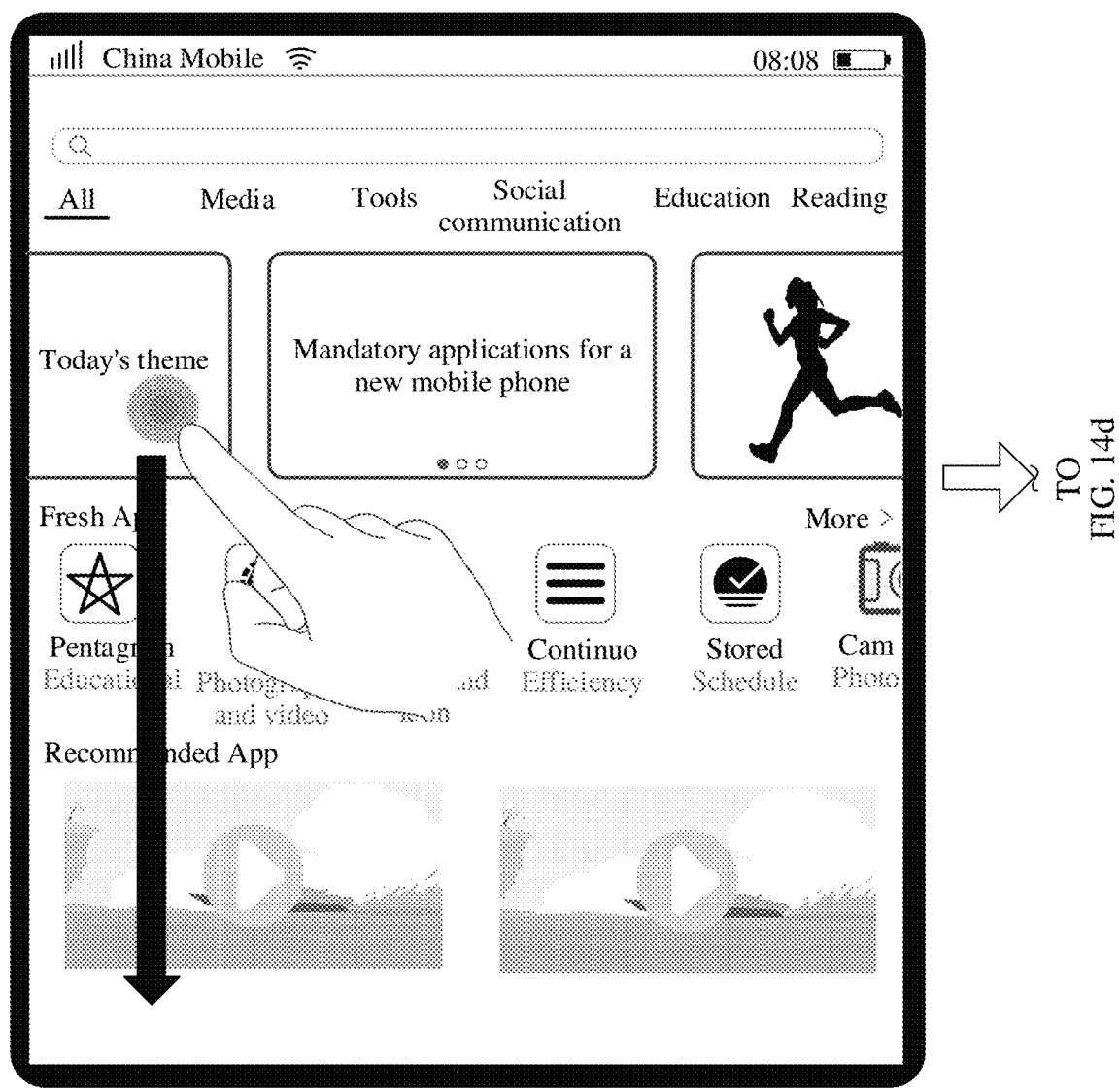
Figures 14B, 14D:
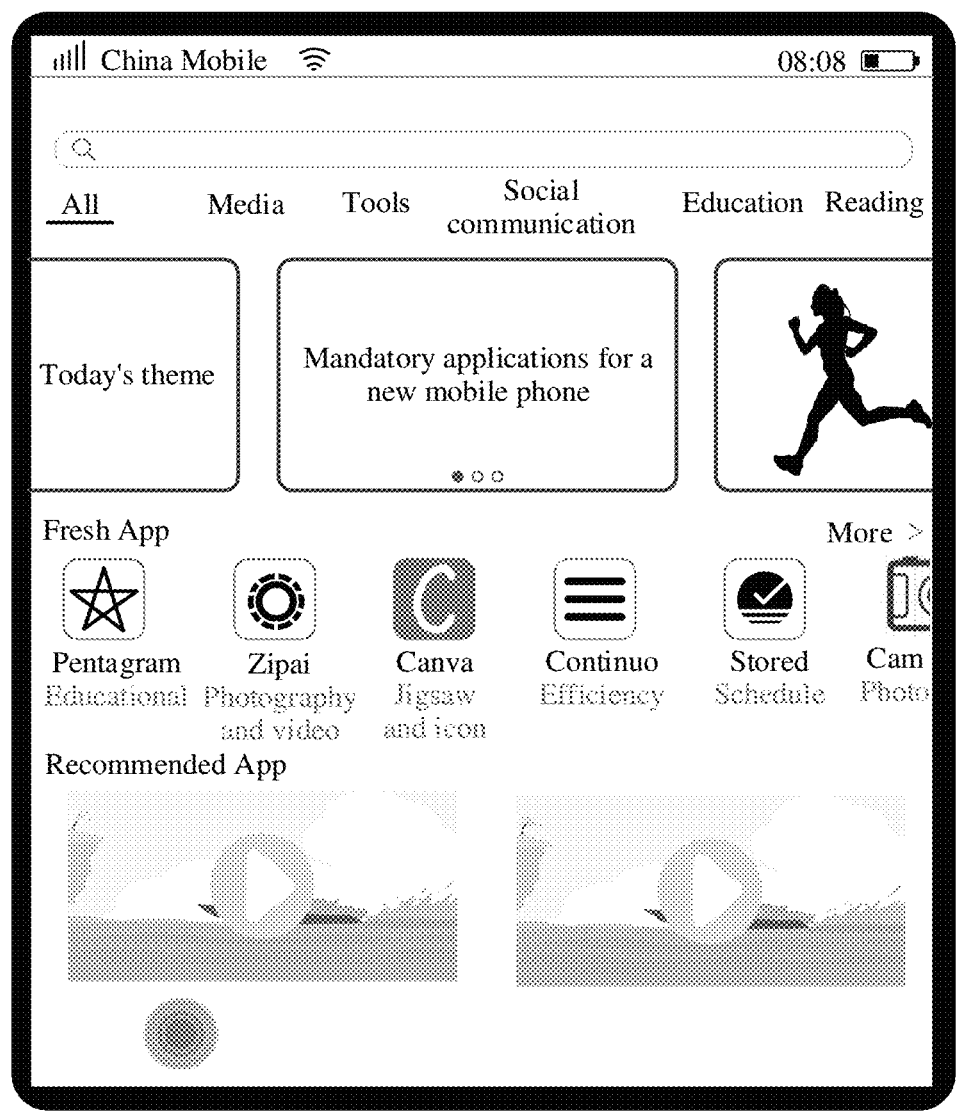

For example, referring to FIG. 14c, FIG. 14d, and FIG. 14b, the user can drag the floating ball system navigation bar to a preset area and stay in the preset area for a preset time, to change the floating ball system navigation bar from the spherical shape to the capsule bar shape. Herein, the preset area may be preset. For example, the preset area may include the bottom of the display screen shown in FIG. 14d.

(3) The Capsule Bar-Shaped Floating System Navigation Bar May be Changed to a Fixed System Navigation Bar.

Figure 15A:
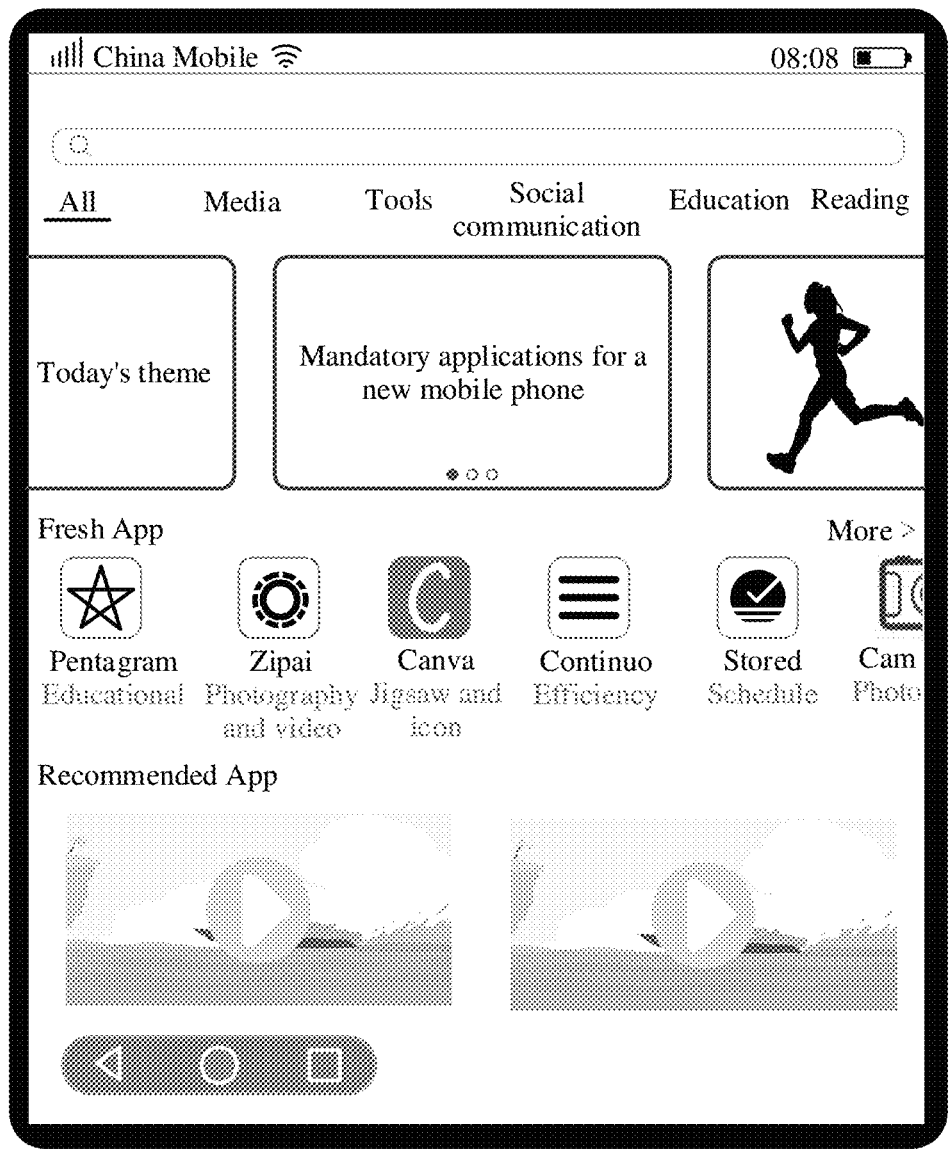
Figure 15B:
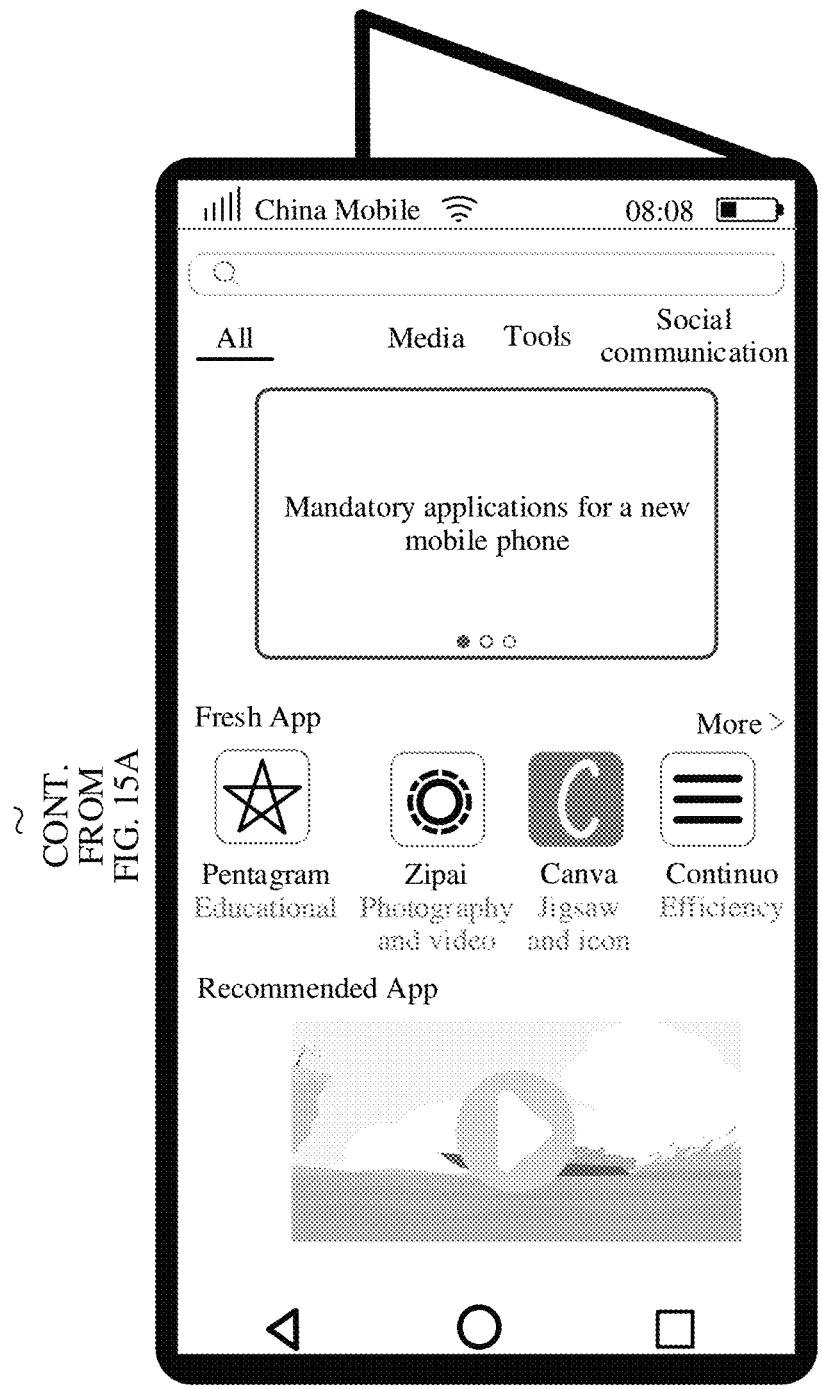

In a possible implementation, referring to FIG. 15A and FIG. 15B, when the display screen of the electronic device 100 changes from the expanded state to the folded state, the capsule bar-shaped floating system navigation bar may be changed to the fixed system navigation bar. Herein, not limited to a shape shown in the accompanying drawing on the right side of FIG. 15A and FIG. 15B, the fixed system navigation bar may further be in another shape, for example, the horizontal bar shape. This is not limited in this application.

In another possible implementation, the electronic device 100 may change the capsule bar-shaped floating system navigation bar to the fixed system navigation bar based on an input user operation. Herein, the user operation performed by the user to change the capsule bar-shaped floating system navigation bar to the fixed system navigation bar may be the same as the user operation of restoring the floating ball system navigation bar to the floating system navigation bar in the foregoing case (2). In specific implementation, the electronic device 100 may determine, based on a current form of the system navigation bar and an input user operation, a form to which the system navigation bar is changed.

Figure 16A:
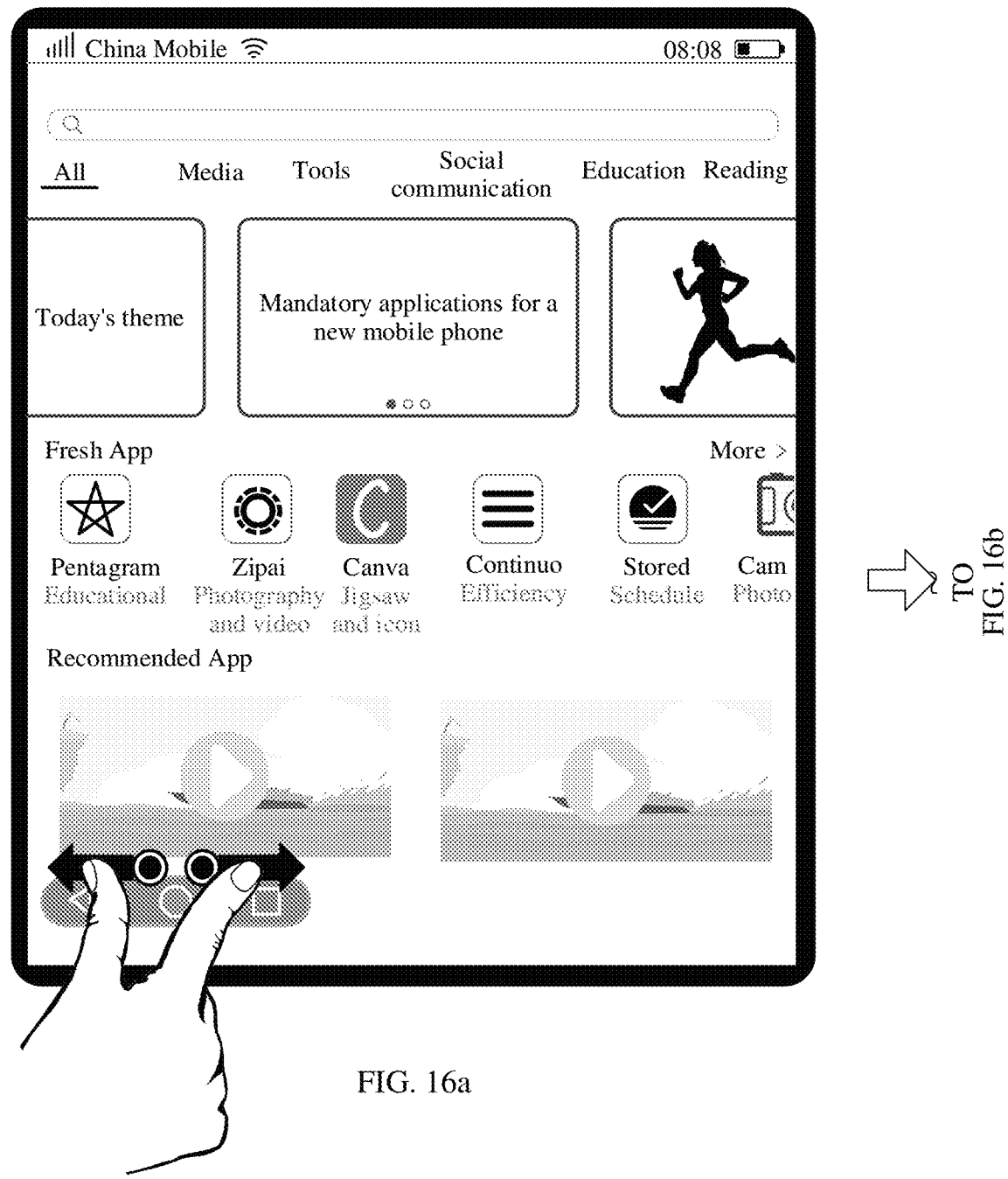
Figure 16B:
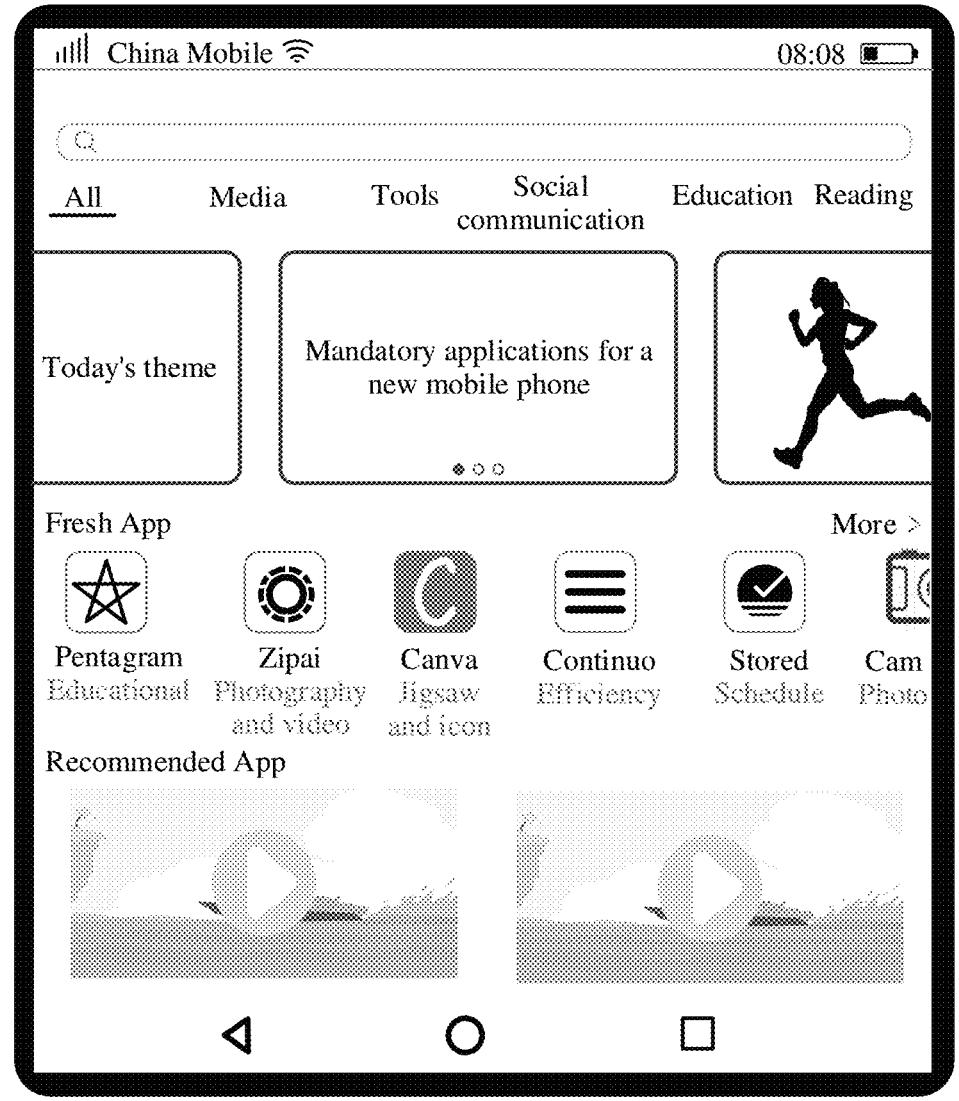
Figure 16C:
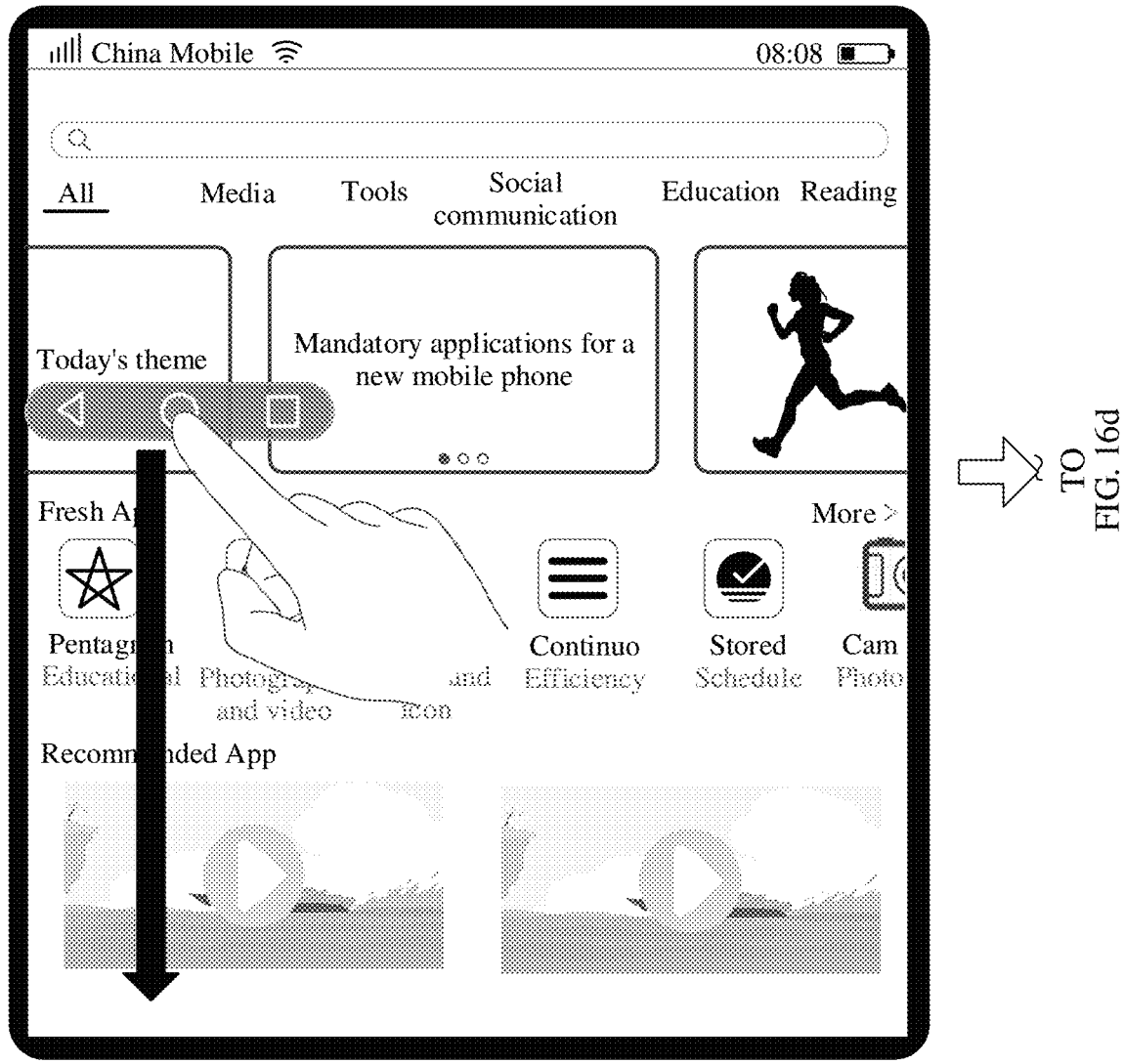
Figure 16D:
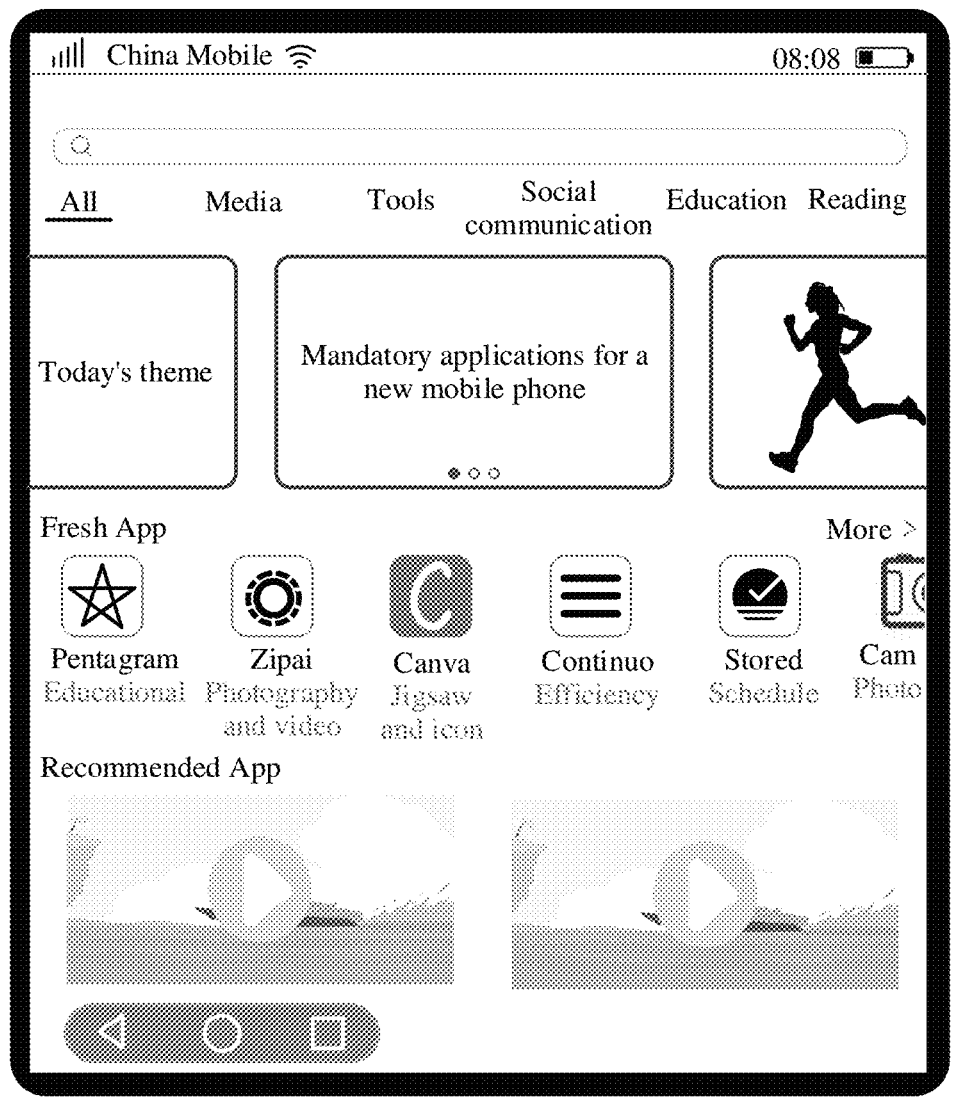

For example, referring to FIG. 16a and FIG. 16b, the user may touch the capsule bar-shaped floating system navigation bar with two fingers and slide outwards with the two fingers. In response to the gesture, the electronic device 100 changes the capsule bar-shaped floating system navigation bar to the fixed system navigation bar. For example, referring to FIG. 16c, FIG. 16d, and FIG. 18e, the user can drag the capsule bar-shaped floating system navigation bar to a preset area, and stay in the preset area for a preset time, to change the system navigation bar from a floating state to a fixed state. Herein, the preset area may be preset. For example, the preset area may include the bottom of the display screen shown in FIG. 16d.

In the foregoing FIG. 12A to FIG. 16d, the capsule bar-shaped floating system navigation bar is used as an example to describe some implementations of changing the capsule bar-shaped floating system navigation bar to another floating state and changing the capsule bar-shaped floating system navigation bar to the fixed navigation bar. An example in which the floating ball shown in FIG. 11d is displayed when the display screen is in the expanded state is used below to briefly describe some implementations of changing a spherical floating system navigation bar to another floating state and changing the spherical floating system navigation bar to a fixed navigation bar.

In some possible implementations, referring to the embodiment in FIG. 14a to FIG. 14d and related descriptions, the electronic device 100 may change the spherical floating system navigation bar to the capsule bar-shaped floating system navigation bar based on an input user operation. Further, the electronic device 100 may further restore the display form of the floating system navigation bar based on an input user operation, that is, restore the capsule bar-shaped floating system navigation bar to the floating ball system navigation bar. For details, refer to related descriptions in the embodiment in FIG. 13a to FIG. 13d, and details are not described herein.

Figure 17A:
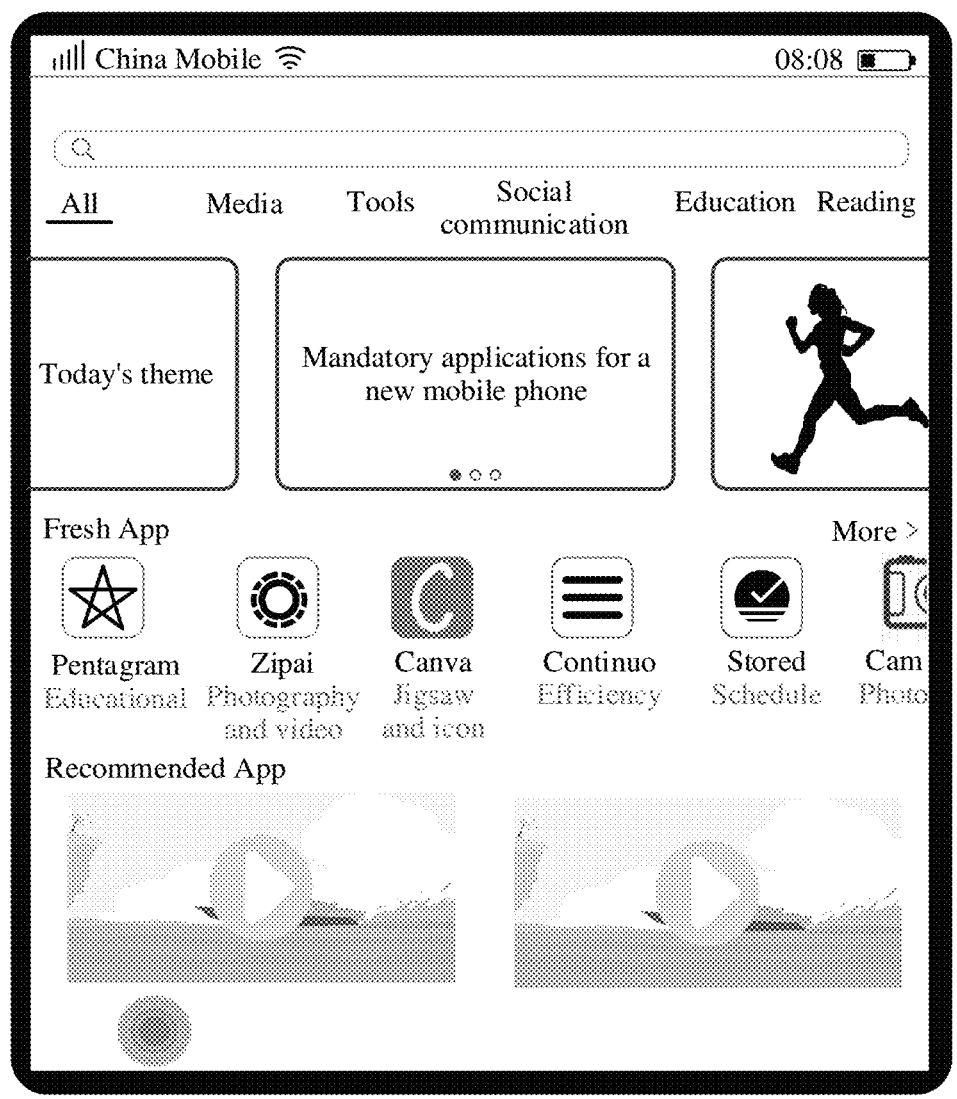
Figure 17B:
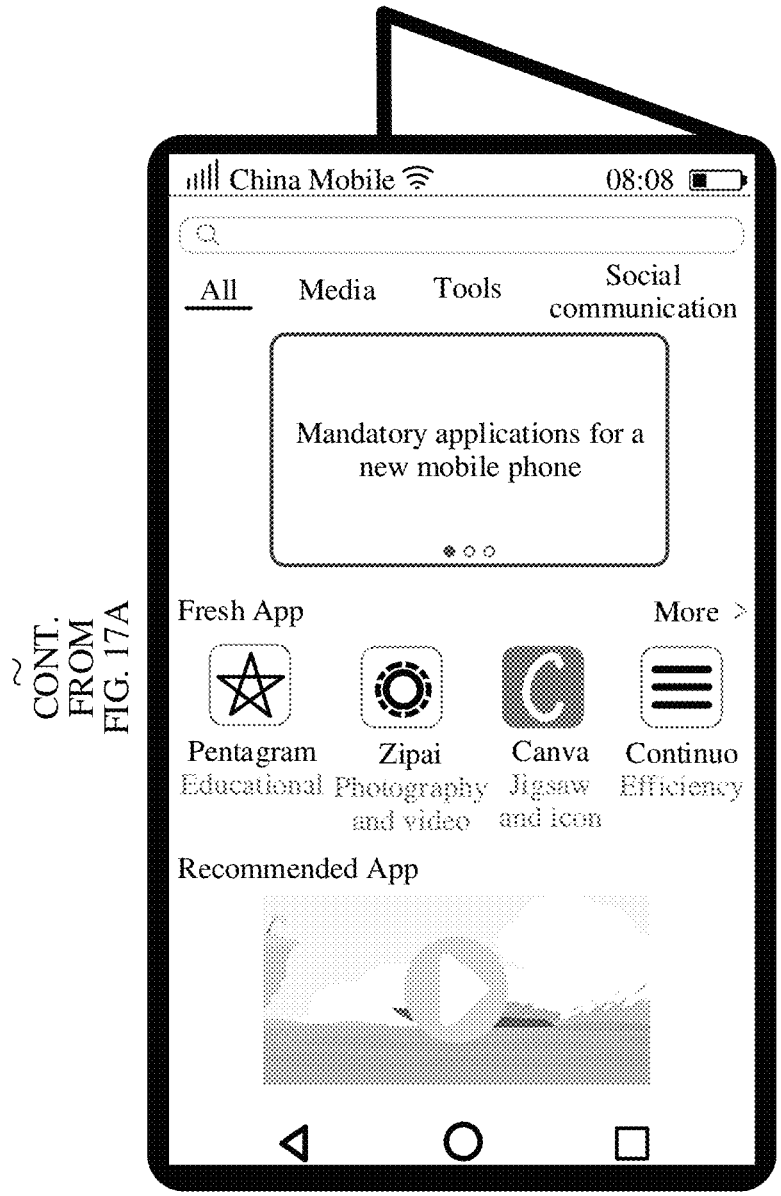

In some possible implementations, referring to FIG. 17A and FIG. 17B, when the display screen of the electronic device 100 changes from the expanded state to the folded state, the spherical floating system navigation bar may be changed to the fixed system navigation bar. Herein, not limited to a shape shown in the accompanying drawing on the right side of FIG. 17A and FIG. 17B, the fixed system navigation bar may further be in another shape, for example, the horizontal bar shape. This is not limited in this application.

In the embodiments shown in FIG. 12A to FIG. 17B, the user operation is not limited to a default setting of the electronic device at delivery, and may be further independently set by the user based on a habit of the user.

It may be understood that, when the display screen of the electronic device 100 is in the expanded state and displays the bar-shaped floating system navigation bar shown in FIG. 7a to FIG. 11e, a position, a floating form, and a change between floating forms of the bar-shaped floating system navigation bar, and a manner in which the bar-shaped floating system navigation bar is changed to the fixed system navigation bar are similar to those in the embodiments in FIG. 12A to FIG. 17B, and reference may be made to related descriptions. Details are not described herein.

In an application scenario 2, a user is using an electronic device provided with a foldable display screen, and the foldable display screen is in an expanded state. The user expects to use a navigation function provided by a system navigation bar.

In the application scenario 2, when the user uses the electronic device, the foldable display screen is in the expanded state at the beginning. Same as that in the application scenario 1, the electronic device may detect a bending angle of the display screen, and determine that the foldable display screen is in the expanded state at the beginning. The display screen displays a floating system navigation bar. Herein, for a position, a floating form, a change between floating forms of the floating system navigation bar on the display screen, a manner in which the floating system navigation bar is changed to a fixed system navigation bar, and the like, refer to related descriptions in the application scenario 1. Details are not described herein.

In an application scenario 3, when a display screen is in a landscape orientation mode, a user expects to use a navigation function provided by a system navigation bar.

Herein, that a display screen is in a landscape orientation mode may include the following two cases.

A case 1: The electronic device is provided with a foldable display screen, and the foldable display screen is in a folded state and in the landscape orientation mode.

In specific implementation, the electronic device may detect, by using an angle sensor, whether the foldable display screen is in the folded state, and detect, by using a gyro sensor, whether the foldable display screen is in a landscape orientation state. Therefore, the electronic device may determine whether the foldable display screen is in the case 1.

For example, referring to FIG. 18a and FIG. 18b, the foldable display screen may be folded from a middle position. In other words, the folded display screen is divided into two parts of areas, namely, a screen A and a screen B shown in FIG. 18a. A length of the screen A is greater than a height of the screen A. To be specific, the screen A displays, in the landscape orientation mode, interface content currently output by a system of the electronic device. Not limited to the interface shown in FIG. 18a and FIG. 18b, the interface content may further include a system-level interface element, for example, a status bar.

When the foldable display screen is in the folded state and in the landscape orientation mode, as shown in FIG. 18a and FIG. 18b, the electronic device displays a floating system navigation bar.

Not limited to the capsule bar-shaped floating system navigation bar in FIG. 18a and FIG. 18b, the floating system navigation bar in the screen A may further be in a spherical shape, a horizontal bar shape, or the like. Reference may be made to the embodiment of FIG. 11a to FIG. 11e in the application scenario 1 and related descriptions.

In a possible implementation, a display position of the floating system navigation bar may be determined based on a posture in which the user holds the electronic device. Reference may be made to the embodiment of FIG. 11a to FIG. 11e in the application scenario 1 and related descriptions. In another possible implementation, referring to FIG. 18a and FIG. 18b, the floating system navigation bar may be displayed on a side screen. Referring to FIG. 18b, when the foldable display screen is in the folded state, some parts of the screen are not in a same plane as the other parts of the screen, namely, the side screen in the figure. The side screen may be considered as a part of the screen A, or may be considered as a part of the screen B. This is not limited in this application.

The display position of the floating system navigation bar may be changed based on a user operation, or may be changed based on a manner in which the user holds the electronic device. Reference may be made to the embodiment in FIG. 12A and FIG. 12B and related descriptions.

A floating form of the floating system navigation bar may be changed based on an input user operation. For details, refer to related descriptions in the embodiments in FIG. 13a to FIG. 13d, FIG. 14a to FIG. 14d, and FIG. 16a to FIG. 16d.

The floating system navigation bar may be changed to a fixed system navigation bar. In some embodiments, referring to FIG. 18c, when the display screen of the electronic device 100 changes from the landscape orientation mode to a portrait orientation mode, the capsule bar-shaped floating system navigation bar may be changed to the fixed system navigation bar. Herein, not limited to a shape shown in FIG. 18c, the fixed system navigation bar may further be in another shape, for example, the horizontal bar shape. This is not limited in this application.

It may be understood that, in the case 1, the foldable display screen may be in the folded state and in the landscape orientation mode at the beginning, or may be changed from another posture. For example, the foldable display screen may be in the folded state and in the portrait orientation mode at the beginning. After the user changes the posture of the electronic device, the foldable display screen is in the folded state and in the landscape orientation mode. For another example, the foldable display screen may be in an expanded state at the beginning. After the user changes the posture of the electronic device, the foldable display screen is in the folded state and in the landscape orientation mode.

A case 2: The electronic device is provided with a non-folded display screen, and the non-folded display screen is in the landscape orientation mode.

In specific implementation, the electronic device may detect, by using a gyro sensor, whether the non-folded display screen is in a landscape orientation state. Therefore, the electronic device may determine whether the non-folded display screen is in the case 2.

Specifically, the non-folded display screen is configured to display interface content currently output by a system of the electronic device. Not limited to an interface shown in the accompanying drawing on the left side of FIG. 19, the interface content may further include a system-level interface element, for example, a status bar.

Figure 19:
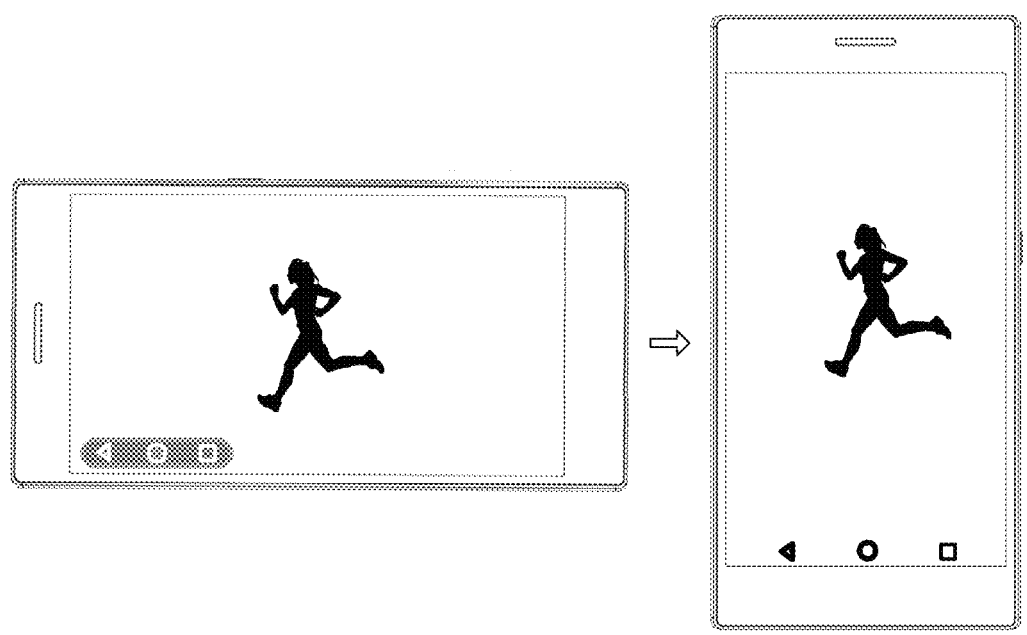

For example, referring to the accompanying drawing on the left side of FIG. 19, when the non-folded display screen is in the landscape orientation mode, the electronic device displays a floating system navigation bar.

Not limited to the capsule bar-shaped floating system navigation bar in the accompanying drawing on the left side, a floating system navigation bar in a screen A may further be in a spherical shape, a horizontal bar shape, or the like. Reference may be made to the embodiment in FIG. 11a to FIG. 11e in the application scenario 1 and related descriptions.

A display position of the floating system navigation bar may be determined based on a posture in which the user holds the electronic device. Reference may be made to the embodiment of FIG. 11a to FIG. 11e in the application scenario 1 and related descriptions.

The display position of the floating system navigation bar may be changed based on a user operation, or may be changed based on a manner in which the user holds the electronic device. Reference may be made to the embodiment in FIG. 12A and FIG. 12B and related descriptions.

A floating form of the floating system navigation bar may be changed based on an input user operation. For details, refer to related descriptions in the embodiments in FIG. 13a to FIG. 13d, FIG. 14a to FIG. 14d, and FIG. 16a to FIG. 16d.

The floating system navigation bar may be changed to a fixed system navigation bar. In some embodiments, referring to the accompanying drawing on the right side of FIG. 19, when the display screen of the electronic device 100 changes from the landscape orientation mode to a portrait orientation mode, the capsule bar-shaped floating system navigation bar may be changed to the fixed system navigation bar. Herein, not limited to a shape shown in the accompanying drawing on the right side, the fixed system navigation bar may further be in another shape, for example, the horizontal bar shape. This is not limited in this application.

It may be understood that, in the case 1, the non-folded display screen may be in the landscape orientation state at the beginning, or may be changed from another posture. For example, the non-folded display screen may be in the portrait orientation state at the beginning. After the user changes the posture of the electronic device, the non-folded display screen is in the landscape orientation state.

In an application scenario 4, a display screen is in a portrait orientation state, and displays a fixed system navigation bar. A user expects to use a navigation function provided by the system navigation bar.

Herein, that a display screen is in a portrait orientation state may include the following two cases.

A case 1: The electronic device is provided with a foldable display screen, and the foldable display screen is in a folded state and in the portrait orientation mode.

Figure 20:
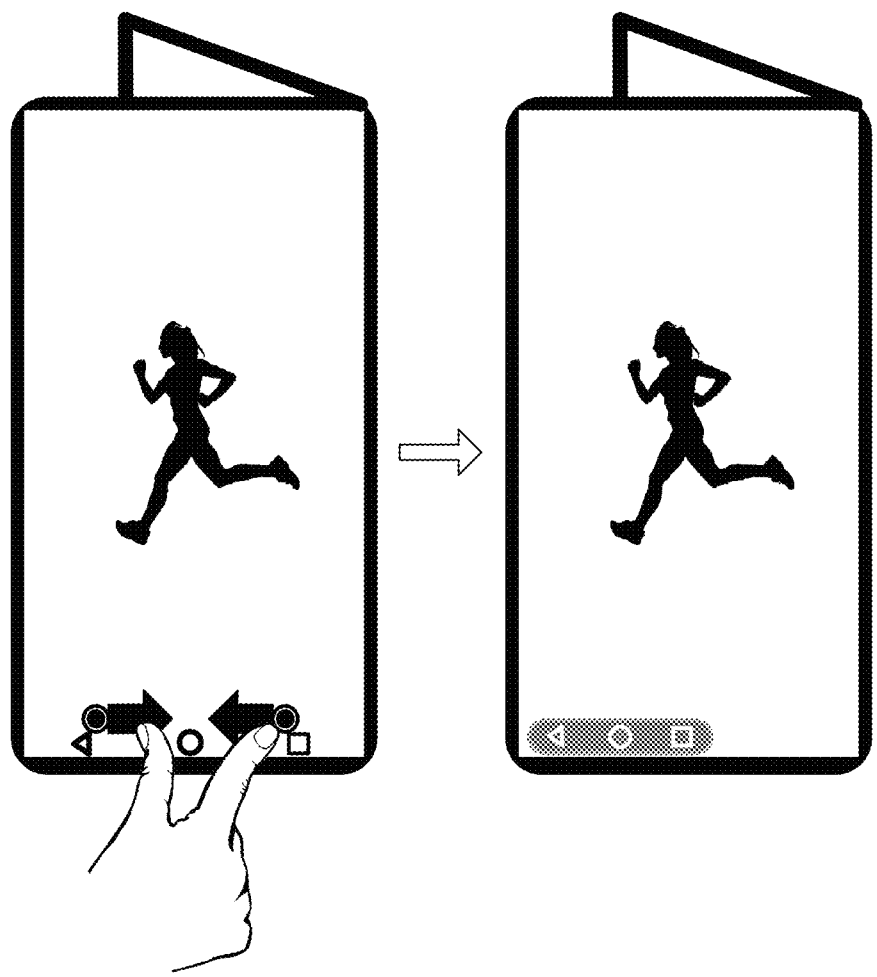

For example, referring to the accompanying drawing on the left side of FIG. 20, the foldable display screen may be folded from a middle position. In other words, the folded display screen is divided into two parts of areas: a screen A and a screen B. A height of the screen A is greater than a length of the screen A. To be specific, the screen A displays, in the portrait orientation mode, interface content currently output by a system of the electronic device. The interface content includes the fixed system navigation bar. Not limited to an interface shown in the accompanying drawing on the left side, the interface content may further include a system-level interface element, for example, a status bar. Not limited to a shape shown in the accompanying drawing on the left side, the fixed system navigation bar may further be in another shape, for example, a horizontal bar shape. This is not limited in this application.

The fixed system navigation bar may be changed to a floating system navigation bar. In some possible implementations, the electronic device may receive an input user operation, and may change the fixed system navigation bar to the floating system navigation bar in response to the user operation. Referring to the accompanying drawing on the left side and the accompanying drawing on the right side in FIG. 20, the user may input a pinch gesture by touching the fixed system navigation bar with two fingers. In response to the gesture, the electronic device 100 changes the fixed system navigation bar to the floating system navigation bar. Herein, not limited to a capsule bar shape shown in the accompanying drawing on the right side, the floating system navigation bar may further be in another shape, for example, a spherical shape or the horizontal bar shape. This is not limited in this application.

After the fixed system navigation bar is changed to the floating system navigation bar, a position, a floating form, and the like of the floating system navigation bar may be further changed based on an input user operation. For details, refer to related descriptions of the embodiments in FIG. 12A to FIG. 14d in the application scenario 1, and details are not described herein.

After the fixed system navigation bar is changed to the floating system navigation bar, further, the floating system navigation bar may be further restored to the fixed system navigation bar. Herein, for an operation of restoring the floating system navigation bar to the fixed system navigation bar, refer to related descriptions in the embodiment in FIG. 16a to FIG. 16d.

It may be understood that, in the case 1, the foldable display screen may be in the folded state and in the portrait orientation mode at the beginning, or may be changed from another posture. For example, the foldable display screen may be in the folded state and in the landscape orientation mode. After the user changes the posture of the electronic device, the foldable display screen is in the folded state and in the portrait orientation mode. For another example, the foldable display screen may be in an expanded state at the beginning. After the user changes the posture of the electronic device, the foldable display screen is in the folded state and in the portrait orientation mode.

A case 2: The electronic device is provided with a non-folded display screen, and the non-folded display screen is in the portrait orientation mode.

In specific implementation, the electronic device may detect, by using a gyro sensor, whether the non-folded display screen is in a portrait orientation state. Therefore, the electronic device may determine whether the non-folded display screen is in the case 2.

Specifically, the non-folded display screen is configured to display interface content currently output by a system of the electronic device.

Figure 21:
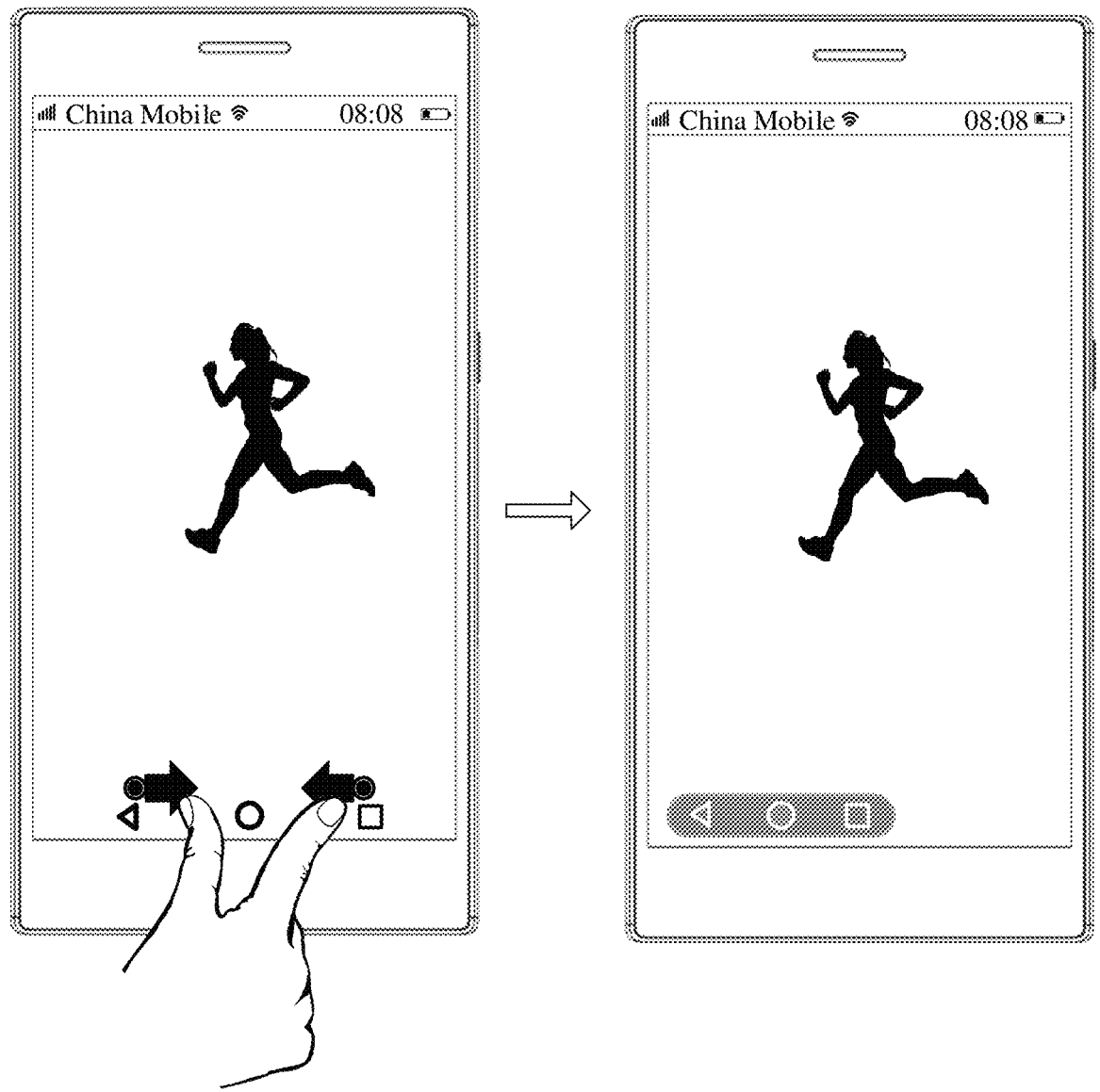

The fixed system navigation bar may be changed to a floating system navigation bar. In some possible implementations, the electronic device may receive an input user operation, and may change the fixed system navigation bar to the floating system navigation bar in response to the user operation. Referring to the accompanying drawing on the left side and the accompanying drawing on the right side in FIG. 21, the user may input a pinch gesture by touching the fixed system navigation bar with two fingers. In response to the gesture, the electronic device 100 changes the fixed system navigation bar to the floating system navigation bar. Herein, not limited to a capsule bar shape shown in the accompanying drawing on the right side, the floating system navigation bar may further be in another shape, for example, a spherical shape or a horizontal bar shape. This is not limited in this application.

After the fixed system navigation bar is changed to the floating system navigation bar, a position, a floating form, and the like of the floating system navigation bar may be further changed based on an input user operation. For details, refer to related descriptions of the embodiments in FIG. 12A to FIG. 14d in the application scenario 1, and details are not described herein.

After the fixed system navigation bar is changed to the floating system navigation bar, further, the floating system navigation bar may be further restored to the fixed system navigation bar. Herein, for an operation of restoring the floating system navigation bar to the fixed system navigation bar, refer to related descriptions in the embodiment in FIG. 16a to FIG. 16d.

It may be understood that, in the case 2, the non-folded display screen may be in the portrait orientation state at the beginning, or may be changed from another posture. For example, the non-folded display screen may be in the landscape orientation state at the beginning. After the user changes the posture of the electronic device, the non-folded display screen is in the portrait orientation state.

Based on the electronic device 100 described in the embodiment in FIG. 2 and the embodiments in FIG. 5a to FIG. 21, the following describes a system navigation bar display control method according to this application.

Figure 22:
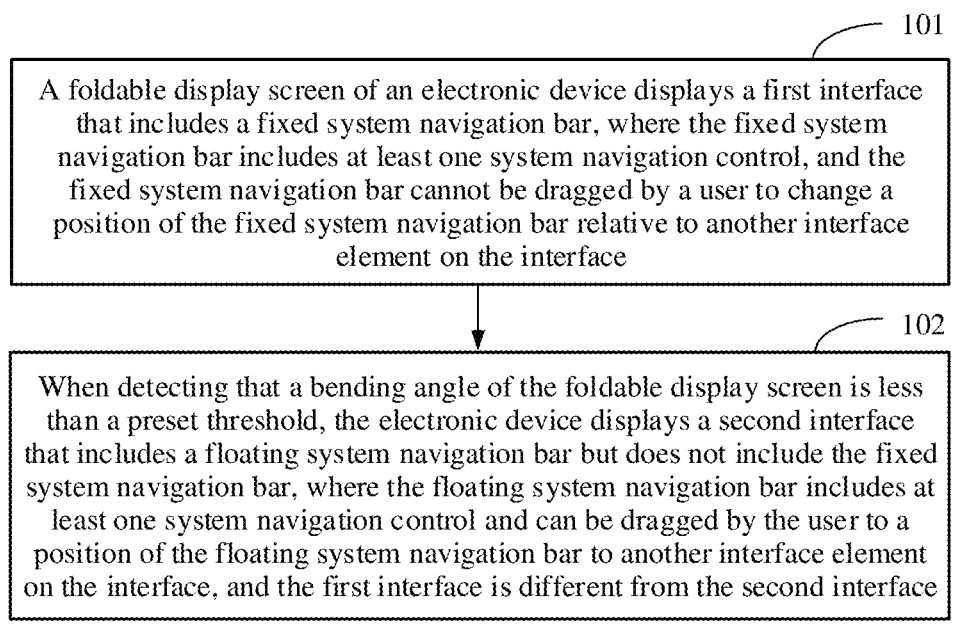
FIG. 22 is a schematic flowchart of a system navigation bar display control method according to this application.

FIG. 22 shows a control method according to this application. The method is applied to an electronic device, and the electronic device is provided with a foldable display screen. As shown in the figure, the method includes the following steps.

S101: The foldable display screen of the electronic device displays a first interface that includes a fixed system navigation bar, where the fixed system navigation bar includes at least one system navigation control, and the fixed system navigation bar cannot be dragged by a user to change a position of the fixed system navigation bar relative to another interface element on the interface.

Specifically, the electronic device is provided with the foldable display screen, and the foldable display screen may be bent. For the foldable display screen, refer to the embodiment in FIG. 3 and related descriptions. Details are not described herein.

The foldable display screen of the electronic device displays the first interface that includes the fixed system navigation bar, and the first interface is an interface currently output by a system of the electronic device. In some embodiments, the first interface may be a desktop, a main interface of an application, a sub-interface of an application, a split-screen interface, or the like. For example, FIG. 10a shows a possible first interface displayed on the foldable display screen. The first interface is the download interface of the application, and the first interface includes the fixed system navigation bar.

Herein, for the fixed system navigation bar in step S101, refer to the foregoing related descriptions of the fixed system navigation bar. The following briefly describes the fixed system navigation bar.

The fixed system navigation bar may include the at least one system navigation control. For example, referring to FIG. 10a, the fixed system navigation bar includes three system navigation controls, namely, a return key, a home screen key, and a multitasking key in FIG. 10a. Not limited to the three-key system navigation bar shown in FIG. 10a, the fixed system navigation bar in this application may further be in a bar shape shown in FIG. 9. In other words, the fixed system navigation bar includes a bar-shaped system navigation control.

It may be understood that neither a shape or a size of the fixed system navigation bar nor a shape, a size of the system navigation control, or a relative position between system navigation controls in the fixed system navigation bar is limited in this application.

In some embodiments, navigation functions of the fixed system navigation bar may include at least one of the following: returning to a home screen, returning to a previous interface, displaying a multitasking interface, or displaying a notification bar. For the navigation function of the fixed system navigation bar, refer to related descriptions in the embodiments of FIG. 6a to FIG. 9.

In this application, the fixed system navigation bar cannot be dragged by the user to change the position of the fixed system navigation bar relative to the another interface element on the interface. For example, referring to FIG. 10a, the fixed navigation bar is relatively located at the bottom of the interface displayed on the display screen. The user cannot drag the fixed system navigation bar, so that the fixed navigation bar is relatively located at the top or in the middle of the interface displayed on the display screen.

The fixed system navigation bar cannot be dragged by the user to change the position of the fixed system navigation bar relative to the another interface element on the interface. However, in some embodiments, the system navigation control included in the fixed system navigation bar may change with a posture (for example, from a portrait orientation state to a landscape orientation state) of the electronic device, to change an arrangement manner. In some embodiments, the fixed system navigation bar may change with a posture (for example, from a portrait orientation state to a landscape orientation state) of the electronic device, to change the position of the fixed system navigation bar relative to the another interface element on the interface. In some embodiments, the fixed system navigation bar may alternatively be scaled down in equal proportion in response to a user operation.

S102: When detecting that a bending angle of the foldable display screen is less than a preset threshold, the electronic device displays a second interface that includes a floating system navigation bar but does not include the fixed system navigation bar, where the floating system navigation bar includes at least one system navigation control and can be dragged by the user to change a position of the floating system navigation control relative to another interface element on the interface. The first interface is different from the second interface.

Specifically, the electronic device may obtain the bending angle of the foldable display screen. In a possible implementation, the electronic device may obtain the bending angle of the foldable display screen by using an angle sensor. In another possible implementation, the electronic device may obtain the bending angle of the foldable display screen by using a gyro sensor.

The bending angle of the foldable display screen indicates a status of the display screen. In some embodiments, when the bending angle of the foldable display screen is less than the preset threshold, it may be considered that the foldable display screen is in an expanded state. When the bending angle of the foldable display screen is greater than the preset threshold, it may be considered that the foldable display screen is in a folded state. Herein, the preset threshold is not limited to a default setting of the electronic device at delivery, and may be further independently set by the user. For example, the preset threshold may be 3 degrees, 5 degrees, or the like.

In a possible implementation, when detecting that the bending angle of the foldable display screen is less than the preset threshold, the electronic device automatically displays the second interface that includes the floating system navigation bar but does not include the fixed system navigation bar. In another possible implementation, when detecting that the bending angle of the foldable display screen is less than the preset threshold, the electronic device may output, to the user, prompt information about whether to display the floating system navigation bar. After the user determines to display the floating system navigation bar, the second interface that includes the floating system navigation bar but does not include the fixed system navigation bar is displayed.

Herein, for the floating system navigation bar in step S102, refer to the foregoing related descriptions of the floating system navigation bar. The following briefly describes the floating system navigation bar.

In some embodiments, navigation functions of the floating system navigation bar may include at least one of the following: returning to a home screen, returning to a previous interface, displaying a multitasking interface, or displaying a notification bar. For the navigation function of the floating system navigation bar, refer to related descriptions in the embodiments of FIG. 6a to FIG. 9.

The floating system navigation bar can be dragged by the user to change the position of the floating system navigation bar relative to the another interface element on the interface. In some embodiments, the floating system navigation bar can be dragged by the user to any position of the display screen.

In a possible implementation, that the floating system navigation bar is dragged by the user may mean that the entire floating system navigation bar is dragged by the user.

For example, FIG. 10b shows a capsule bar-shaped floating system navigation bar. The user can drag the entire capsule bar-shaped floating system navigation bar to the upper left corner, the upper right corner, the lower left corner, the middle area, or the like of the display screen.

In another possible implementation, that the floating system navigation bar is dragged by the user may mean that some system navigation controls of the floating system navigation bar are dragged by the user. For example, referring to FIG. 10b, the capsule bar-shaped floating system navigation bar includes three system navigation controls, namely, a return key, a home screen key, and a multitasking key in FIG. 10b. The user can drag some virtual navigation controls (for example, the return key or the multitasking key) to the upper left corner, the upper right corner, the lower left corner, the middle area, or the like of the display screen, and positions of other system navigation controls relative to the virtual navigation controls on the interface remain unchanged. It may be understood that neither a size or a shape of the floating system navigation bar nor a shape, a size of a system navigation control, or a relative position between system navigation controls in the floating system navigation bar is limited in this application.

Herein, the first interface includes the fixed system navigation bar, and the second interface includes the floating system navigation bar but does not include the fixed system navigation bar. Therefore, the first interface is different from the second interface. In some embodiments, interface elements other than the fixed system navigation bar on the first interface may be the same as or different from interface elements other than the floating system navigation bar on the second interface. For example, referring to FIG. 11a to FIG. 11e, the first interface may be an interface displayed on the screen A in FIG. 11a, and the second interface may be an interface displayed in FIG. 11b. Both the first interface and the second interface are main interfaces of the application store, but the second interface includes more interface elements than those on the first interface.

In some embodiments, when the electronic device displays the second interface, a position of the floating system navigation bar on the second interface is related to a posture in which the user holds the electronic device. For example, as shown in FIG. 11b and FIG. 11d, when the user holds the lower left corner of the electronic device with the left hand, the floating system navigation bar may be displayed in the lower left corner of the display screen. For example, as shown in FIG. 11c and FIG. 11e, when the user holds the lower right corner of the electronic device with the right hand, the floating system navigation bar may be displayed in the lower right corner of the display screen. The foregoing display mode may be convenient for the user to operate the floating system navigation bar.

In some embodiments, when detecting an input first user operation, the electronic device changes at least one of a size, a shape, or a display mode of the floating system navigation bar on the second interface, or changes at least one of a quantity of controls, a shape of a control, a size of a control, or a relative position of controls in the floating system navigation bar.

The size of the floating system navigation bar refers to a size of a display area occupied by the floating system navigation bar on the display screen. The display mode may include joint display of system navigation controls in the floating system navigation bar (for example, the floating system navigation bar shown in FIG. 13a to FIG. 13d) or separate display (for example, separate display of some system navigation controls and another system navigation control). The control size refers to a size of a display area occupied by a system navigation control of the floating system navigation bar on the display screen. The relative position between controls refers to a position relationship between system navigation controls of the floating system navigation bar.

Herein, the first user operation is not limited to a default setting of the electronic device at delivery, and may be further independently set by the user.

For example, referring to FIG. 13a and FIG. 13b, the first user operation may be a pinch gesture input by the user by touching the capsule bar-shaped floating system navigation bar with two fingers. In response to the gesture, the floating system navigation bar may be changed from a capsule bar shape to a spherical shape.

For example, referring to FIG. 13c and FIG. 13b, the first user operation may be a gesture that the user touches the capsule bar-shaped floating system navigation bar with a single finger to slide the capsule bar-shaped floating system navigation bar to the other side. In response to the gesture, the floating system navigation bar is changed from a capsule bar shape to a spherical shape. Not limited to the gesture of sliding leftward, in this application, the floating system navigation bar may be further changed from the capsule bar shape to the spherical shape by using a gesture of sliding rightward.

For example, referring to FIG. 13d and FIG. 13b, the first user operation may be a gesture that the user drags the capsule bar-shaped floating system navigation bar to an edge area of the display screen. In response to the gesture, the electronic device may change the floating system navigation bar from a capsule bar shape to a spherical shape.

Herein, not limited to the first user operation mentioned above, in this application, the shape or the size of the floating system navigation bar may be further changed in another manner. For example, the user further changes the floating system navigation bar from a capsule bar shape to a spherical shape or a horizontal bar shape by using a gesture of sliding the capsule bar-shaped floating system navigation bar upward.

In some embodiments, when detecting that the bending angle of the foldable display screen is greater than the preset threshold, the electronic device displays the first interface.

According to the method in FIG. 22, when the foldable display screen changes from the folded state to the expanded state, the floating system navigation bar is displayed, and the floating system navigation bar can be dragged by the user. In this way, when operating the electronic device with one hand, the user can drag the floating system navigation bar to an area in which an operation is conveniently performed with one hand, so that various functions of the system navigation bar can be conveniently used.

Figure 23:
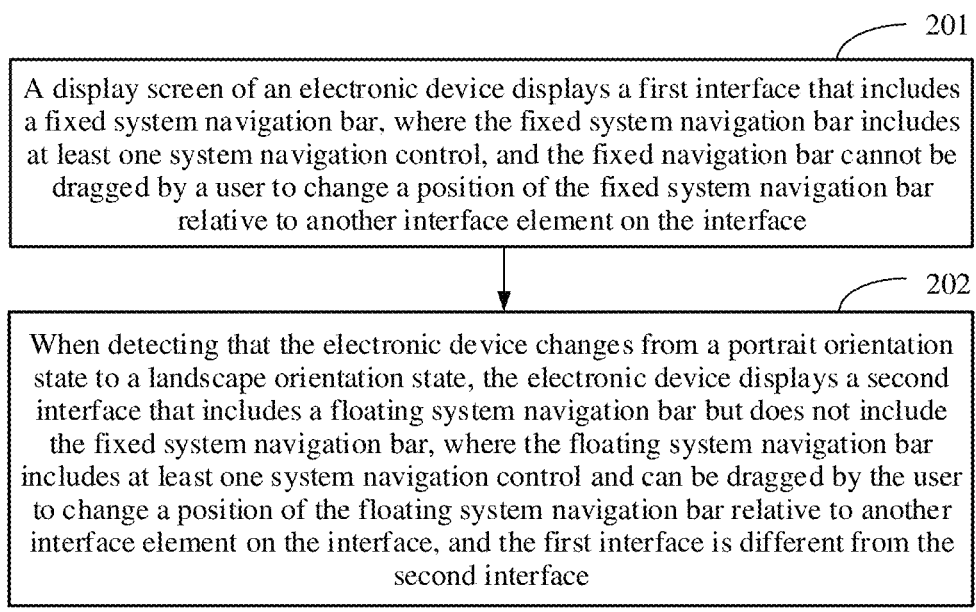
FIG. 23 is a schematic flowchart of another system navigation bar display control method according to this application.

FIG. 23 shows another control method according to this application. The method is applied to an electronic device, and the electronic device is provided with a display screen. The display screen may be a foldable display screen, or may be a non-folded display screen. As shown in the figure, the method includes the following steps.

S201: The display screen of the electronic device displays a first interface that includes a fixed system navigation bar, where the fixed system navigation bar includes at least one system navigation control, and the fixed navigation bar cannot be dragged by a user to change a position of the fixed system navigation bar relative to another interface element on the interface.

Herein, implementation of step S201 is the same as that of step S101 in the embodiment in FIG. 22, and reference may be made to related descriptions.

S202: When detecting that the electronic device changes from a portrait orientation state to a landscape orientation state, the electronic device displays a second interface that includes a floating system navigation bar but does not include the fixed system navigation bar, where the floating system navigation bar includes at least one system navigation control and can be dragged by the user to change a position of the floating system navigation bar relative to another interface element on the interface. The first interface is different from the second interface.

Specifically, the electronic device may detect the landscape/portrait orientation state of the electronic device in a plurality of manners.

When the electronic device is provided with the foldable display screen, and the foldable display screen is in a folded state, the foldable display screen has a landscape orientation and a portrait orientation. Therefore, the electronic device may determine whether the foldable display screen is in the folded state before determining whether the foldable display screen is in the landscape orientation state. Herein, a manner of determining whether the foldable display screen is in the folded state is the same as that in the foregoing embodiment in FIG. 22, and reference may be made to related descriptions.

In an optional embodiment, the electronic device may determine the landscape/portrait orientation state of the display screen by using data obtained by using a gyro sensor. For example, when a rotation angle that is of the electronic device and that is measured by using the gyro sensor is greater than a threshold, it may be determined that the display screen is in the landscape orientation state. When the rotation angle is less than the threshold, it may be determined that the display screen is in the portrait orientation state. Not limited to the gyro sensor, in specific implementation, the electronic device may further determine the landscape/portrait orientation state of the display screen by using a compass, a camera, a gravity sensor, or the like.

In a possible implementation, when detecting that the electronic device changes from the portrait orientation state to the landscape orientation state, the electronic device automatically displays the second interface that includes the floating system navigation bar but does not include the fixed system navigation bar. In another possible implementation, when detecting that the electronic device changes from the portrait orientation state to the landscape orientation state, the electronic device may output, to the user, prompt information about whether to display the floating system navigation bar. After the user determines to display the floating system navigation bar, the second interface that includes the floating system navigation bar but does not include the fixed system navigation bar is displayed.

Herein, the floating system navigation bar, the first interface, and the second interface are the same as those in the embodiment in FIG. 22, and reference may be made to related descriptions.

In some embodiments, when the electronic device displays the second interface, a position of the floating system navigation bar on the second interface is related to a posture in which the user holds the electronic device. Herein, the position of the floating system navigation bar on the second interface is the same as that in the embodiment in FIG. 22, and reference may be made to related descriptions.

In some embodiments, when detecting an input first user operation, the electronic device changes at least one of a size, a shape, or a display mode of the floating system navigation bar on the second interface, or changes at least one of a quantity of controls, a shape of a control, a size of a control, or a relative position of controls in the floating system navigation bar. Herein, the first user operation is the same as that in the embodiment in FIG. 22, and reference may be made to related descriptions.

In some embodiments, when detecting that the electronic device changes from the landscape orientation state to the portrait orientation state, the electronic device displays the first interface.

According to the method in FIG. 23, when the display screen changes from the portrait orientation state to the landscape orientation state, the floating system navigation bar is displayed, and the floating system navigation bar can be dragged by the user. In this way, when operating the electronic device with one hand, the user can drag the floating system navigation bar to an area in which an operation is conveniently performed with one hand, so that various functions of the system navigation bar can be conveniently used.

It may be understood that, for implementation of the steps in the embodiments in FIG. 22 and FIG. 23, refer to related descriptions of the human-computer interaction embodiments shown in FIG. 5a to FIG. 21.

Various implementations of this application may be randomly combined to achieve different technical effects.

All or some of the foregoing embodiments may be implemented by using software, hardware, firmware, or any combination thereof. When software is used to implement the embodiments, the embodiments may be implemented all or partially in a form of a computer program product. The computer program product includes one or more computer instructions. When the computer program instructions are loaded and executed on a computer, the procedure or functions according to this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk), or the like.

In short, the foregoing descriptions are only embodiments of the technical solutions of the present invention, but are not intended to limit the protection scope of the present invention. Any modification, equivalent replacement, or improvement made according to the disclosure of the present invention shall fall within the protection scope of the present invention.

What is claimed is:

1. An electronic device, comprising:
   a foldable display screen; and
   one or more processors configured to
   cause the foldable display screen to display a first interface that comprises a fixed system navigation bar, wherein the fixed system navigation bar comprises one or more system navigation control buttons, and the fixed system navigation bar is not movable by user operation to change a position of the fixed system navigation bar relative to another interface element on the first interface, and in response to detecting that a bending angle of the foldable display screen is less than a preset threshold, cause the foldable display screen to display a second interface that comprises a floating system navigation bar instead of the fixed system navigation bar, wherein the floating system navigation bar comprises one or more system navigation control buttons and is movable by user operation to change a position of the floating system navigation bar relative to another interface element on the second interface, and wherein the first interface is different from the second interface.

2. The electronic device according to claim 1, wherein the one or more processors are configured to cause the foldable display screen to display the floating system navigation bar on the second interface at a position corresponding to a posture of the electronic device.

3. The electronic device according to claim 1, wherein the one or more processors are further configured to while the foldable display screen is displaying the second interface that comprises the floating system navigation bar,
cause the foldable display screen to display the first interface instead of the second interface, in response to detecting that the bending angle of the foldable display screen is greater than the preset threshold.

4. The electronic device according to claim 1, wherein the one or more processors are further configured to in response to detecting an input first user operation, cause the foldable display screen to change at least one of a size, a shape, or a display mode of the floating system navigation bar on the second interface.

5. The electronic device according to claim 1, wherein the one or more processors are further configured to in response to detecting an input first user operation, cause the foldable display screen to change a quantity of the control buttons, a shape of the control buttons, a size of the control buttons, or a relative position of the control buttons in the floating system navigation bar.

6. The electronic device according to claim 1, wherein the one or more system navigation control buttons of the fixed system navigation bar comprise at least one of a home screen key or a return key, wherein the one or more processors are configured to
in response to user operation on the home screen key, change a current interface currently displayed on the foldable display screen to a home screen, and
in response to user operation on the return key, change the current interface to a previous interface that was displayed before the current interface.

7. The electronic device according to claim 6, wherein the one or more system navigation control buttons of the fixed system navigation bar further comprise a multitasking key, wherein the one or more processors are configured to
in response to user operation on the multitasking key, cause the foldable display screen to display a list of recently used applications.

8. The electronic device according to claim 6, wherein the one or more system navigation control buttons of the floating system navigation bar comprise the at least one of the home screen key or the return key.

9. The electronic device according to claim 8, wherein the one or more processors are configured to in response to the foldable display screen being in a folded state in which the bending angle of the foldable display screen is not less than the preset threshold,
cause the foldable display screen to display the fixed system navigation bar, and
in response to the foldable display screen being in an expanded state in which the bending angle of the foldable display screen is less than the preset threshold,
cause the foldable display screen to display the floating system navigation bar.

10. The electronic device according to claim 8, wherein the one or more processors are configured to in response to the foldable display screen being in a landscape orientation and in a folded state, in which the bending angle of the foldable display screen is not less than the preset threshold,
cause the foldable display screen to display the floating system navigation bar, and
in response to the foldable display screen being in a portrait orientation and in the folded state,
cause the foldable display screen to display the fixed system navigation bar.

11. The electronic device according to claim 10, wherein the one or more processors are configured to in response to user operation on the fixed system navigation bar while the foldable display screen is being in the portrait orientation and in the folded state,
cause the foldable display screen to display floating system navigation bar instead of the fixed system navigation bar.

12. The electronic device according to claim 6, wherein the one or more processors are configured to in response to detecting that the bending angle of the foldable display screen is less than the preset threshold,
cause the foldable display screen to display the floating system navigation bar as an icon different from the home screen key and the return key, and
in response to first user operation on the icon,
cause the foldable display screen to display the floating system navigation bar in an expanded display form comprising, instead of the icon, the at least one of the home screen key or the return key.

13. The electronic device according to claim 12, wherein the one or more processors are configured to in response to second user operation on the floating system navigation bar in the expanded display form,
cause the foldable display screen to display the floating system navigation bar as the icon.

14. An electronic device, comprising:
a display screen; and
the one or more processors configured to
cause the display screen to display a first interface that comprises a fixed system navigation bar, wherein the fixed system navigation bar comprises one or more system navigation control buttons, and the fixed system navigation bar is not movable by user operation to change a position of the fixed system navigation bar relative to another interface element on the first interface, and
in response to detecting that a posture of the electronic device changes from a first orientation state to a second orientation state, cause the display screen to display a second interface that comprises a floating system navigation bar instead of the fixed system navigation bar, wherein the floating system navigation bar comprises one or more system navigation control buttons and is movable by user operation to change a position of the floating system navigation bar relative to another interface element on the second interface, and wherein the first interface is different from the second interface.

15. The electronic device according to claim 14, wherein the one or more processors are configured to
cause the display screen to display the floating system navigation bar on the second interface at a position corresponding to the posture of the electronic device.

16. The electronic device according to claim 14, wherein the one or more processors are further configured to
in response to detecting an input first user operation, cause the display screen to change at least one of a size, a shape, or a display mode of the floating system navigation bar on the second interface.

17. The electronic device according to claim 14, wherein the one or more processors are further configured to
in response to detecting an input first user operation, cause the display screen to change a quantity of the control buttons, a shape of the control buttons, a size of the control buttons, or a relative position of the control buttons in the floating system navigation bar.

18. The electronic device according to claim 14, wherein the one or more processors are further configured to
while the display screen is displaying the second interface that comprises the floating system navigation bar, cause the display screen to display the first interface instead of the second interface, in response to detecting that the posture of the electronic device changes from the second orientation state to the first orientation state.

19. The electronic device according to claim 14, wherein
the first orientation state is one of a portrait orientation state and a landscape orientation state, and
the second orientation state is the other of the portrait orientation state and the landscape orientation state.

20. A method, performed by an electronic device with a foldable display screen, the method comprising:
displaying, by the foldable display screen, a first interface that comprises a fixed system navigation bar, wherein the fixed system navigation bar comprises one or more system navigation control buttons, and the fixed system navigation bar is not movable by user operation to change a position of the fixed system navigation bar relative to another interface element on the first interface;
detecting whether a bending angle of the foldable display screen is less than a preset threshold; and
in response to detecting that the bending angle of the foldable display screen is less than the preset threshold, displaying, by the foldable display screen, a second interface that comprises a floating system navigation bar instead of the fixed system navigation bar, wherein the floating system navigation bar comprises one or more system navigation control buttons and is movable by user operation to change a position of the floating system navigation bar relative to another interface element on the second interface, and wherein the first interface is different from the second interface.

* * * * *